United States Patent
Suzuki et al.

(10) Patent No.: US 6,633,795 B1
(45) Date of Patent: Oct. 14, 2003

(54) MANUFACTURED ARTICLE RECYCLING SYSTEM

(75) Inventors: Tatsuya Suzuki, Yokohama (JP); Kazushige Hashimoto, Funabashi (JP); Yuuji Ochiai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/400,553

(22) Filed: Sep. 21, 1999

Related U.S. Application Data

(63) Continuation of application No. 08/722,202, filed as application No. PCT/JP95/00729 on Apr. 14, 1995, now Pat. No. 5,965,858.

(30) Foreign Application Priority Data

Apr. 15, 1994 (JP) .............................. 6-076864
Oct. 31, 1994 (JP) .............................. 6-267715

(51) Int. Cl.[7] .............................................. G06F 17/00
(52) U.S. Cl. ............................. 700/213; 700/9; 235/375
(58) Field of Search .................. 700/97, 20, 9, 700/3, 213; 705/7, 8, 27, 30, 28; 209/606, 636, 630; 235/375

(56) References Cited

U.S. PATENT DOCUMENTS

| | | | |
|---|---|---|---|
| 4,636,950 A | 1/1987 | Caswell et al. | 235/385 |
| 5,190,165 A | 3/1993 | Garfield, Jr. | 209/655 |
| 5,234,109 A | 8/1993 | Pederson | 209/31 |
| 5,249,690 A | 10/1993 | Patterson | 209/630 |
| 5,532,928 A | * 7/1996 | Stanczyk et al. | 235/376 |
| 5,586,022 A | * 12/1996 | Arimoto et al. | 700/97 |
| 5,673,037 A | 9/1997 | Cesar et al. | 340/110.32 |
| 5,699,525 A | * 12/1997 | Embutsu et al. | 235/376 |
| 5,712,989 A | 1/1998 | Johnson et al. | 705/7 |

FOREIGN PATENT DOCUMENTS

| | | |
|---|---|---|
| DE | 44 01 605 A1 | 7/1994 |
| EP | 0 591 615 A2 | 4/1994 |
| EP | 0 634 260 A2 | 1/1995 |
| GB | 2 229 809 A | 10/1990 |
| JP | 05197236 | 8/1993 |
| JP | 05342224 | 12/1993 |
| JP | 5-342224 | 12/1993 |
| JP | 6-246256 | 9/1994 |
| JP | 6-274544 | 9/1994 |
| JP | 07130295 | 5/1995 |
| WO | WO 85/00454 | 1/1985 |

OTHER PUBLICATIONS

Conference Papers Presented at The National Plastics Exposition and Conference, Jun. 17–21, 1991, McCormick Place, Chicago, vol. 1, MPE '91 The Society of the Plastics Industry, Inc.

* cited by examiner

Primary Examiner—Albert W. Paladini
Assistant Examiner—Kidest Bahta
(74) Attorney, Agent, or Firm—Antonelli, Terry, Stout & Kraus, LLP

(57) ABSTRACT

A recycle system for a manufactured article including an input unit which inputs first information relating to the manufactured article and a storage unit which stores second information relating to recycle processes and third information relating to materials to be controlled by the recycle system. A computation unit is provided which determines whether or not the first information includes information indicative of at least one of the materials stored as the third information, and which selects a recycle process from the second information according to the result of determination, and an output unit is provided which outputs information of the selected recycle process.

11 Claims, 33 Drawing Sheets

RECYCLE PROCESSING METHOD DECISION/RECYCLE PROCESSING EXECUTION PROCEDURE

FIG. 7

EXAMPLE OF ARTICLE SPECIFICATION INFORMATION DATA

ADDRESS HEADER FIELD

| ADDRESS | HEADER ENTRY | DATA SIZE |
|---|---|---|
| A | BASIC INFORMATION | 50 |
| B | DESIGN INFORMATION (1) | 50 |
| C | DESIGN INFORMATION (2) COMPONENT PART INFORMATION | 40000 |
| D | DESIGN INFORMATION (3) DISASSEMBLING METHOD INFORMATION | 1000 |
| E | ⋮ | |

DATA FIELD

A

| ARTICLE CATEGORY | MANUFACTURER NAME | MODEL NAME | MANUFACTURE ID NUMBER | MANUFACTURE DATE | ALLOWABLE LIFE LIMIT |
|---|---|---|---|---|---|
| CTV | HITACHI | C29ABC | 000205 | 198902 | 3 |

B

| SCREEN SIZE | OUTER DIMENSIONS (W) | (H) | (D) | WEIGHT | DISSIPATION POWER | USE HISTORY (YEARS) |
|---|---|---|---|---|---|---|
| 29 | 500 | 500 | 450 | 40.0 | 120 | |

C

| PART NUMBER | PART NAME | MATERIAL CATEGORY | MATERIAL NAME | MATERIAL/PART MANUFACTURER | MATERIAL/ PART GRADE | WEIGHT | NUMBER | ARTICLE FOR REUSE | PART EXCHANGE DATE | |
|---|---|---|---|---|---|---|---|---|---|---|
| 1 | BEZEL | P | PS | ABC | PS10 | 2000 | 1 | 0 | 0 | 0000 | ••• |
| 2 | COVER | P | PS | ABC | PS30 | 3000 | 1 | 0 | 0 | 0000 | ••• |
| 3 | PWB ASSY | PWB | Pb+Cu+ e.t.c | — | A55 | 3500 | 1 | 0 | 0 | 0000 | ••• |
| 4 | HOLDER | P | PS | DEF | B60 | 200 | 1 | 0 | 0 | 0000 | ••• |
| 5 | CRT | CO | Pb+ Glass | HIT | C29A | 20000 | 1 | 1 | 0 | 0000 | ••• |
| 6 | DY | CO | PPE+ Cu | HM | DY29 | 600 | 1 | 1 | 0 | 9205 | ••• |
| 7 | CABLE | CO | PVC+ Cu | HD | CA100 | 300 | 10 | 0 | 3 | 0000 | ••• |
| 8 | SPEAKER | CO | — | NC | SP10 | 1000 | 2 | 1 | 0 | 0000 | ••• |
| 9 | S. METAL | M | Fe | NS | SECC | 400 | 2 | 1 | 0 | 0000 | ••• |

EXAMPLE OF USE HISTORY INFORMATION DATA

1. DATA STRUCTURE (a) POWER-ON SEQUENTIAL TIMES
(b) POWER SUPPLY DURATION [h]
(c) WHETHER OR NOT SPECIFIED UPPER LIMIT VALUE OF ENVIRONMENT TEMPERATURE HAS BEEN EXCEEDED

|     | (a) | (b) | (c) |
|-----|-----|-----|-----|
| (1) | 1   | 10  | 0   |
| (2) | 2   | 5   | 0   |
| (3) | 3   | 2   | 0   |
| (4) | 3   | 3   | 1   |
| (5) | 3   | 2   | 0   |
| (6) | 4   | 5   | 0   |

2. HISTORY INFORMATION DATA STORING SCHEME

(EXAMPLE 1)

(1) UPON POWER-ON OF TV (WHEN POWER SUPPLY IS TURNED ON SECOND TIME)

|     | (a) | (b) | (c) |
|-----|-----|-----|-----|
| (1) | 1   | 10  | 0   |
| (2) | 2   |     |     |

(2) UPON POWER-OFF AFTER OPERATION OF TV FOR FIVE HOURS WITHIN SPECIFIED TEMPERATURE RANGE

|     | (a) | (b) | (c) |
|-----|-----|-----|-----|
| (1) | 1   | 10  | 0   |
| (2) | 2   | 5   | 0   |

(EXAMPLE 2)

(1) UPON POWER-ON OF TV (WHEN POWER SUPPLY IS TURNED ON THIRD TIME)

|     | (a) | (b) | (c) |
|-----|-----|-----|-----|
| (1) | 1   | 10  | 0   |
| (2) | 2   | 5   | 0   |
| (3) | 3   |     |     |

(2) WHEN ENVIRONMENTAL TEMPERATURE STARTS TO RISE BEYOND SPECIFIED UPPER LIMIT VALUE AFTER TWO HOURS FROM POWER-ON

|     | (a) | (b) | (c) |
|-----|-----|-----|-----|
| (1) | 1   | 10  | 0   |
| (2) | 2   | 5   | 0   |
| (3) | 3   | 2   | 0   |

(3) WHEN ENVIRONMENTAL TEMPERATURE AGAIN FALLS WITHIN SPECIFIED TEMPERATURE RANGE

|     | (a) | (b) | (c) |
|-----|-----|-----|-----|
| (1) | 1   | 10  | 0   |
| (2) | 2   | 5   | 0   |
| (3) | 3   | 2   | 0   |
| (4) | 3   | 3   | 1   |

(4) WHEN POWER SUPPLY IS TURNED OFF AFTER SUPPLY FOR TWO HOURS

|     | (a) | (b) | (c) |
|-----|-----|-----|-----|
| (1) | 1   | 10  | 0   |
| (2) | 2   | 5   | 0   |
| (3) | 3   | 2   | 0   |
| (4) | 3   | 3   | 1   |
| (5) | 3   | 2   | 0   |

IMAGE OF DISASSEMBLING PROCESS IN RECYCLING FACTORY

IMAGE OF DISASSEMBLING PROCESS IN RECYCLING FACTORY

DISCARDED ARTICLE PROCESSING PROCEDURE

FIG. 26

EXAMPLE OF ARTICLE SPECIFICATIONS INFORMATION DATA
(ARTICLE DISASSEMBLING METHOD INFORMATION)

ADDRESS HEADER FIELD

| ADDRESS | HEADER ENTRY | DATA SIZE |
|---|---|---|
| A | BASIC INFORMATION | 50 |
| B | DESIGN INFORMATION (1) | 50 |
| C | DESIGN INFORMATION (2) COMPONENT PART INFORMATION | 40000 |
| D | DESIGN INFORMATION (3) DISASSEMBLING METHOD INFORMATION | 1000 |
| E | ⋮ | |

D

| DISASSEMBLING ORDER | COMPONENT PART No. | DISASSEMBLED (SEPARATED) PART NAME | NUMBER | USED TOOL | STANDARD DISASSEMBLING PROCESS QUANTITY (SEC) | REQUIRED NUMBER OF WORKERS | REFERENCE DISASSEMBLING DRAWING No. | PARTS CONSTITUTING DETACHED COMPONENT PART | | |
|---|---|---|---|---|---|---|---|---|---|---|
| 1 | #103 | φ4×16 SCREW | 4 | +D | 3.0 | 1 | D1001 | 51 | | |
| 2 | #001 | COVER | 1 | | 2.0 | 1 | D1001 | 2 | | |
| 3 | #101 | M3×8 SCREW | 2 | +D | 2.0 | 1 | D1002 | 52 | | |
| 4 | #201 | SHELL METAL | 1 | | 2.0 | 1 | D1002 | 9 | | |
| 5 | #102 | M3×8 SCREW | 4 | +D | 3.0 | 1 | D1003 | 52 | | |
| 6 | #002 | BEZEL | 1 | | 4.0 | 1 | D1003 | 1 | | |
| 7 | A001 | PWB ASS'Y | 1 | | 3.0 | 1 | D1004 | 3 | 4 | |
| 8 | #103 | φ4×12 SCREW | 4 | +D | 3.0 | 1 | D1005 | 53 | | |
| 9 | E001 | CRT ASS'Y | 1 | | 7.0 | 1 | D1005 | 5 | 6 | |

⋮

IMAGE OF DISASSEMBLING PROCESS IN RECYCLING FACTORY

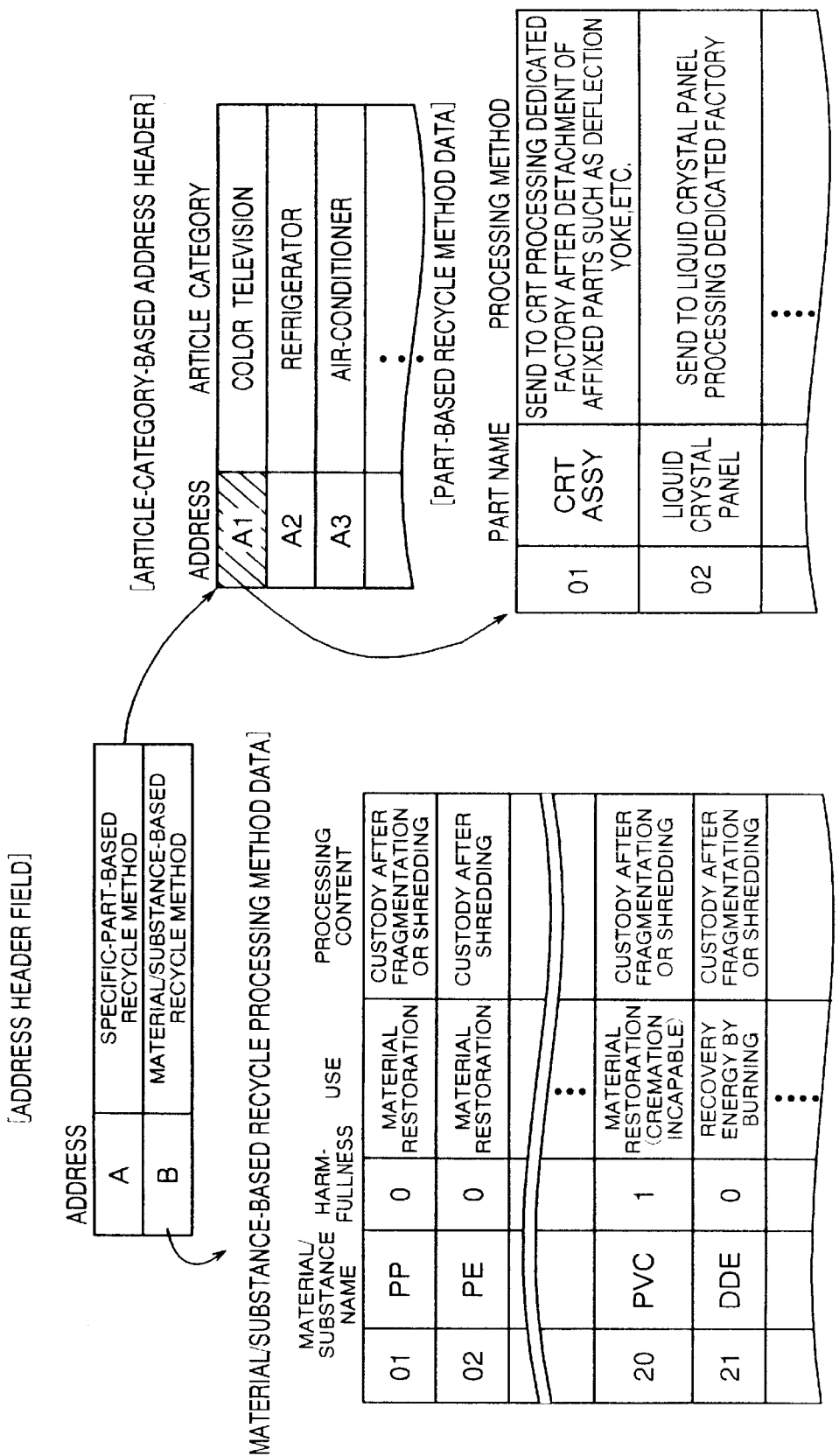

FIG. 30

EXAMPLE OF MARKET INFORMATION DATABASE

[ADDRESS HEADER (1)]

| ADDRESS | ENTRY |
|---|---|
| A | USED-ARTICLE MARKET COST INFORMATION |
| B | USED-PART DEMAND INFORMATION |
| ⋮ | |

[ADDRESS HEADER (2) (ARTICLE CATEGORY BASED)]

| A01 | COLOR TELEVISION |
|---|---|
| A02 | REFRIGERATOR |
| A03 | AIR-CONDITIONER |
| ⋮ | |

[USED-ARTICLE MARKET PRICE INFORMATION DATA]

| | ARTICLE MODEL NAME | MANUFACTURE YEAR | STANDARD MARKET PRICE |
|---|---|---|---|
| 01 | C29ABC1 | 90 | 3000 |
| 02 | C29ABC1 | 91 | 5000 |
| 03 | C25DEF2 | 90 | 2000 |
| ⋮ | | | |

[ADDRESS HEADER (2) (ARTICLE CATEGORY BASED)]

| B01 | COLOR TELEVISION |
|---|---|
| B02 | REFRIGERATOR |
| ⋮ | |

[DATA OF USED PART DEMAND INFORMATION]

| PART TYPE | PART CATEGORY | MANUFACTURE YEAR | DEMAND QUANTITY | PURCHASE PRICE | BUYER |
|---|---|---|---|---|---|
| DY100 | DEFLECTING YOKE | 90 | 10 | 300 | SERVICE CENTER A |
| CRTC29F | CRT | 91 | 3 | 3000 | SERVICE CENTER B |
| | | | ⋮ | | |

MANUFACTURED ARTICLE RECYCLING SYSTEM

CROSS REFERENCE TO RELATED APPLICATION

This is a continuation of U.S. application Ser. No. 08/722,202, filed Oct. 15, 1996 now U.S. Pat. No. 5,965,858, filed as PCT/JP95/0072 filed Apr. 14, 1995, the subject matter of which is incorporated by reference herein.

TECHNICAL FIELD

The present invention relates to a discarded article processing system for carrying out treatments or processings for discarded articles (processings for making it possible to restore the discarded articles as resources, i.e., recycle processing and waste disposal processing).

BACKGROUND ART

Heretofore, discarded articles such as discarded electric appliances for home use are collected and processed by dealers entrusted by a local government and junk dealers engaged in garbage or waste processing business. In such discarded articles, some parts of metals such as iron, aluminum and the like are recycled as restored materials or substances. However, in the present state of situtation, most of the discarded articles are disposed of for the reclamation or landfill without undergoing any processing or treatment or after fragmentation or cremation (incineration). As a consequence, there have arisen serious environmental problems. By way of example, in conjunction with the reclamation or landfill, there may be mentioned a problem of shortage of land or lot required therefor and problems of soil contamination and water pollution. Similarly, cremation of the discarded articles encounters serious problems such as air pollution, global warming due to generation of $CO_2$ and the like. Such being the circumstances, there exists a great social demand for the efforts for promoting the recycle of the discarded articles (reuse of the discarded articles as resources) in order to reduce the amount of wastes or make the most of the fossil fuel which is naturally limited.

There can be conceived various reasons why promotion of the recycle of the discarded articles such as discarded appliances for home use or proper waste disposal processing has made little progress, one of the major reasons for which can be explained by the fact that information necessary for realizing the recycle of the discarded articles as collected and the proper disposal of the wastes is scarcely available. In practice, attempts for recycle processing of the discarded articles or proper wastage disposal actually encounter difficulty in that the method or means for realizing such processings can not be determined because of lack of the information concerning the materials or substances from which the discarded articles are made as well as the information concerning presence or absence of harmful and/or hazardous materials or substances in the discarded articles. Consequently, most of the discarded articles are disposed of as the wastes. In the present states of the art, the information required for carrying out the recycle processing method for the discarded articles and the proper waste disposal processing method is difficult to acquire. By way of example, any one of the manufactured article contains little indication or information concerning a disassembling method, component parts and materials thereof. On the other hand, the manufacturer affords no system or facility for presenting such information. For the reasons mentioned above, many or most of the discarded articles are disposed of as wastage without undergoing any proper or appropriate recycle processing.

It is an object of the present invention to provide a manufactured article,recycling system for determining or deciding methods of realizing recycle processings proper for various discarded articles by making it possible to collect, process and furnish speedily a variety of information required for the processings or treatments of the discarded articles, to thereby reduce the amount of wastes and make the much of limited fossil fuel resource.

DISCLOSURE OF THE INVENTION

With a view to promoting the recycling of the discarded articles and realizing proper disposal processings or treatments of the discarded articles, the present invention provides a manufactured article recycling system for deciding a recycle processing for the purpose of determining capability/allowability of reuse of an article, which system includes a reading means for reading information affixed to the article, a storage means for storing a database of article reuse oriented information which bears correspondence to the information affixed to the article for reuse of the article, a recycle decision means for deciding a recycle processing for the article by referencing the article reuse oriented information of the database stored in the storage means on the basis of the information affixed to the article inputted through the reading means, and an output means for outputting result of the decision made for the article by the recycle decision means.

For effectuating the decision of the recycle processing executed by the recycle decision means, there may be established recycle rules for deciding the processing method proper or appropriate for the discarded article concerned.

Further, for facilitating reuse of the article, the article may be equipped with a memory means for storing as information concerning the article at least such information as the name of article, manufacturer name of the article, model name of the article, manufactured date, manufacturing number, and component parts of the article, and an output means for outputting the information stored in the memory means.

In the system according to the present invention, article information required for deciding the recycle processing method is made available by the reading means. As the article information to be read by the reading means, there may be mentioned the information concerning at least the name of the article, the manufacturer name of the article, the model name of the article, manufactured date, manufacture ID number, component parts of the article and the like. The reading means for inputting the information concerning the article may be at least one selected from a group which consists of a connecting means connected to the article for reading information concerning the article, a radio receiver means for receiving the information concerning the article sent out from a radio transmitter means which is provided in association with the article, a keyboard for receiving the information concerning the article through key manipulation, a mouse used for receiving the information concerning the article, a bar code reading means for reading a bar code when information concerning the article is indicated by the bar code, and a driving means for driving memory means when the information concerning the article is stored in the memory means.

The storage means may include as the database an article specifications information database for storing life limit information concerning a restoration-allowable life limit of the article, a statutory regulation/standard information database for storing statutory regulation information concerning the statutory regulations imposed on the manufactured articles on an article-by-article basis and standard information concerning the standards previously established for the manufactured articles on an article-by-article basis, a material-based recycle processing method database which stores information concerning harmfulness or hazardousness of the materials of the component parts and recycle processing methods for the materials, respectively, a part-based recycle processing method database which stores recycle processing methods for the component parts, and a market information database which stores price information on the market of used articles for the article.

The recycle decision means can make decision as to the proper recycle processing method or disposal processing method of the discarded article. For example, the recycle decision means can decide on the basis of the information concerning the article as inputted through the reading means as to whether or not the article satisfies condition that the article has a remaining life falling within the restoration-allowable life limit of the article as stored in the article specifications information database, wherein when the remaining life of the article falls within the restoration-allowable life limit, the recycle decision means issues such recycle processing decision or judgement result which indicates that the article is subject to restoration as a restored article, and if otherwise, the recycle decision means issues such recycle processing decision result while indicates that the article is subject to a disassembling processing for disassembling the article to individual component parts.

Because the discarded article processing method decided is transmitted or messaged to the discarded article processing line by the processing result output means, appropriate recycle processing can be carried out in accordance with the processing decision result. The output means may include at least one of a voice output means for generating voice information, a video information output means for generating image information and a printing means for generating printed information in order to output the results of the decision made by the recycle decision means. When the system further includes an equipment control unit for controlling facilities for executing the recycle processing on the basis of the result of decision made by the recycle decision means, it can control the equipment or facilities of the recycling factory, to thereby command the process for the disassembling works.

As is apparent from the foregoing, by virtue of the above arrangements, the system according to the present invention allows the appropriate recycle processing as well as the proper waste disposal processing, whereby reduction of the amount of wastes, suppression of generation of harmful wastes and economization of energy consumption can be achieved.

BRIEF DESCRIPTION OF THE DRAWINGS

FIG. 7 is a view for illustrating, by way of example, data of article specifications information, FIG. 8 is a view for illustrating, by way of example, data of article use or life history information, FIG. 26 is a view showing exemplary data of-article specifications information (information of article disassembling method), FIG. 29 is a view illustrating, by way of example, a material/part-based recycle processing method database, FIG. 30 is a view illustrating, by way of example, a market information database.

BEST MODE FOR CARRYING OUT THE INVENTION

Exemplary embodiments of the present invention will be described by reference to the drawings.

Figure 1:
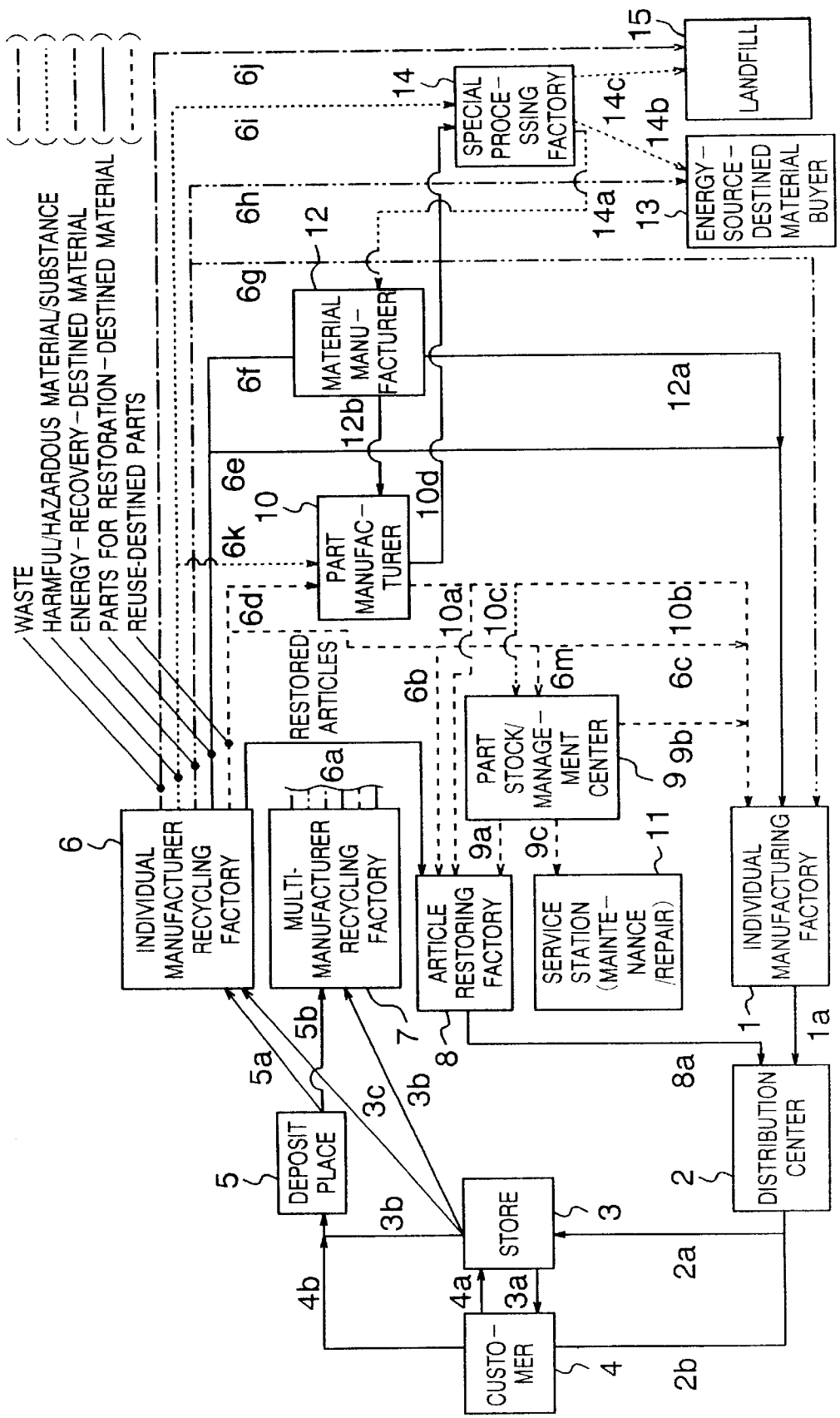
FIG. 1 is a view for illustrating a recycling system (with routes extending from manufacturing to recycling) according to the present invention.

FIG. 1 is a view showing flows in recycling of manufactured articles according to the instant embodiment and illustrates flows of manufactured articles from the manufacturing thereof to the recycling (inclusive of the disposal as the waste). In the following, by taking a television as an example, a recycling flow originating in a manufacturing factory 1 will be elucidated in a sequential order. In FIG. 1, articles are manufactured in the manufacturing factory 1 of a given manufacturer to be shipped to a distribution center 2 (route 1a). After temporary storage at the distribution center 2, the articles are delivered or transported to stores 3 (route 2a), where the articles are purchased by customers 4 (route 3a). Of course, there is conceivable such a case where the articles are delivered directly to the customers 4, as in the case of a mail shopping or the like (route 2b). The customer 4 will discard the article purchased from the store 3 after having used it for a given period. The articles as discarded (hereinafter referred to also as the discarded article and hence the television discarded is referred to as the discarded television) will follow a route in which the discarded articles are collected by an organization entrusted by a local government, a tertiary industrial company or the like organization at a discarded article deposit place 5 (route 4b) or a route in which the store 3 receives directly the discarded articles from the customers 4 for sending them to the discarded article deposit place 5 (route 3b). At the discarded article deposit place 5, the discarded articles are classified on the basis of a category or class thereof or classified on a maker-by-maker basis for each category of the articles. Thereafter, the discarded articles are sent to recycling factories 6 and 7 (routes 5a and 5b). Addition-ally, there is conceivable such a case in which the store 3 receives the discarded articles from the customers 4 to send them directly to the recycling factory 6 or 7 (route 3c or 3d). In conjunction with the recycling factory, two different types of recycling factories can be conceived in dependence on whether the recycling factories have been built on a maker-by-maker basis or in common to a plurality of manufacturers. In the case of the exemplary scenario illustrated in FIG. 1, the discarded television recycling factory 6 for individual manufacturer is assumed to be dedicated for a particular maker or manufacturer while the recycling factory 7 for multi manufacturers is assumed as being capable of accommodating the discarded televisions manufactured by plural unspecific manufacturers in common.

Figure 5:
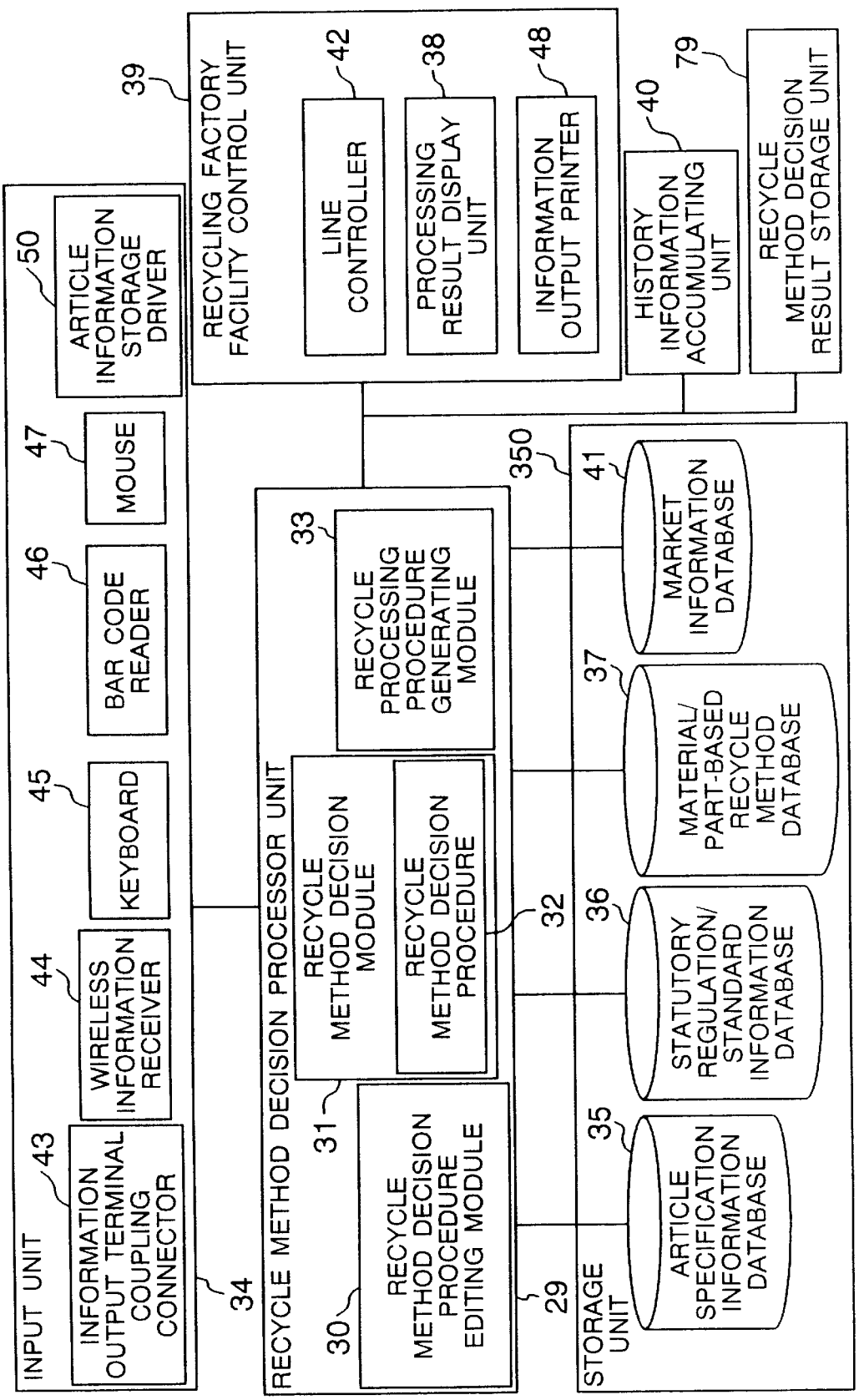
FIG. 5 is a view showing a configuration of a recycle processing method decision/recycle processing executing system.

In each of the recycling factories 6 and 7, information as required is collected in accordance with recycling rules (1) to (6) mentioned hereinafter, whereon recycling methods are determined or decided for the individual discarded televisions as collected, which is then followed by recycle processings. At this juncture, with the recycling method, it is intended to mean a method of reusing the discarded article. To this end, each of the recycling factories 6 and 7 is equipped with a recycling system for the discarded televisions in order to determine or decide the recycling methods for given ones of the discarded televisions, respectively. As is illustrated in FIG. 5 (which will be elucidated later on), the article recycling system is composed of an input unit 34 for inputting information concerning the articles as "an information acquiring means" for making available a variety of information required for the decision mentioned above, a storage unit 350 for storing databases concerning information required for the reuse of the articles, a recycle method decision processor unit 29 for deciding a recycle processing for a given article in accordance with the recycling rules prepared previously by referencing the information of the article destined for reuse as contained in the database stored in the storage unit 350 on the basis of the information concerning the article inputted through the medium of the input unit 34, and a recycling factory facility control unit 39 which serves as "an information transmitting means" for transmitting the result of the decision made by the recycle method decision processor unit 29 to a succeeding process without fail and which thus functions as the output unit for generating the result of decision made for a given article as an output. The recycle method decision processor unit 29 installed in association with each of the recycling factories 6 and 7 decides the recycling method in accordance with the recycling rules (1) to (6) mentioned below and at the same time executes the processing relevant for the recycling method as decided while determining distribution/delivery routes for the articles undergone no processing as well as the articles having been subjected to the processing.

Recycling Rules (1) Discarded televisions are first classified into articles to be recycled as the reproduced or restored televisions for reuse and as the waste televisions incapable of restoration.

The waste televisions incapable of restoration are to be subjected to disassembling on a component part basis, wherein the component parts are classified into following categories or classes (2) to (6), respectively. Namely, (2) component parts to be reused as parts (referred to as reuse-destined parts), (3) component parts to be reused as restored material, (4) component parts to be reused as energy resource (referred to as energy-recovery-destined part), (5) component parts containing harmful/hazardous materials/substances and requiring special processing or treatment, and (6) component parts to be disposed of for reclamation.

In this manner, the recycling rules are classified into six categories. In the case of the instant embodiment, the recycling rules are so stipulated that the discarded articles are to be effectively utilized to a possible maximum extent without disposal or throwing-away and cremation or burning. Next, in conjunction with the recycling rules (1) to (6) classified above, the article distribution/delivery routes following the processings in the recycling factories 6 and 7 will be explained by reference to FIG. 1.

(1) The discarded television to be recycled as the restoration-destined television is delivered to an article restoring factory 8 (route 6a). After having undergone article restoration processing in the article restoring factory 8, the television once discarded is again sent by way of the distribution center 2 (route 8a) to the store 3 (route 2a) as the restored television to be sold to the customer 4 (route 3a). After the use by the customer 4, the restored television is collected again as the discarded television, whereon the discarded television undergoes the recycle processing described above.

(2) The reuse-destined parts are reused by way of the following routes, i.e., (a) reuse-destined parts supplied to the article restoring factory 8 to be reused as parts of restored television (route 6b), (b) reuse-destined parts sent to the manufacturing factory 1 to be used as parts of televisions manufactured newly (route 6c), (c) reuse-destined parts sent to a part management center (part warehouse) 9 to be once stocked (route 6m) and thereafter sent to the article restoring factory 8 to be used as the parts for restored televisions (route 9a), (d) reuse-destined parts sent to the manufacturing factory 1 to be used as parts for televisions manufactured newly after stocking at the part stock/management center 9 (route 9b), (e) reuse-destined parts sent to a service station 11 where maintenance of the articles is performed to be thereby used as parts for maintenance after stocking at the part stock/management center 9 (route 9c), (f) reuse-destined parts sent to a part manufacturer 10 (route 6d) to undergo proper services and thereafter sent to the article restoring factory 8 to be used as the parts for restored televisions (route 10a), (g) reuse-destined parts sent to the part manufacturer 10 for undergoing proper services and then sent to the manufacturing factory 1 to be used as the parts in newly manufactured televisions (route 10b), (h) reuse-destined parts sent to the part manufacturer 10 for receiving proper services and sent through the part stock/management center 9 (route 10c) to the article restoring factory 8 (route 9a), (i) reuse-destined parts sent to the part manufacturer 10 (route 6d) for receiving the proper services and thereafter sent to the manufacturing factory 1 through the part stock/management center 9 (route 9b), and (j) reuse-destined parts sent to the part manufacturer 10 (route 6d) for undergoing proper services and then sent to the service station 11 via the part stock/management center 9 (route 9c).

(3) The discarded televisions to be reused as the restored material are pulverized or fragmentated in the recycling factories 6 and 7, whereon some of the fragmentated materials will be supplied to the manufacturing factory 1 as the material for new parts (route 6e) while the others will be sent to a material manufacturer 12 (route 6f). The material sent to the material manufacturer 12 undergoes a material restoration processing for performing a required treatment on the fragmentated material, whereon some of the processed materials will be sent to the manufacturing factory 1 as materials for new parts (route 12a) while the others will be sent to the part manufacturer 10 to be used as the materials for new parts (route 12b).

(4) Some of the discarded televisions to be reused as the energy resource are fragmentated or pulverized in the recycling factories 6 and 7 to be utilized as the energy resource in the same factory, some of the discarded televisions are delivered to the manufacturing factory 1 (route 6g) to be utilized as the energy resource in the manufacturing factory 1 and the others are transferred to an energy-resource-destined material buyer 13 (route 6h).

(5) Some of the parts containing harmful/hazardous materials and requiring special treatment will be treated properly by the part manufacturer 10 (route 6k), some of them will be sent to a harmful/hazardous material processing factory 14 built to this end to undergo proper treatment (route 6i) and some will be sent to the harmful/hazardous material processing factory 14 by way of the part manufacturer 10 (route 10d). The parts supplied to the harmful/hazardous material processing factory 14 are classified into restoration-destined materials, energy-resource-destined materials and waste materials after the treatment, whereon the restoration-destined materials are sent to the material manufacturer 12 (route 14a), while the energy-resource-destined materials are transferred to the energy-resource-destined material buyer 13 (route 14b) with the waste materials being disposed of for reclamation (route 14c).

(6) The discarded televisions to be disposed of for reclamation undergo fragmentation in the recycling factory 6 or 7, as occasion requires, to be disposed of at a landfill (route 6j).

In the foregoing, the flows of articles in the recycling thereof have been described. However, the above-mentioned flows are only for the purpose of exemplification. There may be conceived other various schemes. By way of example, in place of providing the recycling factory 6 and manufacturing factory 1 separately from-each other, the recycling process may be implemented within the manufacturing factory 1 itself. Besides, the harmful/hazardous material processing factory 14 may be built integrally with the recycling factory 6 or 7.

Next, the recycle method decision processing system installed in each of the recycling factories 6 and 7 will be elucidated. FIG. 5 shows a configuration of a recycle method decision processing system incorporated in the manufactured article recycling system according to the instant embodiment.

Referring to FIG. 5, the recycle method decision processing system includes a recycle method decision processor unit 29 for making decision as to the recycle processing method, an input unit 34 for inputting information, a recycling factory facility control unit 39 for controlling equipment and others installed within the recycling factory, a use history information accumulating unit 40 for accumulating use history information on an article-by-article basis, a storage unit 350 for storing a database of information concerning the reuse of manufactured articles and a recycle method decision result storage unit 79 for storing the results of the recycle processing methods decided or determined by the recycle method decision processor unit 29.

The input unit 34 is equipped with undermentioned devices or facilities in order to cope with a variety of discarded articles.

For dealing with the discarded article which includes an article information storage for storing article information and an article information output terminal for outputting the article information, there is provided an information output terminal coupling connector 43 which is connected to the article information output terminal of the article for reading out the discarded article information therefrom.

For the discarded article which stores the article information and incorporates a function for sending out information with electromagnetic wave, there is provided an information receiver unit 44 for receiving by wireless the article information sent from the article.

Further, for the discarded article equipped with a removable-type article information storage unit, there is provided an article information storage drive unit 50 for driving the article information storage unit in the removed state.

For the purpose of visually reading out the article information indicated on a housing or case of the discarded article, there are provided a keyboard 45 and a mouse 47 for allowing the article information to be inputted manually.

A bar code reading device 46 is provided in order to read out and input the article information indicated in the form of a bar code on a housing or the like enclosure of the discarded article.

The recycle method decision processor unit 29 further includes a recycle method decision module 31 which stores therein a recycle processing decision procedure 32 and a recycle procedure generating module 33 for generating a recycle processing method for the discarded article for which the recycle processing method has been determined or decided. Addition ally, by taking into consideration the necessity of modifying the recycling rules and the recycle method decision procedure, as occasion demands, since new recycle processing methods will be developed from one to another with the optimal recycle processing method changing correspondingly, the system of concern is provided with a recycle method decision procedure editing module 30 in order to make it possible to correct or modify the recycle method decision procedure.

Parenthetically, in conjunction with the recycling rules and the recycle method decision procedures based thereon, it is advantageous from the viewpoint of management or administration to determine a section for managing the recycling rules and the recycle method decision procedures based thereon on a company-by-company basis to thereby manage en bloc generation of the recycling rules and the recycle method decision procedures, storage thereof as a database, correction thereof and other relevant activities. In that case, the recycling factories 6 and 7 should be provided with facility for accessing the database mentioned above in order to obtain the recycling rules updated latest as well as the recycle method decision procedure based thereon so that the recycling rules and the recycle method decision procedure can be stored in a recycle method decision module 31 incorporated in the recycle method decision processor unit 29 installed in each of the recycling factories 6 and 7.

Besides, the recycling factory facility control unit 39 includes a processing result display device 38 for displaying the results of processings, a disassembling line control unit 42 for controlling disassembling-line facility for the recycling, and an information output printer 48 for printing out the results of the processings and other data.

As the databases to be stored in the storage unit 350, there may be mentioned a statutory regulation/standard information database 36 for storing information of various legal or statutory regulations and standards, a material/part-based recycle method database 37 for storing recycle processing methods on a material-by-material basis and on a part-by-part basis, an article specifications information database 35 for storing article specifications information and a market information database 41 for storing information concerning market prices of used articles, part demand information and the like.

Figure 28:
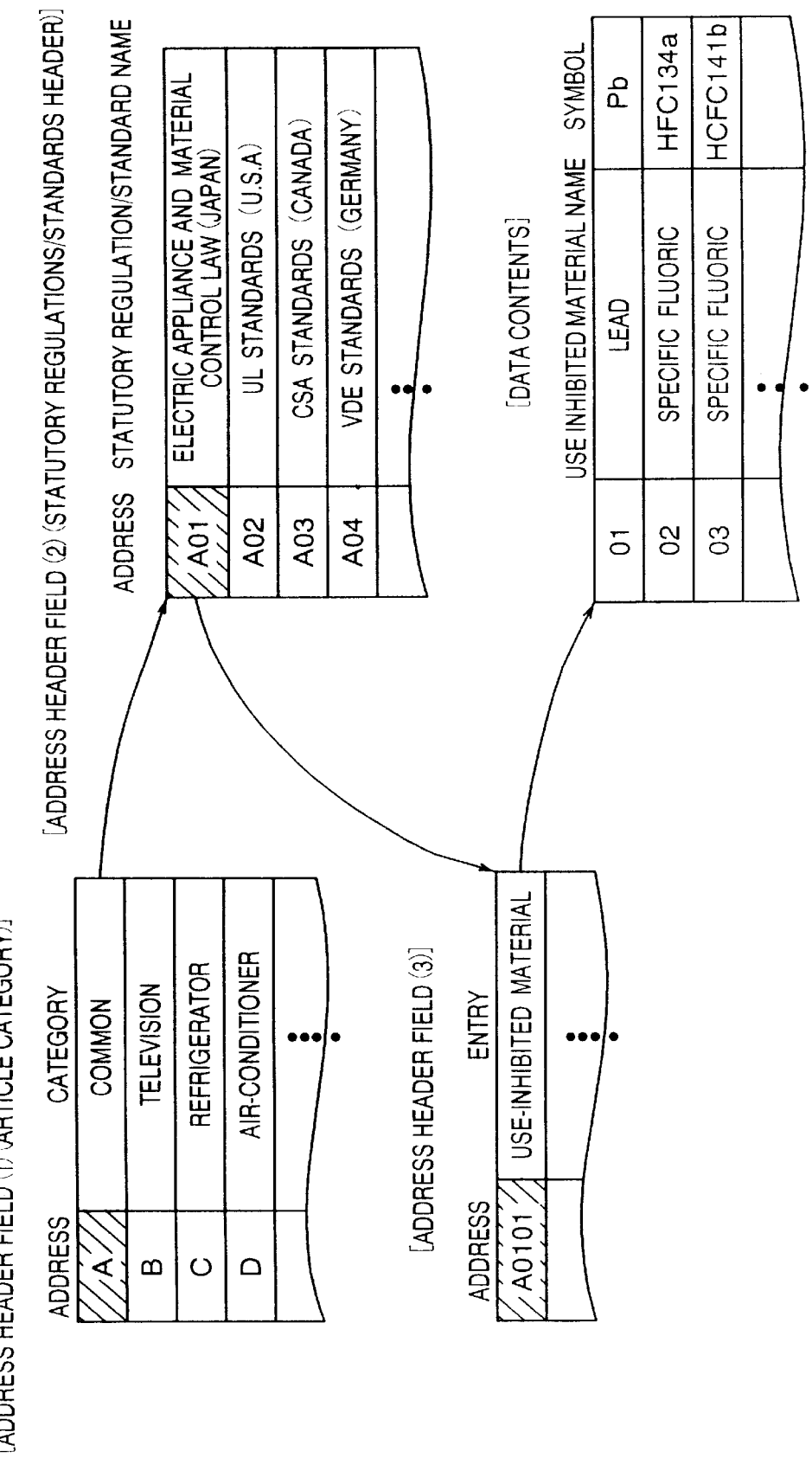
FIG. 28 is a view illustrating, by way of example, a statutory regulation/standard information database.

The statutory regulation/standard information database 36 stores therein statutory regulation information and standards information in various countries, as can be seen from FIG. 28. The statutory regulation information is obtained from official gazettes or the like and stored in the statutory regulation/standard information database 36 internally of an enterprise concerned. Similarly, the information concerning the standards can be obtained from the organizations in charge of controlling the standards and stored in the database internally of the enterprise. In that case, it is preferred to prepare the databases by arranging orderly the information on the basis of categories of the articles. Referring to FIG. 28, the statutory regulation/standard information database 36 stores therein legal controls or statutory regulations in every countries of concern on an article-by-article basis. By way of example, concerning the legal control common to electric articles, there may be mentioned the Electric Appliance And Material Control Law, in which lead, specific fluorics and the like are stipulated as materials or substances whose use is statutorily inhibited.

On the other hand, a material/part-based recycle method database 37 is designed to store therein information concerning the recycle processing method on a material/part basis, as can be seen in FIG. 29. The recycle processing method information is also managed as a database implemented in the form of tables on a material/part basis internally of the enterprise. To this end, the material/part-based recycle method database 37 is so realized as to store the recycle processing method for each of the parts constituting an article as well as the recycle processing method for each of the materials of the parts constituting the article, as is shown in FIG. 29. By way of example, in the case where the article of concern is a color television, such a processing method is stored as a component parts-based recycle processing method that a cathode ray tube assembly or CRT ASSY which constitutes a part of the television is sent to a CRT-dedicated processing factory after removal of belongings thereof such as a deflecting yoke and other.

In the article specifications information database 35, there is previously stored the article specifications information, as shown in FIG. 7. This information is also stored orderly in the form of a database on the basis of manufacturer name, category of article, model name and others, respectively, internally of the enterprise. Referring to FIG. 7, the article specifications information is affixed to each of manufactured articles when they are shipped and may store category of article indicating name of the manufactured article, manufacturer name, model name, manufacture ID number and the restoration-allowable life limit as the basic information and addition-ally size, outer dimensions, weight and dissipation power as the design information as well as the name of component part, material thereof, material/part manufacturer, grade, weight, number, restoration-destined article, use history, part exchange date, etc., respectively, as the component part information. These article specifications information may be stored on an article basis or stored en bloc for all the articles as a database.

In the market information database 41, there are stored information concerning the market prices of the used articles, stock information of the parts for maintenance, information concerning the demand for the articles of concern, etc., internally of the enterprise or company, as shown in FIG. 30. By way of example, the market information database 41 stores therein the market prices of the used articles for each of the types of the articles so that the market price information can be obtained when the restored article such as the restored televisions are to be recycled as the used article, as can be seen from FIG. 30. Besides, the information concerning the market prices of the used component parts of the article is also stored so that the market prices of the parts can be made available when they are to be recycled as the used parts.

Works for inputting the information into the individual databases as well as works for maintenance/management of the data such as correction or modification thereof may be performed internally of each enterprise as mentioned above. As an alternative, such works may be performed by a common organization established by a plurality of manufacturers of the same trade or by an official corporation.

Figure 2:
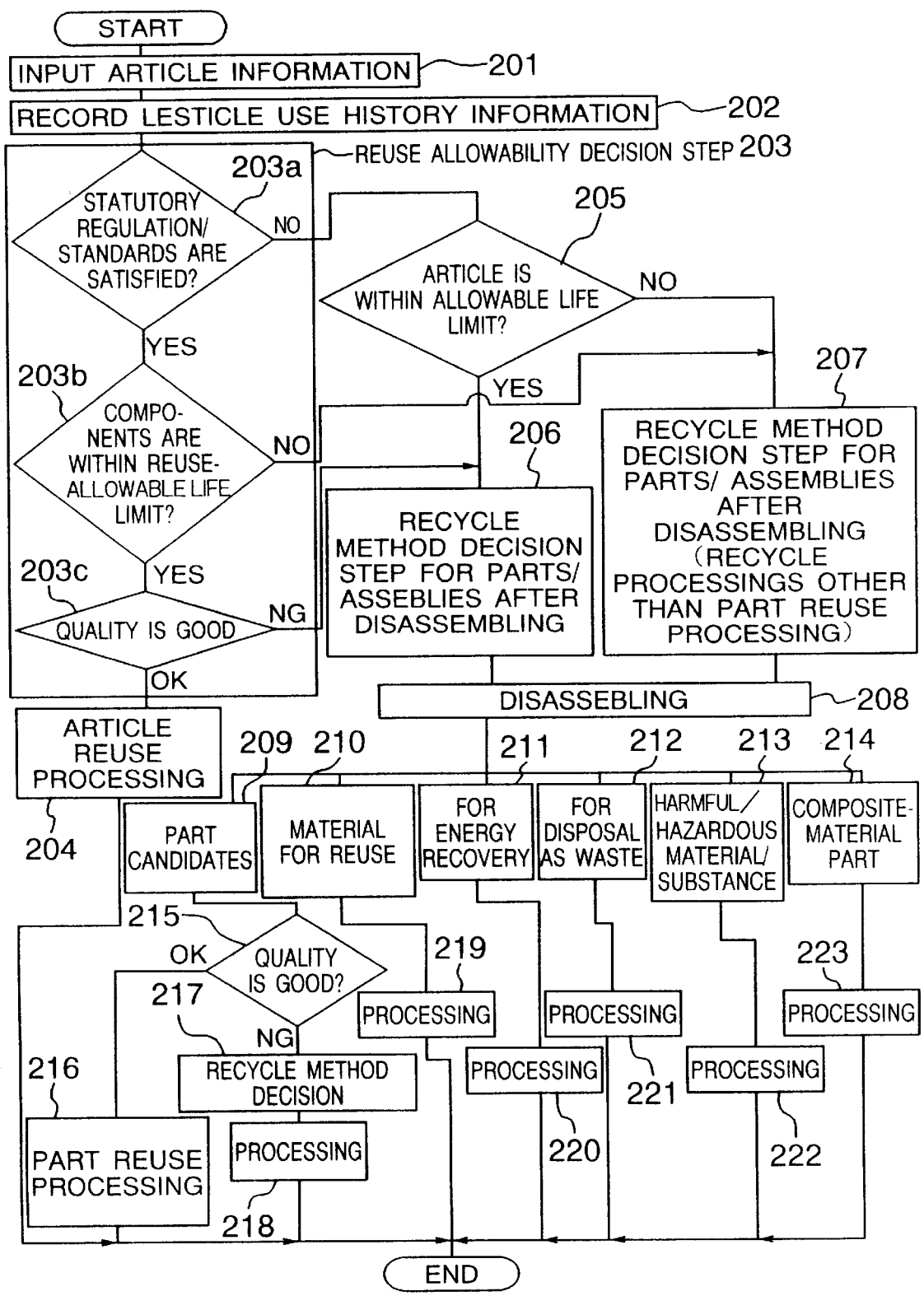
FIG. 2 is a flow chart showing a recycle method decision procedure and a recycle processing executing procedure.

Next, description will turn to the recycle method decision procedure in the system described above. FIG. 2 shows a recycle method decision procedure and a recycle processing executing procedure.

Referring to FIG. 2, upon reception of a discarded television by the recycling factories 6 and 7, information concerning the discarded television inputted from the article specifications information database 35 shown in FIG. 5 is acquired (step 201), whereon the recycle processing method for the discarded television is decided on the basis of the acquired information. For deciding the recycle processing method, it is first determined whether the discarded television can be restored as a useful article in a restoration capability decision step 203 which is-composed of three steps mentioned below.

Step 203a for deciding whether or not the discarded television of concern satisfies the statutory regulation or standards which are to be met for the resale.

Step 203b for deciding whether or not the discarded television falls within a predetermined restoration-allowable life limit. Step 203c for deciding whether or not the discarded television can clear quality inspection standards determined previously.

The discarded television which satisfies all the three conditions mentioned above is decided as the article which is to undergo the article restoration processing (step 204).

On the other hand, when any one of the three conditions mentioned above is not satisfied, the discarded article of concern is transferred to other recycle processing than the article restoration processing. More specifically, the recycle processing method is determined for each of component parts of the discarded article which can not pass the above-mentioned test, whereupon the relevant recycle processings are executed. In that case, however, the recycle method decision procedure becomes different in dependence on whether the discarded television of concern falls within the restoration-allowable life limit or exceeds that life limit.

More specifically, in the step 203a, the discarded television which is decided as not satisfying the relevant statutory regulations and standards is then decided as to whether or not it falls within the restoration-allowable life limit (step 205). For the component parts of the discarded television which has not yet reached the restoration-allowable life limit, decision concerning the recycle processing of the component parts is made in a step 206 while for the component parts of the discarded television which is beyond the restoration-allowable life limit, decision as to the recycle processing is made in a step 207. For the discarded television which has been decided as not meeting the quality criteria in the step 203c, the recycle processing methods for the component parts thereof are decided in a step 206.

Next, description will be directed to the recycle method decision procedures for the component parts undergone the decision processings in the steps 206 and 207, respectively.

Figure 3:
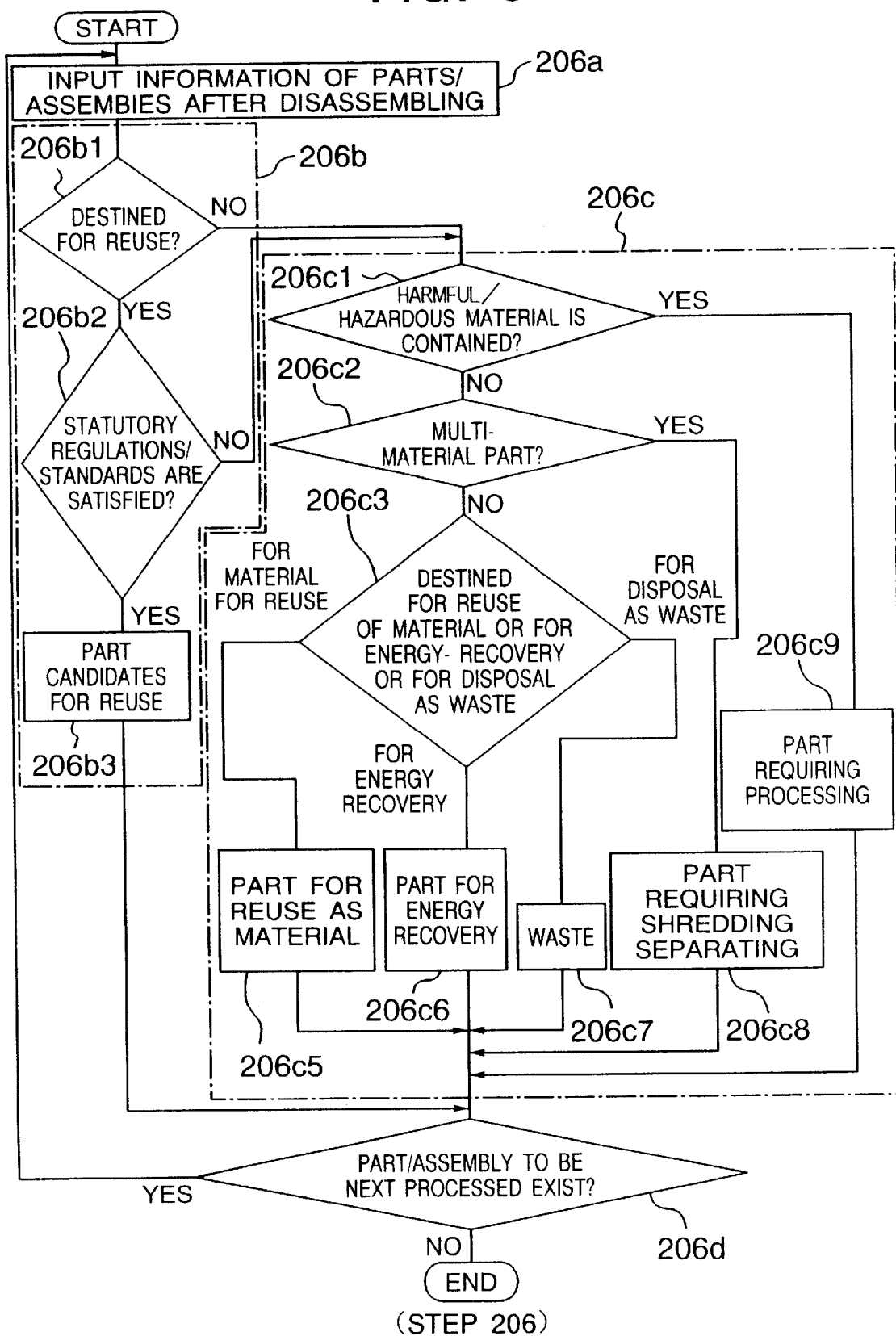
FIG. 3 is a flow chart illustrating a recycle processing step decision procedure for component parts/assemblies after disassembling.

FIG. 3 illustrates a recycle method decision procedure for component parts exited the step 206.

At first, from the information concerning the component parts constituting the discarded television as well as the information concerning the disassembling of the discarded television which is stored in the article specifications information database 35, information concerning the parts and the assemblies which are separated when the discarded television is disassembled or decomposed is extracted for each of the parts and the assemblies (step 206a), whereupon decision is made as to whether the parts or the assemblies can be reused in a step 206b. The parts or the assemblies which satisfies both the conditions that the parts or the assemblies can be reused (206b1) and that the parts or the assemblies meet the statutory regulations and the standards to be satisfied (206b2) are decided as reusable part candidates (206b3). On the contrary, unless any of the conditions mentioned above is satisfied, the processing proceeds to the step 206c where the other recycle processing method than the reusing of the component parts is determined for those which do not satisfy any one of the two conditions mentioned above.

More specifically, the step 206c includes three steps mentioned below for determining the other recycle processing method for the parts or assemblies. (1) It is decided whether or not the parts or assemblies of concern contain harmful material(s) and/or hazardous materials (206c1). The parts or assemblies containing the harmful/hazardous material(s) are decided as having to undergo special treatment or processing (206c9), while those containing no such material(s) are transferred to a succeeding decision processing step.

(2) Decision is then made as to whether or not the parts and/or the assemblies of concern are multi-material parts (206c2). When the parts and/or the assemblies are multi-material parts, it is then decided that fragmentation (shredding)/classification (sorting) processing is required for them (206c8), while those which are decided as not being the multi-material parts are transferred to a succeeding decision step.

(3) It is decided whether the pars and/or the assemblies are those destined for restoration-destined material or for recovery of energy or for disposal as waste (206c3).

The part and/or assembly satisfying the condition for the restoration-destined material are then decided as the resource for the restoration-destined material (206c5), while those satisfying the condition for the energy recovery are decided as the resource for recovering energy therefrom (206c6), whereas those satisfying none of the above conditions are decided as the waste parts (206c7). The recycle processing decisions are carried out for all the parts and/or the assemblies removed separately upon decomposition of the discarded television.

In the foregoing, the contents of the recycle method decision procedure executed in the step 206 for the component parts have been described.

Figure 4:
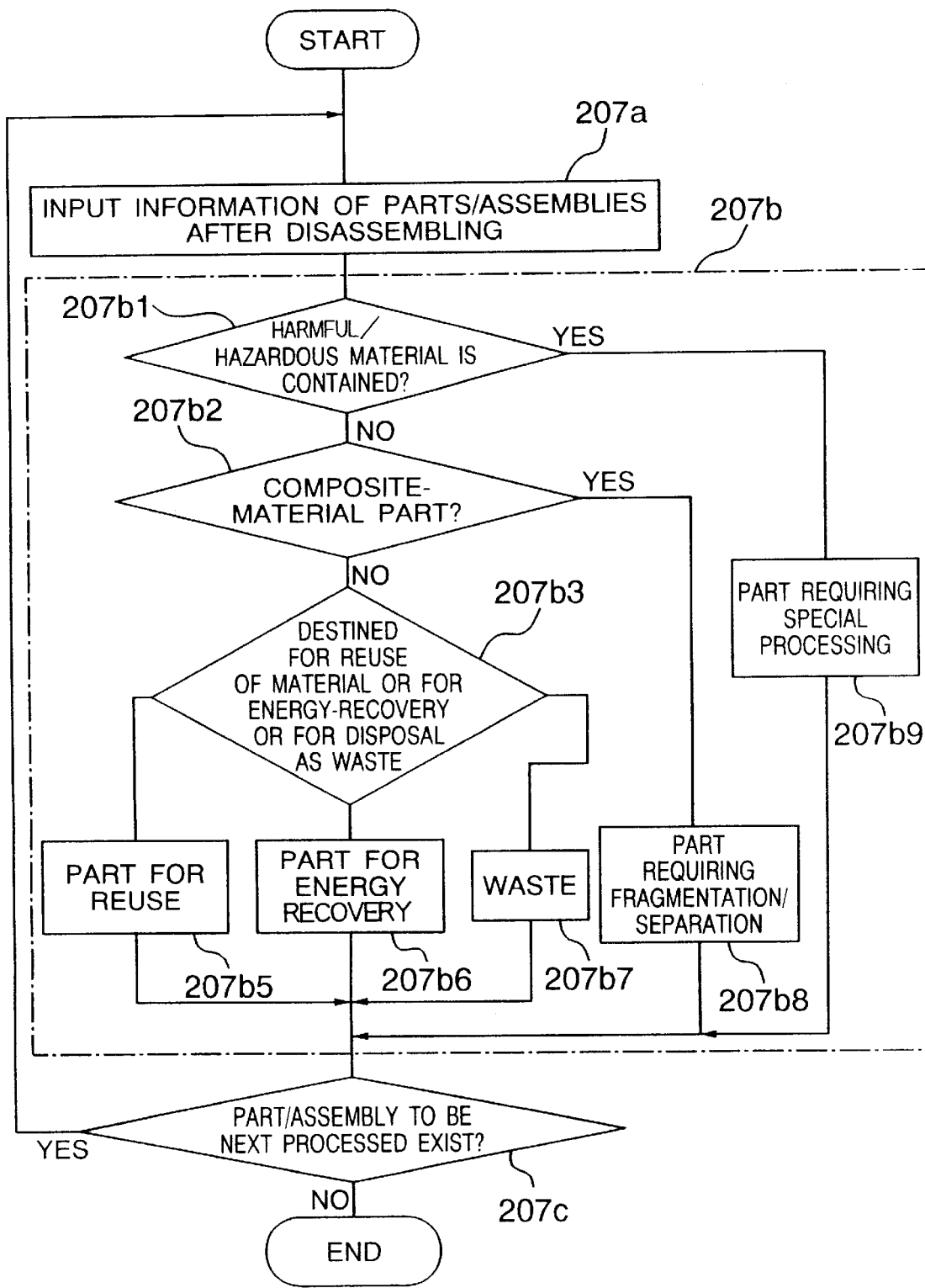
FIG. 4 is a flow chart for illustrating a recycle processing method decision step for component parts/assemblies after disassembling.

Next, description will turn to the recycle method decision procedure for the component parts undergone the processing step 207. FIG. 4 illustrates in detail the recycle method decision procedure executed in the step 207. The processing shown in FIG. 4 is designed to determine the processing methods for those component parts which exceed the restoration-allowable life limit. Consequently, the processing of FIG. 4 is equivalent to that shown in FIG. 3 except for the procedure starting from the step 206 and ending in the reusability decision step.

Referring to FIG. 4, the information concerning the parts or assemblies separated or detached upon disintegration of the discarded televisions is derived from the information concerning the disassemble information of the discarded televisions as well as the information concerning the component parts constituting the discarded televisions (step 207a). Thereafter, the recycle processing methods other than those for the reuse of the parts and the assemblies are decided (207b1 to 207b3), as described hereinbefore in conjunction with the step 206c, and then it is decided on the basis of the result of the decision processing mentioned just above whether the parts and/or the assemblies are for the restoration-destined material or for the recovery of energy or for the fragmentation (shredding)/classification processing or alternatively for the specific treatments because of harmful materials and/or hazardous materials as contained (207b5 to 207b9). This processing routine is executed for all the parts or the assemblies detached and separated from one another upon disassembling of the discarded televisions.

Description will again be directed to the processing illustrated in FIG. 2.

After the recycle processing methods have been determined for the component parts of the discarded television in the steps 206 and 207 as mentioned above, the discarded television is decomposed or disassembled on the basis of the disassemble information of the discarded television (step 208), and the component parts mentioned above are separated or classified to be subsequently processed on the basis of the result of the component part recycle processing method decision (step 209 to 223). The reuse-destined part candidates (step 209) are then checked or inspected as to the quality, whereon decision is made whether they can be reused or not (step 216), which in turn is followed by a part reuse processing (step 216), while for those parts which can not be reused, decision is made as to what processings or treatments they have to undergo except for the reuse-destined processing (step 217), whereon the processing based on the result of the above decision is performed. At that time, for the assembly which is inhibited from the reuse, the recycle processing method is determined for each of the parts constituting the assembly. Thereafter, the parts which are not reusable undergo respective recycle processings in accordance with the result of the aforementioned decision.

Of course, the parts and the assemblies separated or classified in dependence on the recycle processing methods (step 210 to step 214) are subjected to the corresponding recycle processings, respectively. Among them, in the recycle processing for the multi-material parts (resulting from the processing step 223), they are fragmentated to be subsequently separated into the restoration-destined materials and the energy-recovery-destined materials. In this way, the recycle processing method decision/execution procedure is executed for the discarded article. The recycle processing method decision/execution in the instant system now under consideration is characterized in that such recycle processing methods are determined which exert adverse influence to the environment as little as possible while taking it into consideration to put the discarded articles into reuse without burning or disposing of them as the waste articles. In other words, the recycle processing methods are discriminatively determined to be subsequently executed in accordance with such "recycling rules" that discarded articles are transformed to restored articles to a possible maximum extent so long as the requirements imposed by the statutory regulations or the standards are satisfied, while for those discarded articles which can not be restored, the component parts or assemblies thereof which are reusable are processed to the state suited for the reuse, wherein those discarded articles from which no reusable parts or assemblies can be recovered are checked as to the possibility of reuse as the resource materials, while for those discarded articles having parts and assemblies which can not clear the requirements for the reuse as mentioned above are checked as to the possibility of reuse as the materials for energy recovery (for oil extraction, conversion to ethanol, transformation to solid fuel material and, if otherwise, burning). Finally, the discarded articles as well as the component parts and/or assemblies thereof are disposed of as the waste for a landfill.

Parenthetically, it will equally be possible to check the reusability of harmful articles as well as hazardous article after having conducted proper treatments on them.

For the decision or determination of the recycle processing methods described hereinbefore, there are required databases for storing a variety of information or data. Next, description will be made of the information which is necessary for the decision or determination of the recycle processing methods.

The information may generally be classified into four kinds of information, i.e., (1) article specifications information of discarded articles, (2) article use history information, (3) statutory regulation/standard information, (4) recycle processing method information on a part/material basis, and (5) market information. These kinds of information have respective contents and sources from which they can be acquired or available, as follows:

(1) Article Specifications Information (Details of Which are Illustrated in FIG. 7)
   (a) Basic Information
   Contents: manufacturer name, category of article, article name, model name, manufactured date and manufacture ID number.
   Available information source: discarded articles
   (b) Design Information
   Contents: outer dimensions, weight, performance information (such as dissipation power), information of component parts (part number, part name, manufacturer, model name, material, material manufacturer, weight, information concerning harmful/hazardous parts, information concerning reusable part candidate, use history, etc.), disassembling method, assembling method, quality check method, etc.
   Available information sources: discarded articles or article information database provided externally of the discarded article (2) Article Use History Information (Details of Which are Illustrated in FIG. 8)
   Contents: power supply time duration, number of sequential times power supply have been turned on/off, environmental temperature at which manufactured article is used, etc.
   Available information sources: discarded articles, as described later on.

(3) Statutory Regulation/Standard Information (Details of Which are Illustrated in FIG. 28)
   Contents: statutory regulation/standard information to be abode by for dealing commercially the manufactured articles
   Available information source: statutory regulation/standard information database provided externally of discarded articles (4) Recycle Processing Method (Details of Which are Illustrated in FIG. 29)
   Contents: information concerning recycle processing methods on a material/part basis.
   Available information sources: recycle processing method information database on a material/part basis provided externally of discarded articles (5) Market Information (Details of Which, i.e., Used Article Information, are Illustrated in FIG. 30)
   Contents: information of market prices of used articles, part demand information, etc.
   Available information source: market information database of discarded articles provided externally thereof Next, exemplary modes of processings executed in the recycling factories 6 and 7 inclusive of the methods of acquiring the information of the types mentioned above will be described.

It is first conceivable to impart the recycle-destined article with features or facilities mentioned below in order to make available easily the basic article information.

Figure 6:
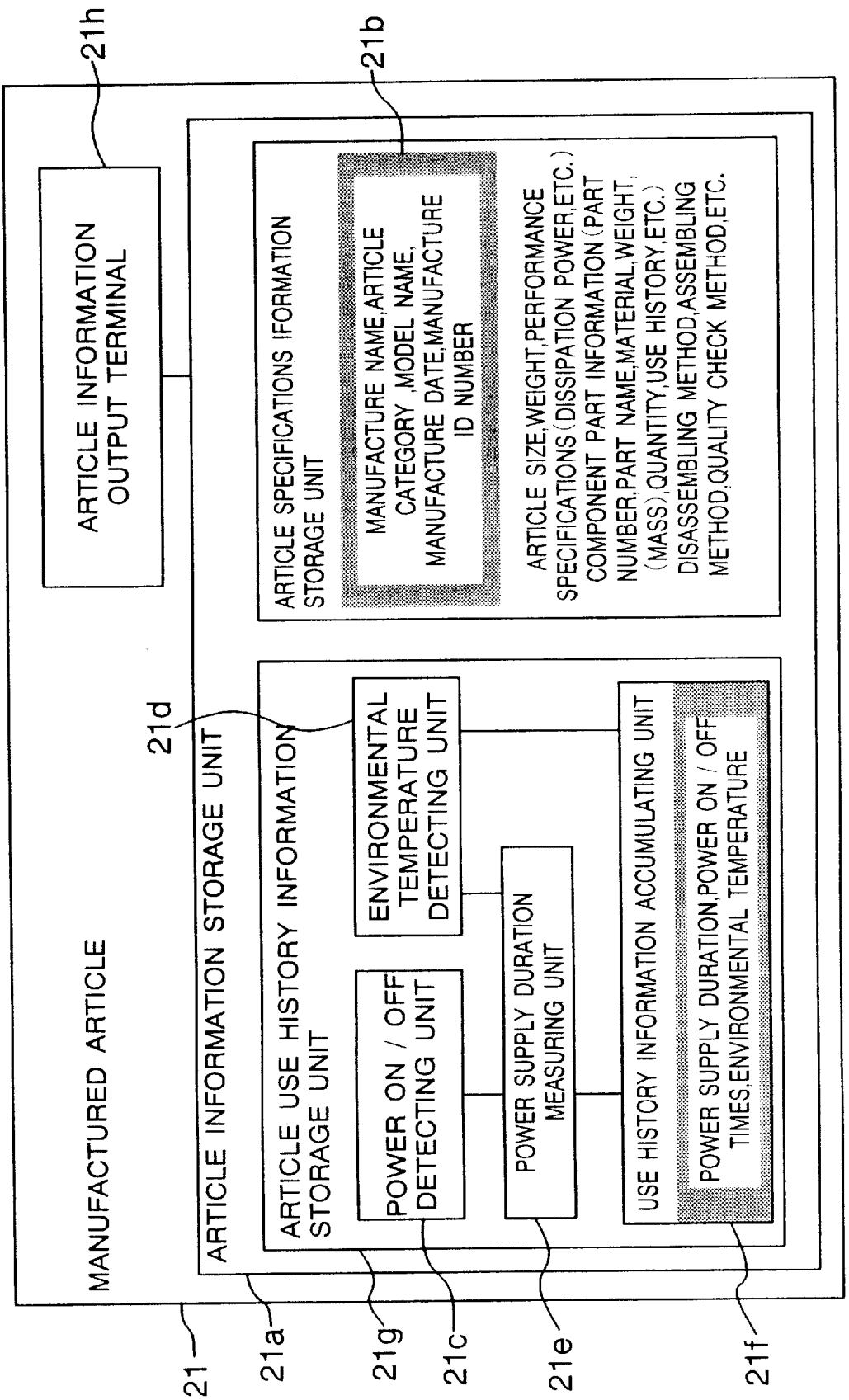
FIG. 6 is a view for illustrating, by way of example, a structure of a manufactured article.

FIG. 6 illustrates, by way of example, a structure of a manufactured article. As can be seen in FIG. 6, the manufactured article as illustrated is previously provided with an article specifications information storage unit or memory 21b for storing the article specifications information such as mentioned above at (1), (a) and (b), an article use history information storage unit or memory 21g for storing the article use history information mentioned above at (2), and an article information output terminal 21h for outputting the information stored in the article specifications information storage unit or memory 21b and the article use history information storage unit or memory 21g. In the manufacturing factory 1 shown in FIG. 1, the article specifications information shown in FIG. 7 is previously stored in the memory constituting the article specifications information storage unit 21b upon manufacturing of the article before shipping thereof. To this end, the article specifications information storage unit 21b is provided with an address header for storing addresses and headers stored at relevant addresses, respectively, and a data field divided into areas in correspondence to the addresses, respectively, for storing the article specifications information for the individual headers allocated to the addresses, respectively, as can be seen in FIG. 7. In this conjunction, the items mentioned above at (1), (a) and (b) may be used as the headers, wherein each of the headers may include items to be stored.

Next, description will be directed to a method of storing cumulatively the article use history information by referring to FIG. 8 which is a view for illustrating cumulative storage or accumulation of data of the article use history information.

As is shown in FIG. 6, the article history information storage unit 21g is equipped with a power supply on/off detecting unit 21c for detecting power supply on/off of the associated manufactured article, a power supply duration measuring unit 21e for measuring a power supply duration elapsed from turn-on of the power supply to turn-off thereof, an environmental temperature detecting unit 21d for measuring the temperature of the article during a period in which electric power is supplied and a history information accumulating unit 21f for storing article use history information such as power supply duration, number of times the power supply has been turned on and off, environmental or ambient temperature, etc. The power supply on/off detecting unit 21c, the power supply duration measuring unit 21e and the environmental temperature detecting unit 21d may be provided externally of the article history information storage unit 21g in place of providing them internally of the article history information storage unit 21g.

Data of the article use history information stored in the history information accumulating unit or memory 21f is composed of (a) power-on times data, (b) power supply duration data and (c) flag data indicating whether or not the environmental temperature at which the manufactured article has been used or operated has exceeded a preset specified upper limit value of the article, as can be seen from the data structure illustrated in FIG. 8. (a) The data indicating the power-on times is recorded or updated every time the power supply is turned on. (b) The power supply duration data is recorded or updated every time the power supply is tuned on and off. (c) The flag data indicating whether the preset specified upper limit value of the environmental temperature at which the article is operated or used is exceeded or not is set to "1" when the upper limit value of the environmental temperature is exceeded and, if otherwise, set to "0". Furthermore, when the flag data is set to "1", a time period during which the environmental temperature has exceeded the upper limit of the specification value is recorded as one of power supply duration data, for example, in such a manner as illustrated at (EXAMPLE 1) in FIG. 8.

These data are detected and stored in the manners described below. When the power supply to an manufactured article of concern is started, the power supply on/off detecting unit 21c shown in FIG. 6 detects this power-on event to thereby activate a timer incorporated in the power supply duration measuring unit 21e. At that time point, the power-on information is supplied to the history information accumulating unit 21f through the medium of the power supply duration measuring unit 21e, in response to which the history information accumulating unit 21f records on the memory the instant number of times the power supply is turned on. In the "EXAMPLE 2" shown in FIG. 8, it is assumed that the power supply is turned on second time. Accordingly, the preceding power-on sequential times data "1" (i.e., data stored at the address (a) on a first (1) row) is added with "1" (one), whereupon numerical value "2" resulting from the above addition is recorded at the address (a) on a second (2) row. Assuming, by way of example, that the power supply is turned off after lapse of five hours after the power-on, the power supply on/off detecting unit 21c detects the power-off to thereby allow operation of the timer of the power supply duration measuring unit 21e to be stopped, and then the power supply duration data "5" generated by the power supply duration measuring unit 21e for the power supply duration from the power-on to the power-off is outputted to be supplied to the history information accumulating unit 21f, in response to which the history information accumulating unit 21f records the power supply duration data "5" at the address (b) on a second (2) row. In this assumed case, since the upper limit value of the specification value of the environmental temperature is not exceeded during the power supply duration, "0" is recorded at the address (c) on the second (2) row. Parenthetically, the environmental temperature detecting unit 21d may be implemented by using a temperature detecting element such as a thermistor for detecting the temperature of operation environment. Further, in order to hold the record of data even after the power supply is turned off, a power supply source such as a cell may be provided for supplying an electric power to the history information accumulating unit 21f after the main power supply has been interrupted. Addition-ally, as a method of disabling the data recording after the power-off, there may be mentioned such a method in which the data is updated at a relatively high frequency (e.g. once per five minutes). According to this method, the power supply duration can be determined on the basis of the frequency at which the data has been updated, although accuracy of the time measurement is poor more or less. At this juncture, it should be added that although in the case of the instant embodiment, the power supply duration is indicated in hour, it may equally be recorded in minute.

Next, by reference to "EXAMPLE 2" shown in FIG. 8, description will be made of a case where the environmental temperature at which a manufactured article is operated or used exceeds the upper limit value of the environmental temperature specifications. By way of example, let's assume that the power supply to the article of concern is turned on third time. In that case, the-power supply on/off detecting unit 21c detects the power-on, to thereby actuate the timer incorporated in the power supply duration measuring unit 21e, whereby the number of sequential power-on times, i.e., "3" is recorded on the memory (at the address (a) on the third (3) row). Subsequently, when the environmental temperature starts to rise up beyond the upper limit value of the environmental temperature specification upon lapse of two hours from the power-on, the environmental temperature detecting unit 21d detects this temperature rise, to thereby send a corresponding signal to the power supply duration measuring unit 21e, in response to which the power supply duration measuring unit 21e outputs the value of the power supply duration as measured up to that time point, the output data being then supplied to the history information accumulating unit 21f. Addition-ally, the power supply duration measuring unit 21e in turn resets the timer to allow the measurement of the power supply duration to be started. In the history information accumulating unit 21f, the time data "2" is recorded in the memory (at the address (b) on the third (3) row). Since the time data of two hours does not exceed the upper limit value of the environmental temperature specification, data "0" is recorded at the address (c) on the third (3) row. Subsequently, when the environmental temperature resumes the upper limit value of the environmental temperature specification upon lapse of two hours from the power-on, the environmental temperature detecting unit 21d detects this temperature rise, to thereby send a corresponding signal to the power supply duration measuring unit 21e, in response to which the power supply duration measuring unit 21e in turn outputs the value of the power supply duration as measured up to that time point, the output data being then supplied to the history information accumulating unit 21f. Addition-ally, the power supply duration measuring unit 21e resets the timer to allow the measurement of the power supply duration to be started. In the history information accumulating unit 21f, the time data "3" is recorded in the memory (at the address (b) on the fourth (4) row) while data "1" indicating excess of the environmental temperature is recorded in the memory (address (c) on the fourth (4) row). In this case, data "3" is recorded at the address of the power-on sequential times data (address (a) on the fourth (4) row). Further, in the case where the power supply is turned off after lapse of two-hour power supply duration at the environmental temperature falling within the specification environmental temperature range, the power supply on/off detecting unit 21c detects the power-off to thereby allow operation of the timer of the power supply duration measuring unit 21e to be stopped, and then the power supply duration data "2" generated by the power supply duration measuring unit 21e for the power supply duration from the time point where the environmental temperature resumes the specification environmental temperature range to the power-off time point is outputted to be supplied to the history information accumulating unit 21f, in response to which the history information accumulating unit 21f records the power supply duration data "5" at an address (b) on a fifth (5) row. In this assumed case, since the upper limit value of the specification environmental temperature range is not exceeded during the power supply duration, "0" is recorded at the address (c) on the fifth (5) row and "3" is recorded at the address of the power-on sequential times data (address (a) on the fifth (5) row).

Owing to the method described above, the article use history information can automatically be recorded and accumulated sequentially during the use of the manufactured article by the customer after the shipping thereof.

In this conjunction, the manufactured article may be provided with a function for displaying the use history information so that the use history information such as the accumulated power supply duration and the like can be confirmed, as desired, to thereby allow the article use history information such as the accumulated power supply duration and other to be positively confirmed by any one, which is accompanied with advantages such as mentioned below. The price of a used article can be estimated easily and rapidly. Besides, estimation of the used article can be performed impartially because the article use history information can clearly be grasped by any one. For these reasons, commercial transactions of the used articles tend to be promoted, which contributes to increasing of the use life of the manufactured article, to an advantage. Furthermore, since there is made available a mark which indicates the proper timing for the part exchange, maintenance can be conducted on the manufactured article in advance before the article suffers any trouble. Thus, the use life of the article can be elongated, to another advantage.

Addition ally, the article use history information accumulated in each of the manufactured articles can be read out from the articles at a time point for making decision as to the recycle processing and stored in the history information accumulating unit 40 provided in association with the recycling system installed in the recycling factory. By storing cumulatively or accumulating the article history information in the history information accumulating unit 40, it is possible to take statistics of the use history information of the manufactured articles, for example, on an article-category basis, which in turn means that the status of use of the manufactured articles of concern can quantitatively be grasped, the result of which can be reflected onto the designing of the article at the manufacturer side. Thus, optimal design of given article can be realized. Moreover, owing to the possibility of referencing the article use history information, overspecifications with excessively large margin or underspecifications with excessively small margin can definitely be determined, whereby feedback information for realizing design of the article with optimal specifications is made available. Thus, article to be manufactured can be designed within a range of tolerance which ensures safety and reliability.

As can be understood from the foregoing, the discarded articles are collected in the state in which the article specifications information and the article use history information are stored in the articles themselves to be sent back to the recycling factory 6 or 7 shown in FIG. 1. Each of the discarded articles 21 is provided previously with the article information output terminal 21h so that the information stored internally of the articles can be read out in the recycling factory 6 or 7, as is illustrated in FIG. 6. For reading out the article information, the article information output terminal 21h is connected to an information reading unit through the medium of a connector cable which is connected to the article information output terminal 21h.

In the case of the manufactured article shown in FIG. 6, the article information is read out from the manufactured article of concern by way of the connecting cable. However, as a modification, there may be provided an information transmitter 21n imparted with a function for transmitting by wireless the information, to thereby realize radio information sending. In that case, the information read-out unit may be imparted with a radio information receiving function for acquiring the article information by wireless. As further modifications, there are conceivable in addition to the two exemplary article structures shown in FIGS. 10(a) and 10(b) such an arrangement in which a power-supply input unit 21i dedicated for driving only the article information storage unit 21a is provided in addition to the power supply input function inherent to the manufactured article. By virtue of such arrangement, a driving electric power can be supplied to the article information storage unit 21a by providing the dedicated power-supply input unit 21i even when electric power is not supplied to the article information storage unit 21a due to a fault of the manufactured article, whereby the article information can be read out.

Figure 11:
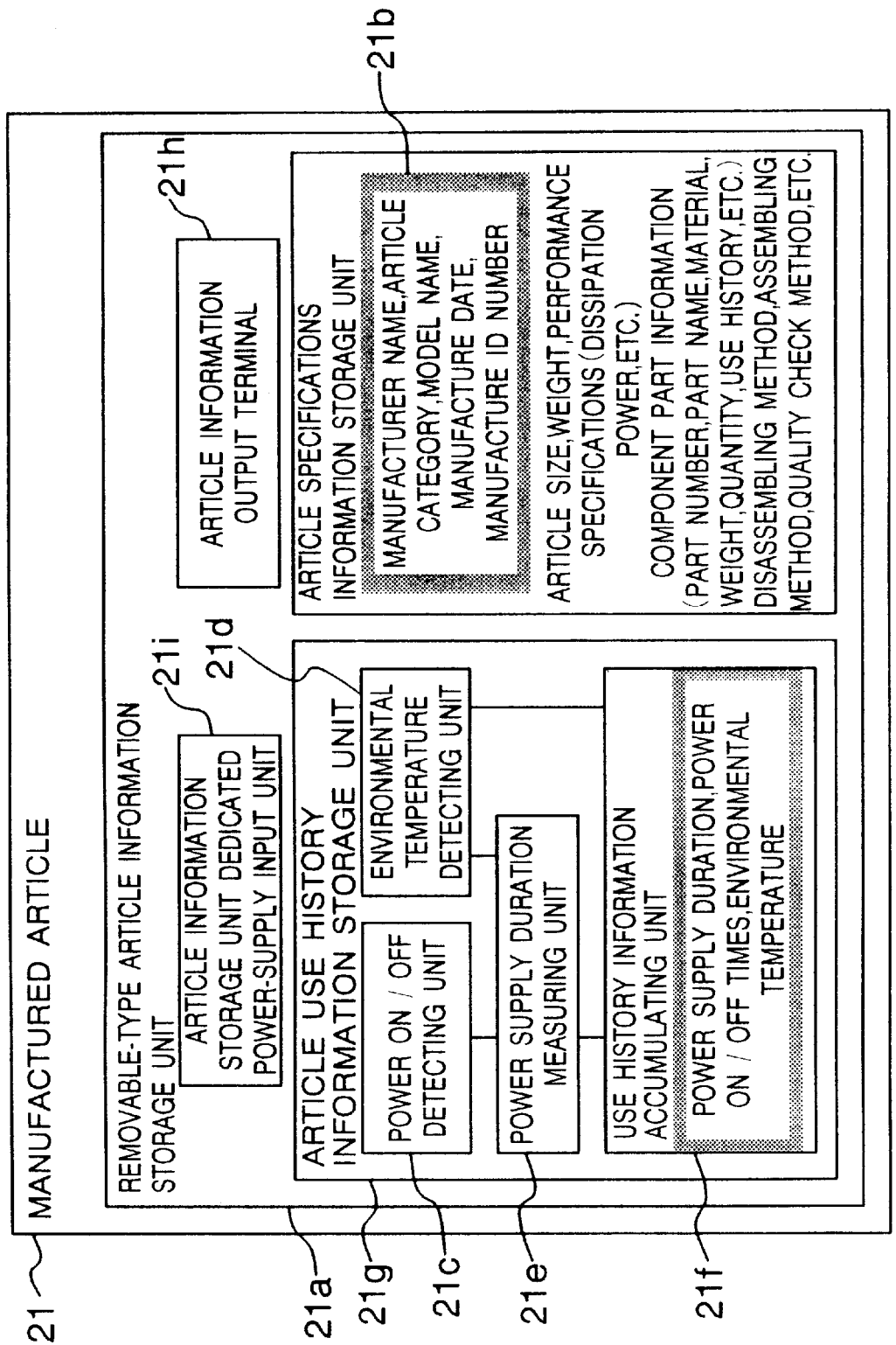
FIG. 11 is a view illustrating an exemplary structure of an article.
Figure 12:
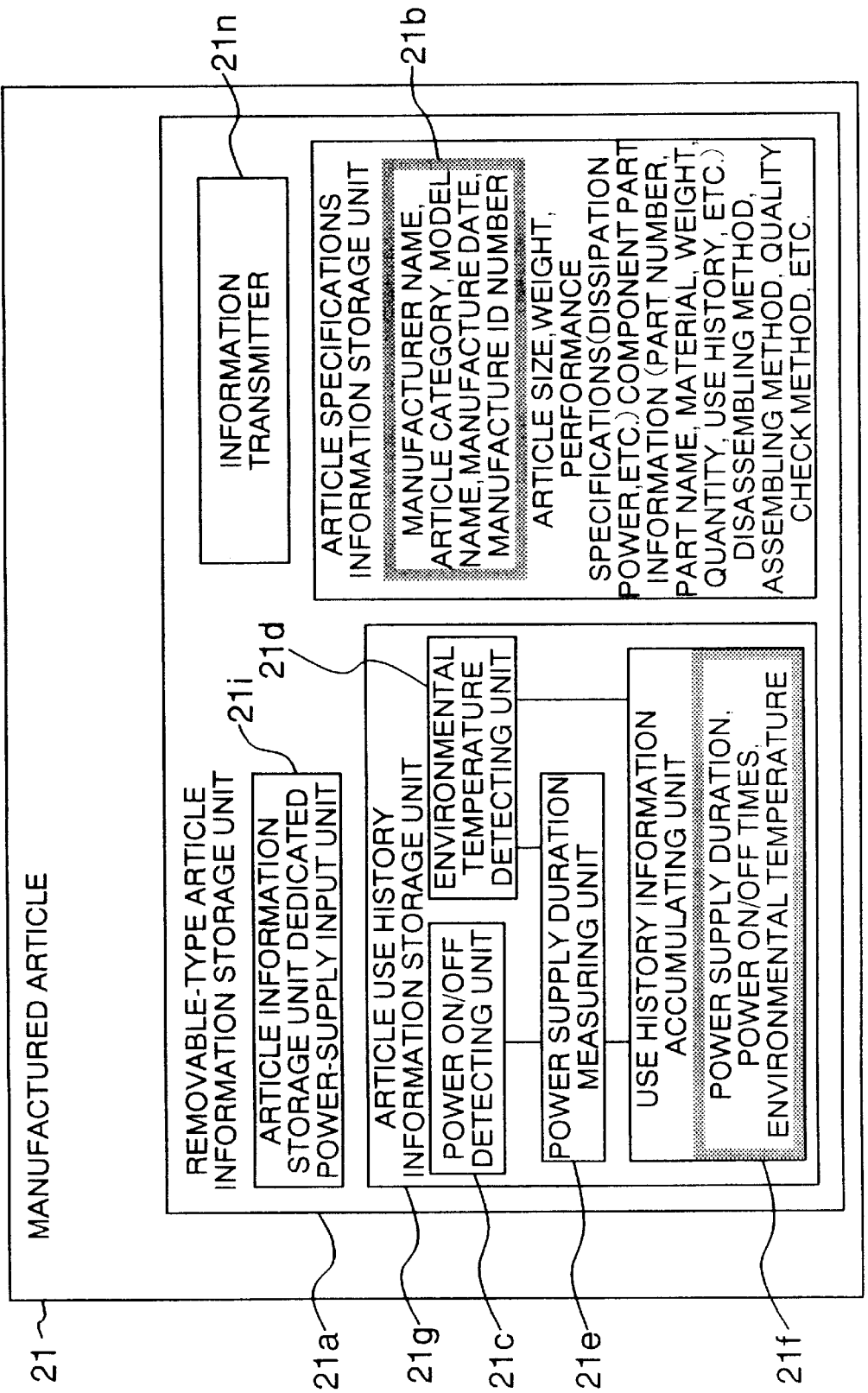
FIG. 12 is a view showing an exemplary structure of an article.

Furthermore, as another example, the article information storage unit 21a may be implemented as a removable unit in such a-manner, as shown in FIG. 11. In that case, in order to allow the article information to be read out from the removed article information storage unit 21a, a driving apparatus is provided separately for driving the article information storage unit 21a. By mounting the article information storage unit 21a in the driving apparatus while connecting the article information output terminal 21h of the article information storage unit 21a to the information reading apparatus, it is possible to read out the article information. Additionally, FIG. 12 shows an exemplary structure of the manufactured article which is provided with the removable article information storage unit 21a imparted with an information transmitting function. The article information storage unit 21a can removably be mounted in the article information storage drive unit 50 to be thereby driven. The article information may be transferred to the information reading apparatus through wireless or radio communication by making use of the radio transmission function.

Furthermore, the other information, i.e., the statutory regulation/standard information (3), the recycle processing method information (4) and the market information (5) can be made available by providing the corresponding databases in the recycling factory.

Next, by reference to FIG. 5, description will be made in detail of the processings executed in the recycle method decision processing system, inclusive of the article information read processing.

At first, a method of reading out the article information from each of the discarded articles will be described.

Figure 13:
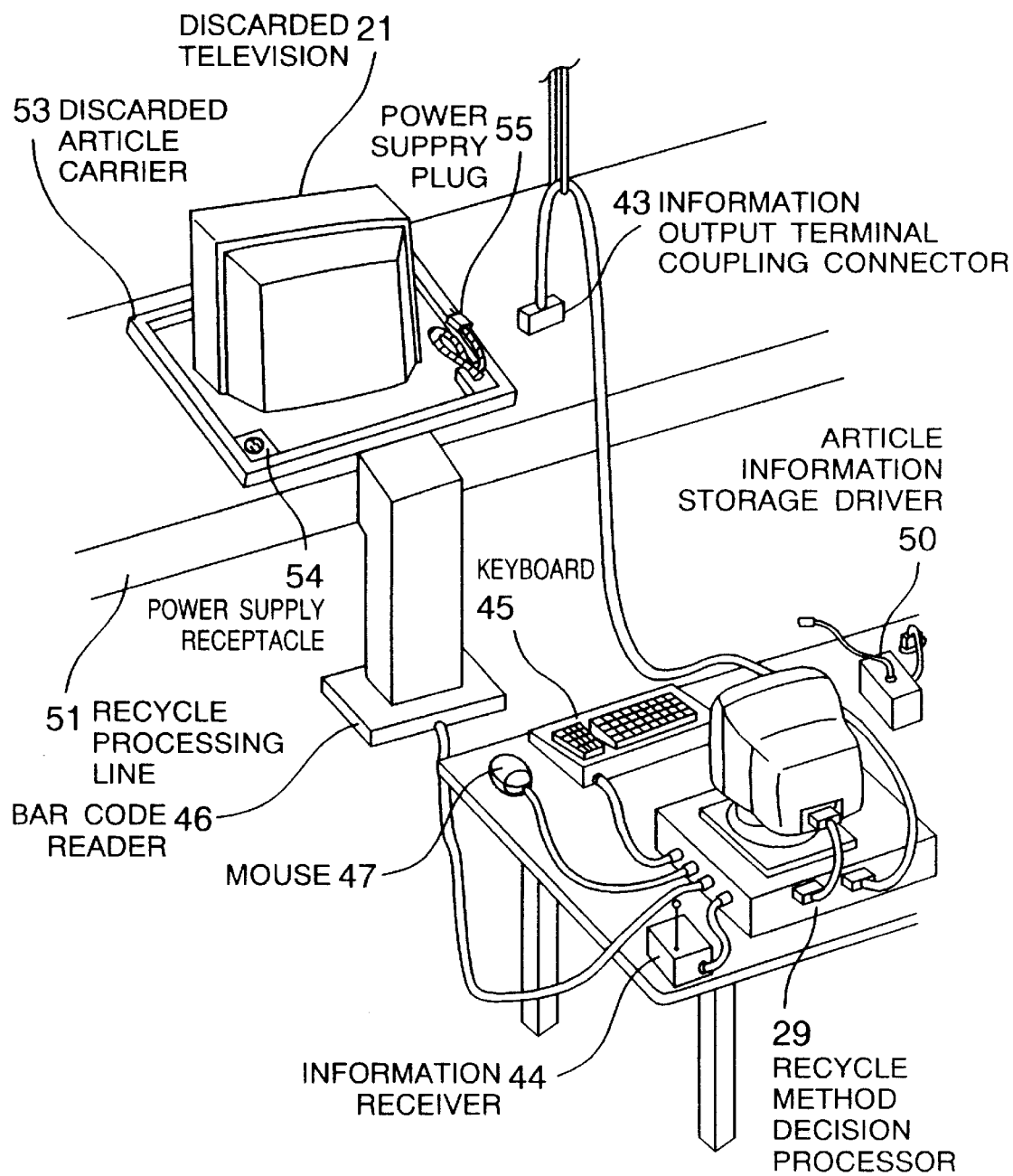
FIG. 13 is a view for illustrating conceptually an article information reading process in a recycling factory.

FIG. 13 illustrates conceptually or pictorially an article information reading process to be conducted on a discarded television in a working field of the recycling factory 6 or 7 show in FIG. 1.

Referring to FIG. 13, a discarded television 21 is placed on a recycle processing line 51. At first, article information of the discarded television is read out to be inputted to the recycle method decision processor unit 29. Because various methods have to be resorted to for reading the article information in dependence on the modes in which the article information is recorded, there are provided the following units for reading out the information, as in the case of the input unit described hereinbefore.
(1) Information output terminal coupling connector 43: destined for reading out the article information stored in a memory incorporated in the discarded article.
(2) Information receiver unit 44: destined for receiving the article information from the article information storage unit incorporated in the discarded article and equipped with the radio transmitter function.
(3) Keyboard 45 and mouse 47: destined for inputting manually the article information printed on a label affixed to a housing or casing of the discarded article and article information indicated directly-on the casing by printing or stamping, both of which information are thus visually read out.
(4) Bar code reading device 46: destined for reading out the article information indicated in the form of a bar code on the casing or the like of the discarded article.

All the units (1) to (4) mentioned above are connected to the recycle method decision processor unit 29. Additionally, auxiliary facilities such as mentioned below may be provided.
(5) Article information storage drive unit 50: destined for use in such type of discarded article which is provided with a removable article information storage unit by removing the article information storage unit from the discarded article to drive it when power supply function of the discarded article is disabled due to failure of a main body of the discarded article.
(6) Power supply receptacle 54 (installed on a discarded article carrier plate 53): destined for supplying electric power to the discarded article and others.
(7) Power supply plug 55 (installed on a discarded article carrier plate 53): destined for coping with the discarded article provided with a power supply input unit dedicated for driving the article information storage unit in addition to a main power supply input unit intrinsic to the manufactured article, in order to make it possible to obtain the article information by inserting a power supply plug 55 into the power supply input unit dedicated for driving the article information storage unit for thereby driving the latter.

Next, referring to FIGS. 16 to 22, description will be made of methods for reading out article information (inclusive of use history information) of the discarded article through the individual input units of the recycle method decision processing system. FIGS. 16 to 22 are views for illustrating exemplary execution modes of the article information reading methods corresponding, respectively, to the article information output modes of the discarded article mentioned above. In FIGS. 16 to 22, a section of the recycle processing line 51 installed in a recycling factory is shown in the state in which a discarded article 21 is transported on and along the recycle processing line 51, being carried by the discarded article carrier plate 53. There may be provided on the discarded article carrier plate 53 a power supply receptacle 54 and a power supply plug 55. Further, as shown, in FIGS. 16 to 22, the recycle method decision processor unit 29 includes as the input units the information output terminal coupling connector 43, the information receiver unit 44, the article information storage the drive unit 50, the keyboard 45, the mouse 47 and the bar code reading device 46 such as mentioned hereinbefore.

Figure 10A:
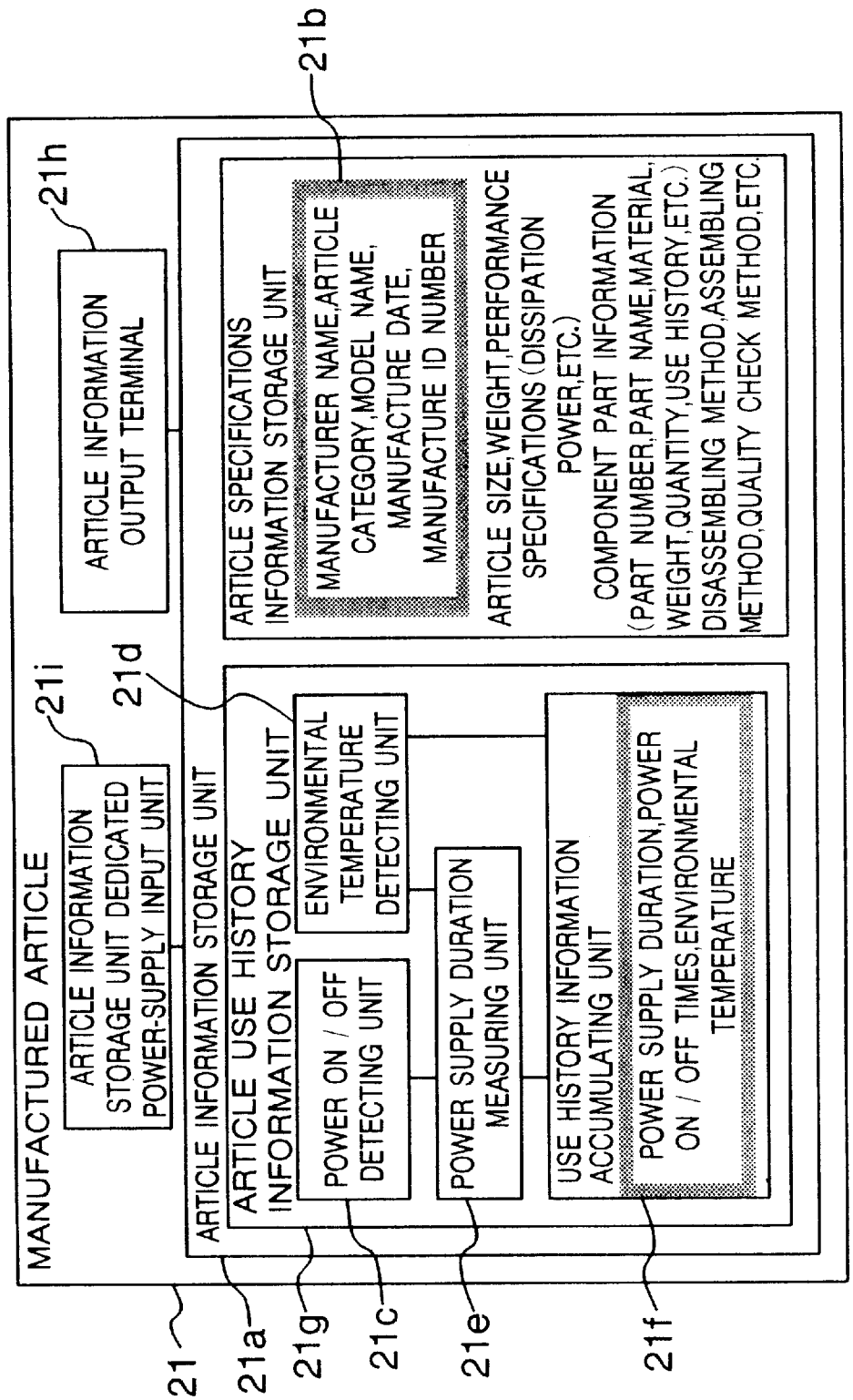
Figure 10B:
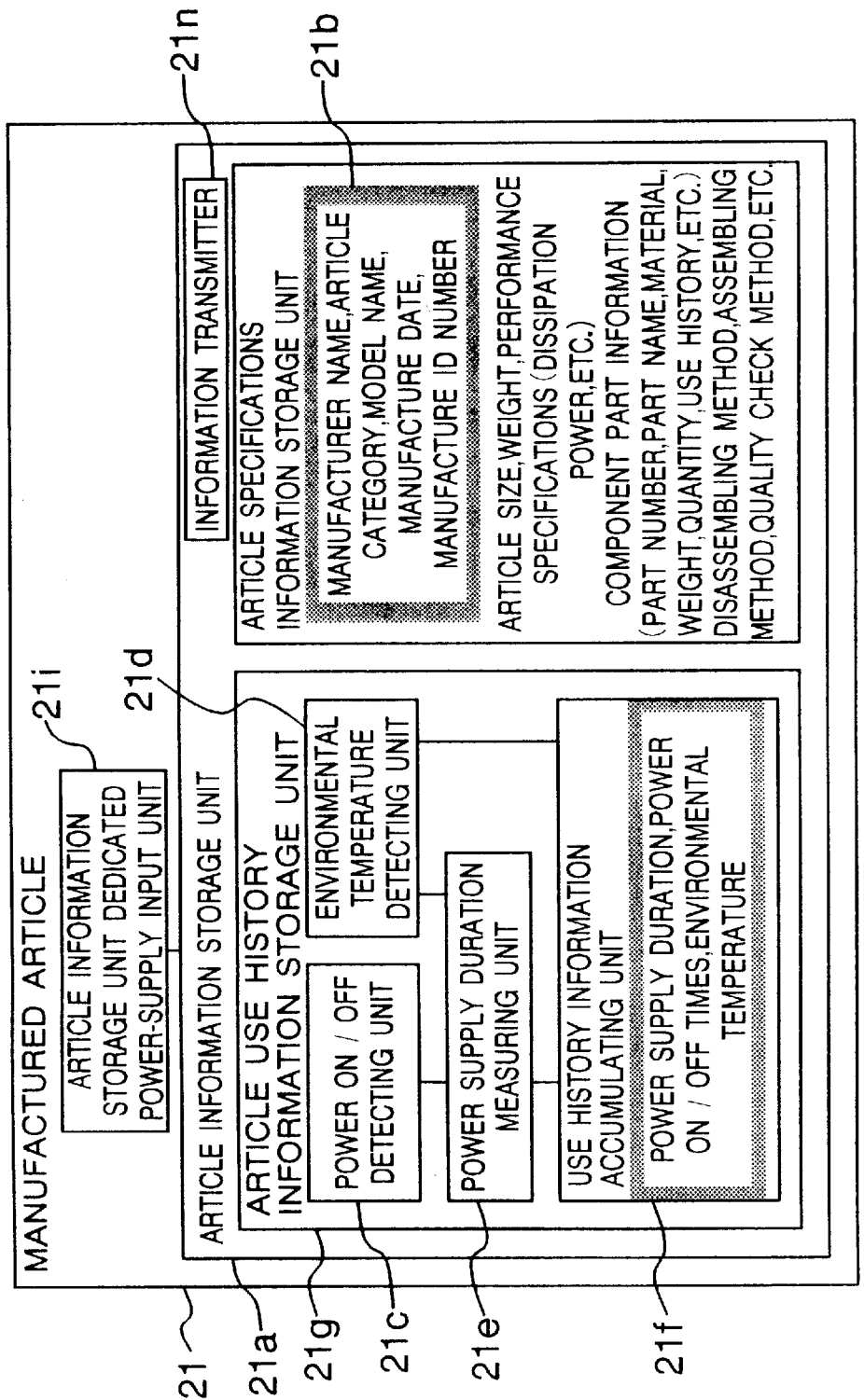
Figure 16:
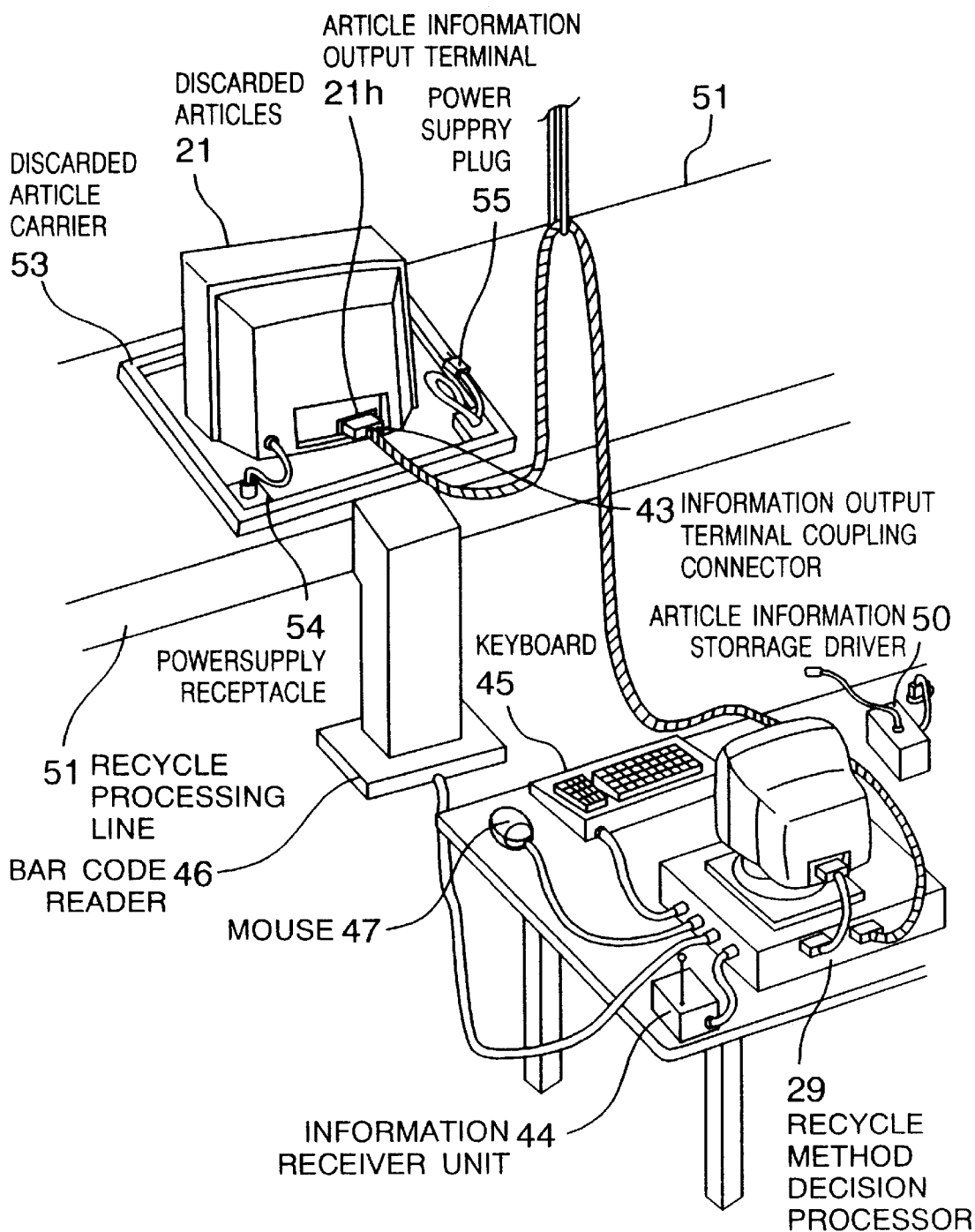
FIG. 16 is a view illustrating, by way of example, an article information read-out method.

FIG. 16 is a view for illustrating a method for reading out the information from the discarded article 21 which includes the article information storage unit 21a and the article information output terminal 21h shown in FIG. 10(a). As is shown in FIG. 16, the discarded article 21 is supplied with electric power by way of the power supply receptacle 54 mounted on the discarded article carrier plate 53 to thereby put into operation the discarded article 21. In the activated state, the information output terminal coupling connector 43 of the recycle method decision processor unit 29 shown in FIG. 5 is connected to the article information output terminal 21h of the discarded article 21 to thereby read out the article information.

Figure 17:
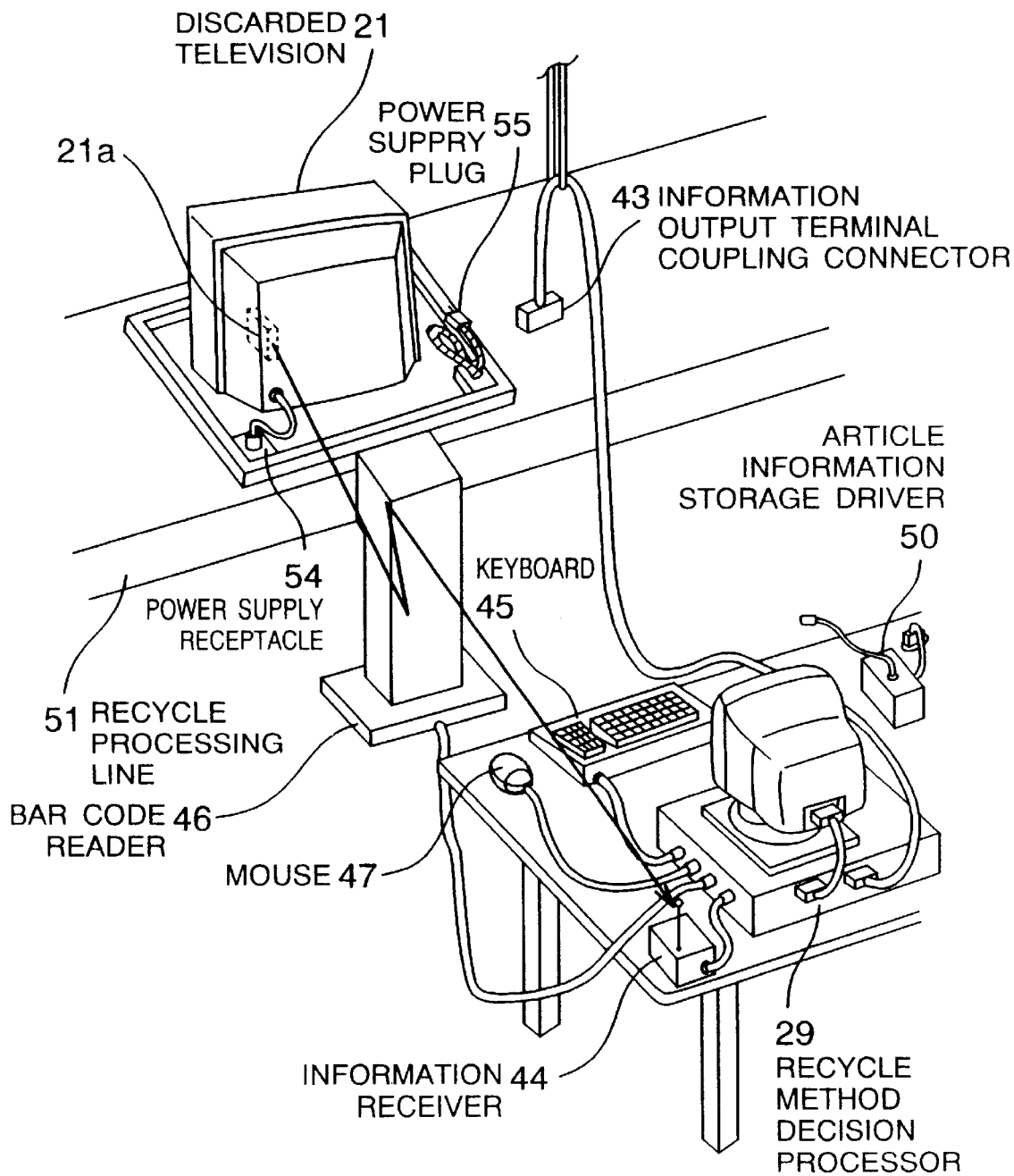
FIG. 17 is a view for illustrating, by way of example, an article information read-out method.

FIG. 17 is a view illustrating an article information read-out method for the discarded article 21 having the article information storage unit 21a imparted with the radio transmitter function. As is shown in FIG. 17, electric power is supplied to the discarded article 21 from the power supply receptacle 54 mounted on the discarded article carrier plate 53 to thereby operate the discarded article 21. In the operated state, a predetermined information transmitting command is inputted by turning on an information transmitting switch or the like, to thereby cause the article information storage unit 21a imparted with the radio transmitter function to send out the article information, whereby the information is received by the information receiver unit 44 connected to the recycle method decision processor unit 29.

Figure 18:
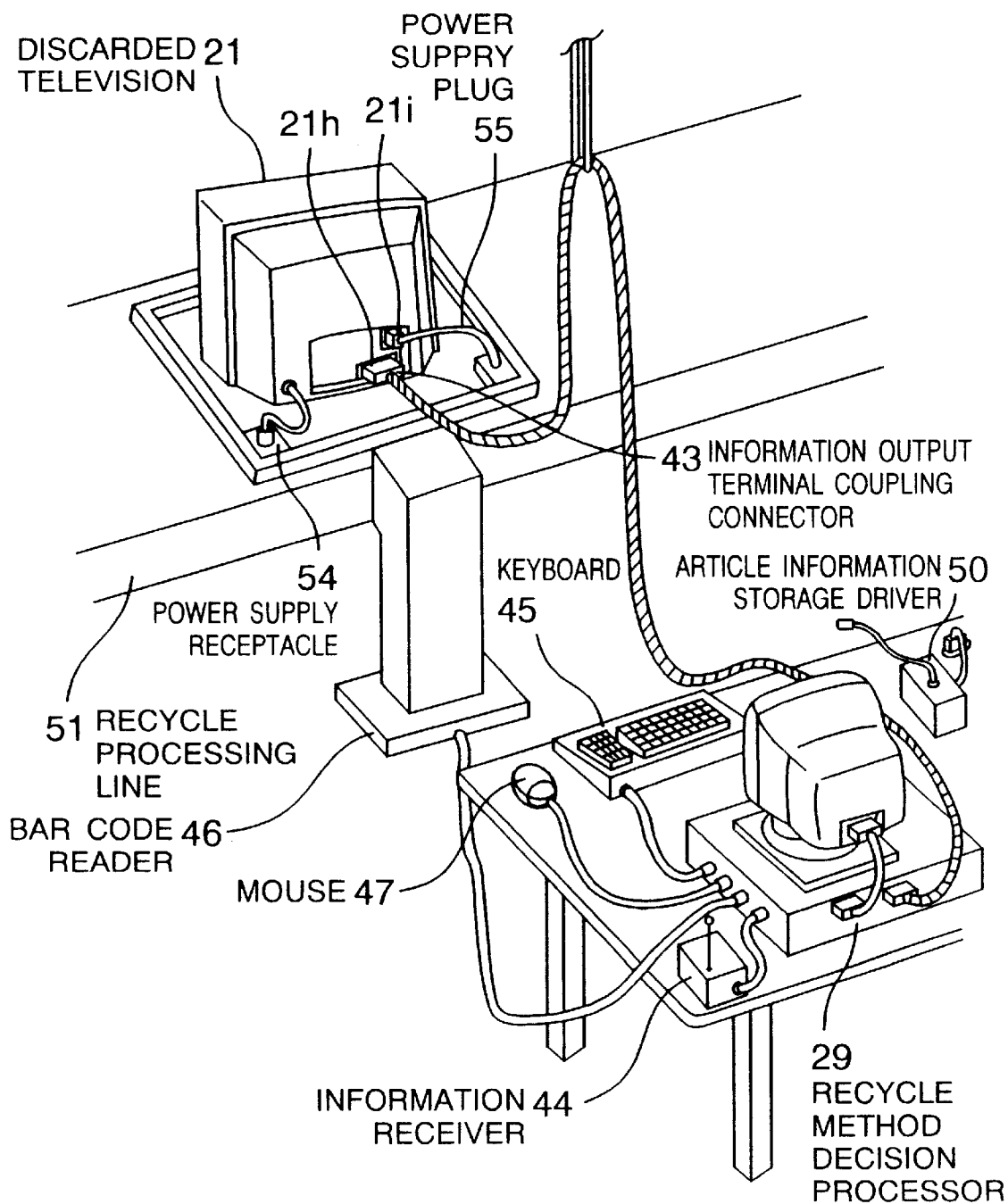
FIG. 18 is a view for illustrating, by way of example, an article information read-out method.

FIG. 18 is a view for illustrating a method of reading out the article information read-out method from the discarded article 21 which includes the article information storage unit 21a, the article information output terminal 21h and additionally the article information storage unit dedicated power-supply input unit 21i. As is shown in FIG. 18, the discarded article 21 is supplied with electric power by way of the power supply receptacle 54 mounted on the discarded article carrier plate 53. In that case, even when the discarded article 21 can not be put into operation due to some trouble thereof with the article information incapable of being read out from the article information storage unit 21a, the article information storage unit 21a can be driven by connecting the article information storage unit dedicated power-supply input unit 21i to the power supply plug 55 mounted on the discarded article carrier plate 53 and supplying electric power. In the state where the article information storage unit 21a is driven, the information output terminal coupling connector 43 is connected to the article information output terminal 21h of the discarded article 21 to thereby read out the article information.

Figure 19:
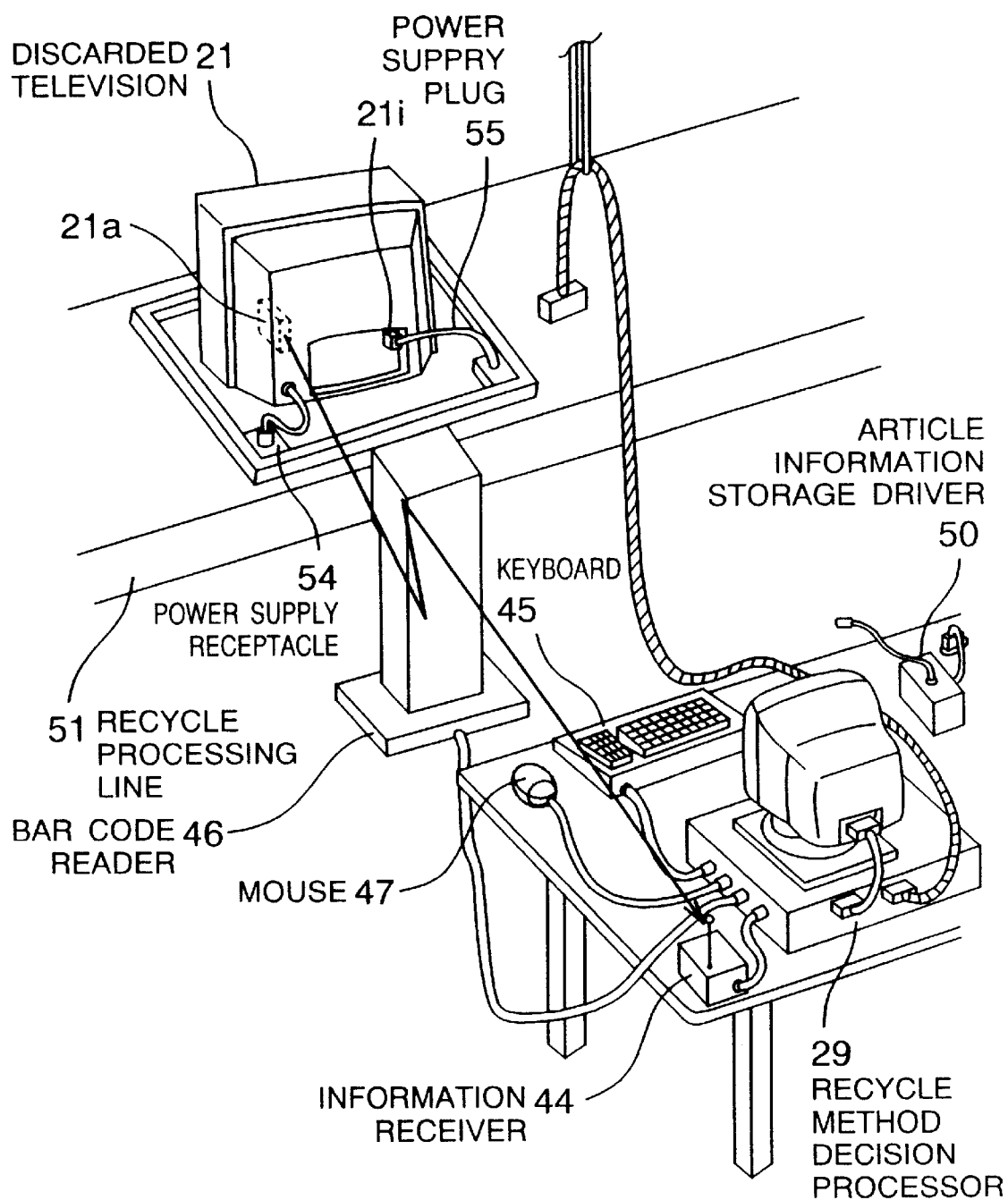
FIG. 19 is a view illustrating, by way of example, an article information read-out method.

FIG. 19 is a view illustrating a method of reading out the article information from the discarded article 21 having the article information storage unit 21a imparted with the radio transmitter function and additionally the article information storage unit dedicated power-supply input unit 21i. As is shown in FIG. 19, the article information storage unit 21a can be driven by connecting the article information storage unit dedicated power-supply input unit 21i to the power supply plug 55 mounted on the discarded article carrier plate 53 and supplying electric power. In the operated state, a predetermined information transmitting command is inputted by turning on an information transmitting switch or the like, to thereby cause the article information storage unit 21a imparted with the radio transmitter function to send out the article information, whereby the information is received by the information receiver unit 44 connected to the recycle method decision processor unit 29.

Figure 20:
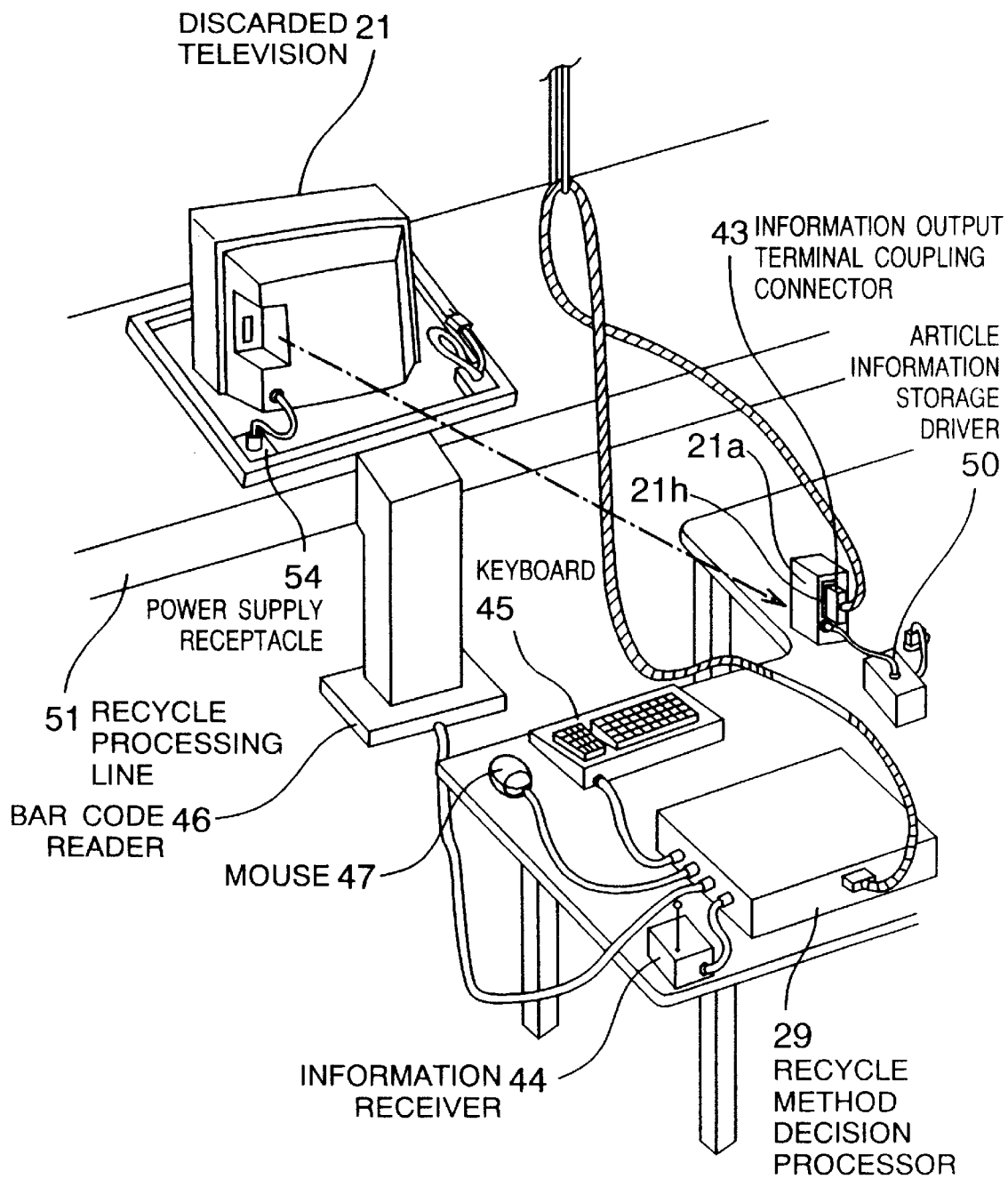
FIG. 20 is a view for illustrating, by way of example, an article information read-out method.

FIG. 20 is a view for illustrating a method of reading out the article information from a discarded article 21 having the removable type article information storage unit 21*a* equipped with an article information output terminal 21*h*. Referring to FIG. 20, when the power supply source can not be turned on due to some trouble of the discarded article 21 itself, the article information storage unit 21*a* is removed from the discarded article 21, whereon electric power is supplied to the article information storage drive unit 50 for driving the same. In this state, the information output terminal coupling connector 43 is connected to the article information output terminal 21*h* for thereby reading out the article information. Furthermore, the article information read-out method may be carried out in the state in which the article information storage unit 21*a* is mounted on the discarded article 21.

Figure 21:
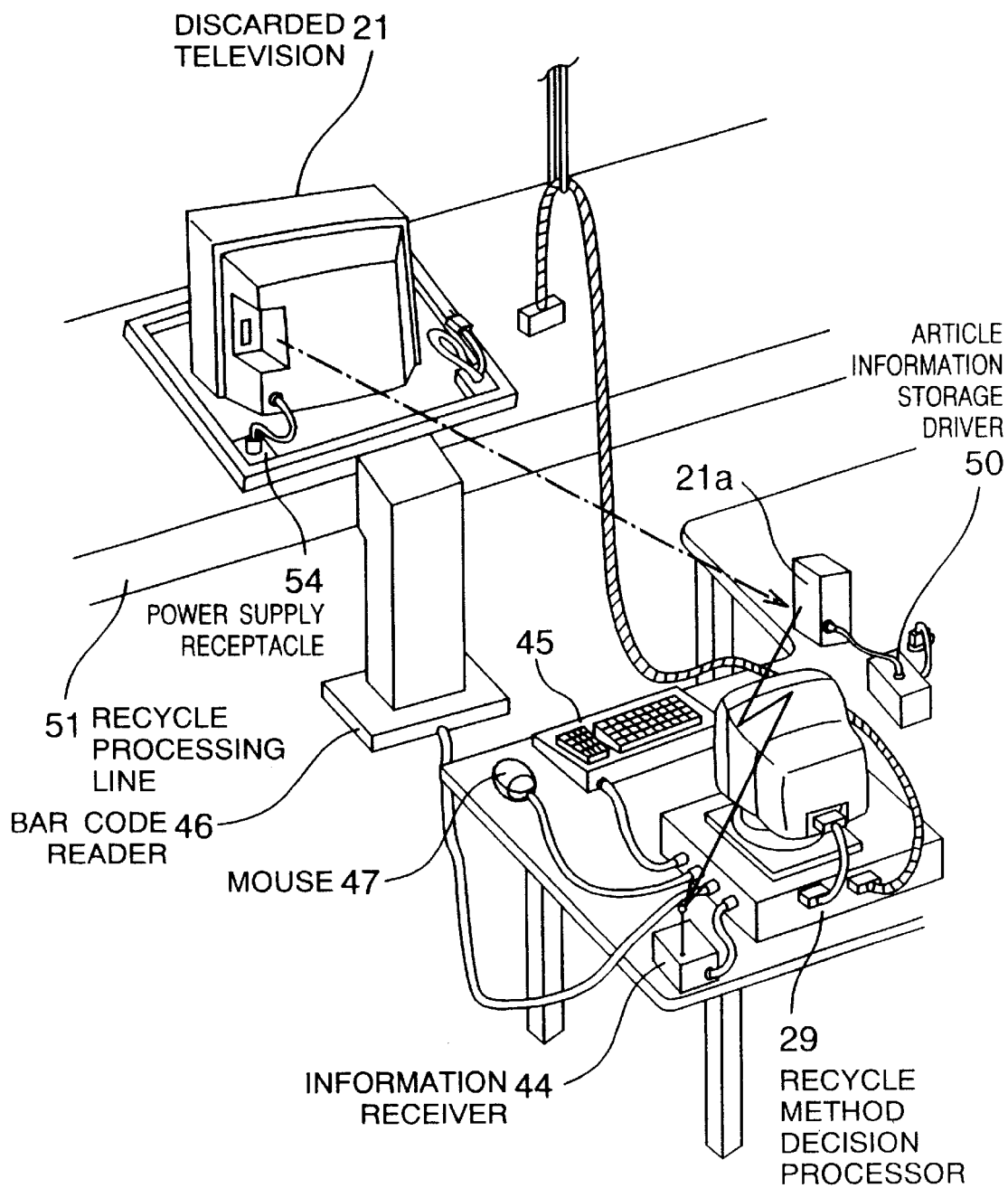
FIG. 21 is a view for illustrating, by way of example, an article information read-out method.

FIG. 21 is a view illustrating a method of reading out the article information from a discarded article 21 including the removable type article information storage unit 21*a* which is equipped with the transmitter function. The article information storage unit 21*a* as removed is driven by supplying electric power thereto from the article information storage drive unit 50, whereon a predetermined information send-out command is inputted by closing an information transmitting switch. As a result of this, the article information is transmitted from the article information storage unit 21*a* with the transmitter function, whereby the article information is received by the information receiver unit 44 connected to the recycle method decision processor unit 29.

Figure 22:
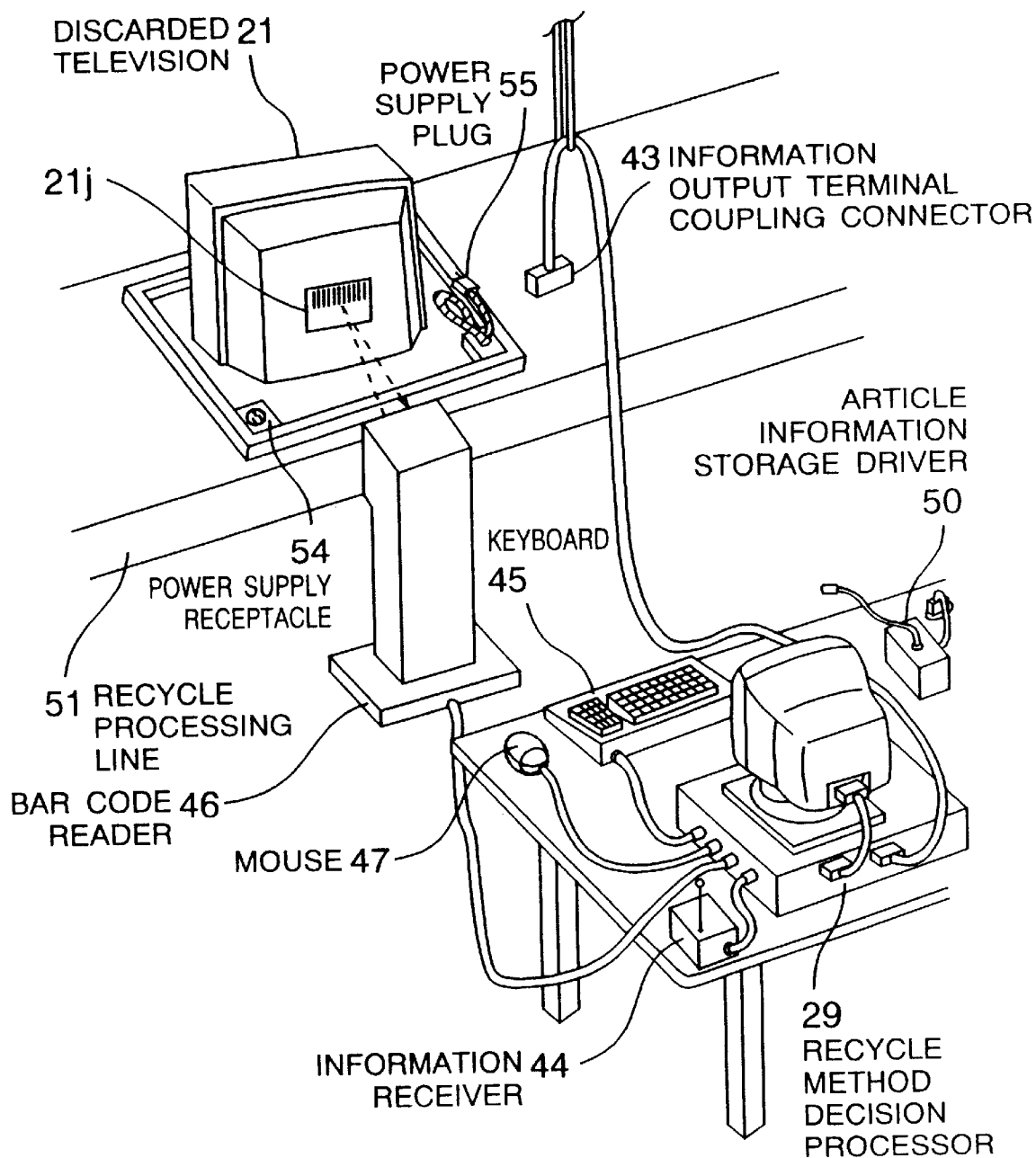
FIG. 22 is a view illustrating, by way of example, an article information read-out method.

FIG. 22 is a view for illustrating an exemplary method of making available the article information indicated in the form of a bar code in an article information indicating portion 21*j* of a casing of the discarded article 21 (whose portion may be realized by a correspondingly printed label or the like secured to the casing or printing the bar code directly on the casing according to the instant embodiment of the invention) by means of the bar code reading device 46. As is shown in FIG. 22, by reading out the bar code from the discarded article 21 by the bar code reading device 46, it is possible to make available the article information.

Additionally, in the case of a discarded article which is provided with no bar code indication or a discarded article having unreadable bar code, the article information in the form of character expressions is read out by operator to be manually inputted with the aid of the keyboard 45 or the mouse 47.

Moreover, the input units for inputting or loading the article information may be designated to the recycle method decision processor unit 29 in advance or alternatively the input units may selectively designated as the occasion requires.

Furthermore, when the article specifications information as acquired is insufficient with only the information affixed to the discarded article, the article specifications information of the discarded article may be obtained by retrieving or searching the article specifications information database 35 mentioned previously on the basis of the manufacturer name, category of article, model name, manufactured date and manufacture ID number which are available at the least. To say in another way, by affixing only the information concerning the manufacturer name, category of article, model name, manufactured date and the manufacture ID number at the least to the manufactured article, the article specifications information thereof can be acquired from the article specifications information database 35 while at the same time the memory capacity of the article specifications information storage unit 21*b* can be reduced, which is profitable for the manufactured article. Further, the article use history information as acquired is recorded by the history information accumulating unit 40. In this way, every time the discarded article is treated, the relevant article use history information is recorded and accumulated. The data accumulated in this manner can be sent to an article design department or an inspection department as the occasion arises, providing reference data important for designing a new article and/or for contribution to enhancing of reliability of a new article.

Figure 15:
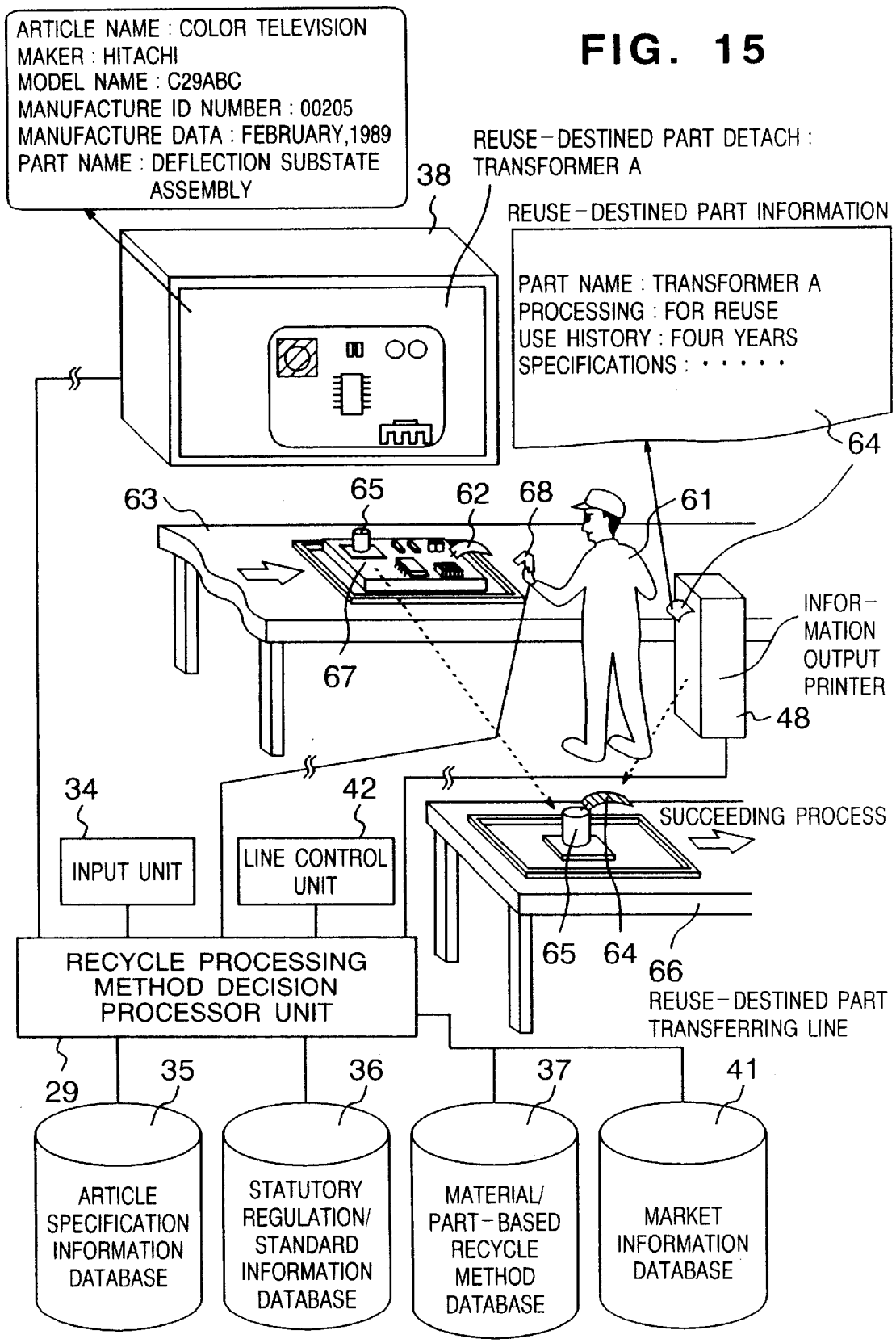
FIG. 15 is a view for illustrating conceptually a disassembling process in a recycling factory.

After having acquired the article information (article specifications information and article use history information), the recycle method decision processor unit 29 determines the recycle processing method for the discarded article in accordance with the recycle processing decision procedure 32 stored in the recycle method decision module 31 incorporated in the recycle method decision processor unit 29 while acquiring from the various databases the information required for determining the recycle processing method as the occasion requires. The recycle processing decision procedure 32 is executed in the manner as briefly described hereinbefore by referring to FIG. 2. In the following, the recycle processing decision procedure 32 will be elucidated in more detail. The results of decisions obtained by executing the recycle processing decision procedure 32 in the recycle method decision module 31 are stored in a recycle processing method decision result storage unit 79 together with the names of the relevant manufactured articles and the manufacture ID numbers thereof or together with all the component parts (or assemblies) of the discarded article which is not to be restored. Addition-ally, the result of the decision may be affixed to the concerned article or each part of the article. As an affixing method, a sheet of paper or the like on which the reusable part information 64 and the disassembled part information 62 are printed may be affixed to the article or the component part, as illustrated in FIG. 15 and described later on.

At first, the article information and the use history information of a discarded article 21 are inputted in accordance with the methods such as illustrated in FIGS. 16 to 22 (step 201).

Subsequently, the article history information of the discarded article 21 is recorded onto the history information accumulating unit 40 together with the identification information of the discarded article 21 such as illustrated in FIG. 8 (step 202).

Next, decision is made as to the possibility of the discarded television subjected to the recycle processing being capable of restoration as a used television (step 203). In that case, on the basis of the category of the article (television in the case of the example now under consideration) contained in the acquired article specifications information, the statutory regulation/standard information concerning that category of article (e.g. concerning the television) is retrieved from the statutory regulation/standard information database 36. Thereafter, the acquired statutory regulation/standard information concerning the television and the article specifications information of the discarded television are compared with each other (step 203*a* in FIG. 2). By way of example, let's assume that a statutory regulation to the effect "use of lead (Pb) is inhibited" exists. In that case, the data of materials forming the component parts is retrieved from the component part information contained in the article specifications information of the discarded television illustrated in FIG. 7, to thereby decide whether or not the discarded television concerned has any component part containing lead (Pb). In the case of the example illustrated in FIG. 7, the substrate assembly (PWB ASS'Y) designated by the part number "3" and the cathode ray tube (CRT) fall within the category of the component part containing lead (Pb). Thus, it is decided that the discarded article of concern does not meet the statutory regulation.

The discarded television which has been decided as meeting the statutory regulations/standards to be satisfied in the aforementioned step 203a is then subjected to the decision in the succeeding step 203b as to whether or not the discarded television is the article which has a remaining life falling within the restoration-allowable life limit. In this conjunction, the restoration-allowable life limit is previously established at the television manufacturer side in consideration of the reliability and the commercial popularity and may be affixed to the television as one of the article specifications information or alternatively stored in the article specifications information database 35. In the case of the example illustrated in FIG. 7, the restoration-allowable life limit of the television is set to be up to three years. Accordingly, when the television of concern is assumed as being manufactured in February, 1989, it is decided that the television can be restored as a used television so long as the recycle processing method is decided before February, 1992, while being decided that the television is not to be restored, if otherwise.

When it is decided in the step 203b that the discarded television of concern is the article falling within the restoration-allowable life limit, it undergoes then the quality check (step 203c) for deciding whether or not the discarded television satisfies the quality check standards.

Figure 31:
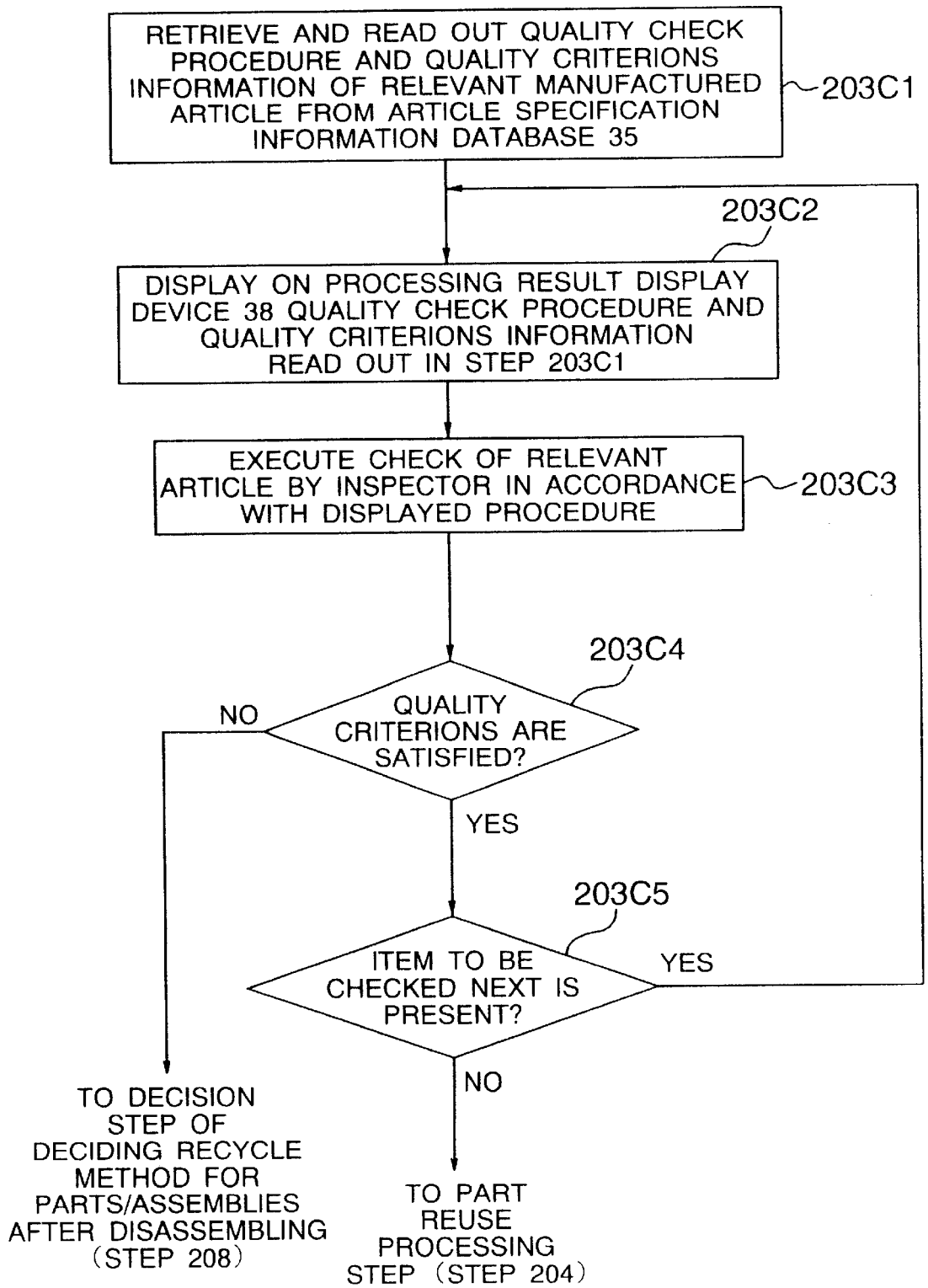
FIG. 31 is a flow chart for illustrating a quality check step.

FIG. 31 illustrates processings executed in the step 203c. Referring to FIG. 31, the quality check method and the reference or standard data of the discarded television established previously are read out from the article specifications information restored in the discarded television or the article specifications information database shown in FIG. 5 (step 203c1). In accordance with the method and the data, the quality check procedure is generated by the recycle processing generating module 33 shown in FIG. 5, whereupon the procedure(s) as generated is displayed on the processing result display device 38 (step 203c2). Thus, the worker can perform the quality check in accordance with the check procedure as displayed (step 203c3). Furthermore, in accordance with the procedure as generated, the line control is performed by the line control unit 42. After the check processing, operator makes decision as to whether or not the quality criteria can be satisfied (step 203c4). When the quality criteria are met, operator checks whether there exist items to be checked or not (step 203c5). After completion of the check of all the items, the articles satisfying the quality criteria are restored as reusable articles in a step 204. On the contrary, those which do not satisfy the quality criteria are transferred to a part/assembly recycle processing method decision step 206 as the objects for decomposition processing. In this manner, the quality check can be realized for the discarded televisions.

Parenthetically, among the discarded articles which do not meet the quality criteria, there may still exist those which can satisfy the quality criterion by repairing them to more or less extent or exchanging some parts. Accordingly, a further step of deciding whether the discarded television is worthy to be restored by repairing or exchanging component parts may be provided for the purpose of promoting the restoration or regeneration of the discarded article. Such decision method may be so designed as to compare the used-article market price of the corresponding used articles with the cost involved in restoring the article. When the restoration is profitable, then the discarded article is decided to undergo the recycle processing. The market price of the article to be restored may be estimated by acquiring at least the manufacture name, article name, model name, manufactured date and the use history of the discarded article from the article specifications information and the article use history information, and then retrieving from the market information database 41 the price data of the used article of the same conditions as that to be restored or alternatively the price data of similar used article circulated on the market, on the basis of the above-mentioned information acquired from the article specifications information and the article use history information. On the other hand, the cost involved in repairing the discarded article is estimated on the basis of data concerning the locations requiring to be repaired as detected in the quality check process as well as the costs involved in packing, shipping and others. In this way, the whole cost demanded for restoring the discarded article as a used article to be put on the market can be estimated. Thus, by comparing the used-article market price of the corresponding article with the cost involved in restoration of the discarded article as described above, restoration or recycle processing is carried out for the discarded article, when the above comparison shows that the restoration is profitable. Parenthetically, such article restoration cost estimating system or scheme may be utilized for estimating the-repairing cost involved in maintenance.

Next, in a step 204, the article restoration date is stored in the article specifications information storage unit of the restored article and recorded on a casing or the like thereof. Subsequently, additional article restoration processings such as cleaning, packing and the like are performed on the restored article before being shipped from the factory.

It should further be mentioned that when component parts and others are exchanged in the course of the article restoration processing, the contents of such exchange are added to the article specifications information stored in the article specifications information storage unit of the discarded article 21. More specifically, the date of the part exchange is recorded at an address of part exchange date for the replaced part in the component part information data, and when the replaced part is a used one, the use history (years of use) thereof is recorded at an address for the use history (refer to FIG. 7). Of course, such part exchange may be required in any other process than the recycle processing, for example, in the maintenance. In such case, there will arise a need for similar part exchange processing. Under the circumstances, an apparatus for altering the article specifications information should be installed in the service station 11 which is in charge of maintenance. Additionally, there is conceivable such a case in which an article to be repaired undergoes a part exchange treatment in the store 3 instead of the service station 11. Accordingly, an apparatus for altering the article specifications information should be installed at the store 3 as well. In that case, it becomes equally possible to record the sale date of the article in the article information storage unit thereof at the store 3 (by providing previously the sale data recording addresses in the article use history information storing field of the article information storage unit), whereby the warranty period can easily be confirmed. Furthermore, by providing maintenance history information recording addresses in the article history information storage unit or field, it is possible to record the date and contents of maintenance in the article information storage unit when the article undergoes maintenance processing. Such data can provide not only reference for subsequent maintenance but also useful information for the restoration of discarded article and for the reuse of the component part.

For the discarded televisions having been decided not to be restored or recycled in any one of the steps 203a, 203b and 203c described previously, the recycle processing method for the parts constituting the discarded television is decided before disassembling the discarded television. In that case, the recycle method decision procedure becomes partially different in dependence on whether or not the discarded television is within the restoration-allowable life limit.

For the discarded television which does not exceed the restoration-allowable life limit yet, the processing method for reusing a part or parts thereof is first decided in a step 206, whereupon decision is made concerning the other recycle processing method than the reuse of the part. By contrast, in the case of the discarded television which has exceeded the restoration-allowable life limit, the component part or parts thereof are not reused. Accordingly, other recycle processing method than the part reusing method is determined (step 207). In this way, it can be decided whether the decision as to the recycle processing method for the component parts of the discarded television is to be performed in which of the steps 206 and 207 in dependence on whether the discarded television is within the restoration-allowable life limit or not, and subsequently the recycle processing methods for the component parts are decided in the respective steps.

For the discarded television which is within the restoration-allowable life limit, the recycle processing method for the component part thereof is determined or decided in the step 206. In the following, the decision procedure in the step 206 will be explained by reference to FIG. 3.

At first, from the disassembling method information and the component part information contained in the article specifications information of the discarded television of concern, information of component part or assembly is inputted for each of the parts or assemblies detached separately from the discarded television upon disassembling thereof. For the assembly, information of parts or elements constituting that assembly as well as information thereof is inputted (step 206a).

Subsequently, for the part or assembly whose information has been inputted, decision is made as to the possibility of reusing the same, i.e., reusability thereof (step 206b). To this end, the step 206b includes three steps mentioned below.

Step 206b1: it is decided whether or not a part or assembly of concern can be subject to the reuse. The part or assembly subject to the reuse has previously been determined when a discarded article was manufactured, and thus the information as to the reuse of the part or assembly is contained in the component part information which constitutes a part of the article specifications information. Thus, the information of the part or assembly as inputted contains data indicating whether or not the part or assembly of concern is subject to the reuse. In the case of the instant embodiment of the invention, data "1" recorded at a reuse-destined part address 71 indicates the reuse-destined part or assembly, while "0" recorded at that address indicates the part or assembly not destined for the reuse. Decision as to the reuse of the part or assembly is ordinarily made on the basis of this data. However, in case the demand information of the part or assembly or stock information thereof is available from the market information database 41, the market information may be used with priority. By way of example, let's assume that a given part or assembly is designated as "part or assembly subject to or destined for reuse" by the component part information. In that case, when the relevant available market information indicates "large amount of part or assembly as stocked and hence little demand therefor", decision then may be made such that the given part or assembly is not to be reused. On the contrary, even when a part or assembly is not designated as the part or assembly destined for the reuse by the component part information, decision may nevertheless be made such that the part or assembly of concern is to be reused, when the information indicating that demand for the part and the assembly exists" is derived from the market information.

Step 206b2: For the part or assembly decided as being destined for the reuse in the step 206b1 described above, it is then decided whether or not the part or assembly satisfies the statutory regulations/standards. In this steps, the statutory regulation/standard information concerning the television obtained from retrieval of the statutory regulation/standard information database 36 is compared with the component part information of the part or assembly, similarly to the step 203a shown in FIG. 2. By way of example, when it is legally or statutorily regulated that "use of lead (Pb), is inhibited", the current decision step is executed on the basis of the material information of the part or assembly as inputted. By way of example, among the parts shown in FIG. 7, a CRT (cathode-ray tube) identified by a part number "5" is a reuse-destined part. However, the CRT is decided as not to be reused because it contains lead (Pb).

Step 206b3: The part or assembly decided as the reuse-destined part or assembly in the aforementioned step 206b2 is then decided as a candidate for the reuse-destined part or assembly.

From the foregoing, the reuse allowability decision step 206b for the part or assembly can be understood.

Now, for the part or assembly decided not to be reused in the step 206b described above, a step 206c is executed for deciding the recycle processing method. To this end, the step 206c includes the following steps.

Steps 206c1 and 206c9: Step of determining or deciding a special processing/treatment necessitating part containing harmful or hazardous material(s). On the basis of the part or assembly information as inputted, it is decided by reference to the material/part-based recycle method database 37 whether or not the part or assembly of concern is harmful or hazardous and necessitates special detoxification treatment or the like. When this decision or judgement results in affirmation, the part or assembly is then decided as a special processing/treatment necessitating part. By way of example, let's consider a cable identified by a part number "7" among those shown in FIG. 7. This cable is decided as a harmful component part on the basis of the information that the coating of the cable is made of polyvinyl chloride (PVC) and the information that polyvinyl chloride (PVC) is a harmful material, by referencing the material/part-based recycle method database 37. Result of the above decision is stored in the recycle processing method decision result storage unit 79, while at the same time a message indicating the special processing/treatment necessitating part is affixed to the part or assembly. The part or assembly which does not belong to the special processing/treatment necessitating part group is transferred to a succeeding decision step (step 206c2).

Step 206c2, 206c8: Step of deciding a multi-material part. On the basis of the information of a part or assembly as inputted, it is decided that the part or assembly is a multi-material part when the part or assembly is composed of two or more different materials which can not be decomposed or divided any further. In the case of the multi-material part, indication of a part requiring shredding (fragmentation)/separation is affixed to the corresponding part or assembly. The irrelevant part or assembly undergoes a further decision processing in a next step (206c3).

Steps 206c3, 206c5, 206c6, 106c7: Steps of making decision as to material-restoration-destined part or assembly, energy-recovery-destined part or assembly or waste part or assembly. On the basis of material information of the part or assembly as inputted, the recycle processing method for the materials of the part or assembly is retrieved from the material/part-based recycle method database 37. When the recycle processing method as retrieved is the recycle processing method for restoring the material, then the part or assembly is decided as the material-restoration-destined article or part, while when the recycle processing method represents the energy recovery processing, the part or assembly is decided as the energy-recovery-destined part or assembly. When the recycle processing method as retrieved indicates none of the processings mentioned above, it is then decided that the part or assembly concerned is destined to be disposed of as the waste article or assembly. The results of the decision, i.e., the material-restoration-destined part or assembly, energy-recovery-destined part or assembly, is stored in the recycle processing method decision result storage unit 79 and at the same time labeled to the relevant part or assembly.

The steps mentioned above are repetitively executed for making the aforementioned decisions for all the parts and/or the assemblies constituting the discarded television. The recycle method decision procedures for the parts or assemblies detached separately from the discarded television after decomposition thereof, as executed in the step 206, will now be understood from the foregoing.

On the other hand, for the discarded television whose life exceeds the restoration-allowable life limit, the recycle processing methods for the component parts are decided in the step 207 shown in FIG. 4, which step 207 however can be executed similarly to the decision procedure of the step 206 (FIG. 3) with the exception that the part or assembly reusability decision step 206b executed in the step 206b is spared. For the parts or assemblies of all the discarded televisions which have been used beyond the restoration-allowable life limit, one of the recycle processing methods other than the processing for "reuse of the part or assembly" is determined or decided.

As is apparent from the foregoing, in the recycle method decision processor unit 29, the recycle processing methods for all the parts or assemblies dismounted from the discarded television upon decomposition thereof are decided, whereon the processing procedures are generated by the recycle procedure generating module 33 on the basis of the results of the decisions and the disassembling method information of the discarded television.

By reference to FIG. 32 which is a view showing a processing procedure generating flow for illustrating operation of the recycle procedure generating module 33, description will now be made of the recycle processing procedure.

Figure 32:
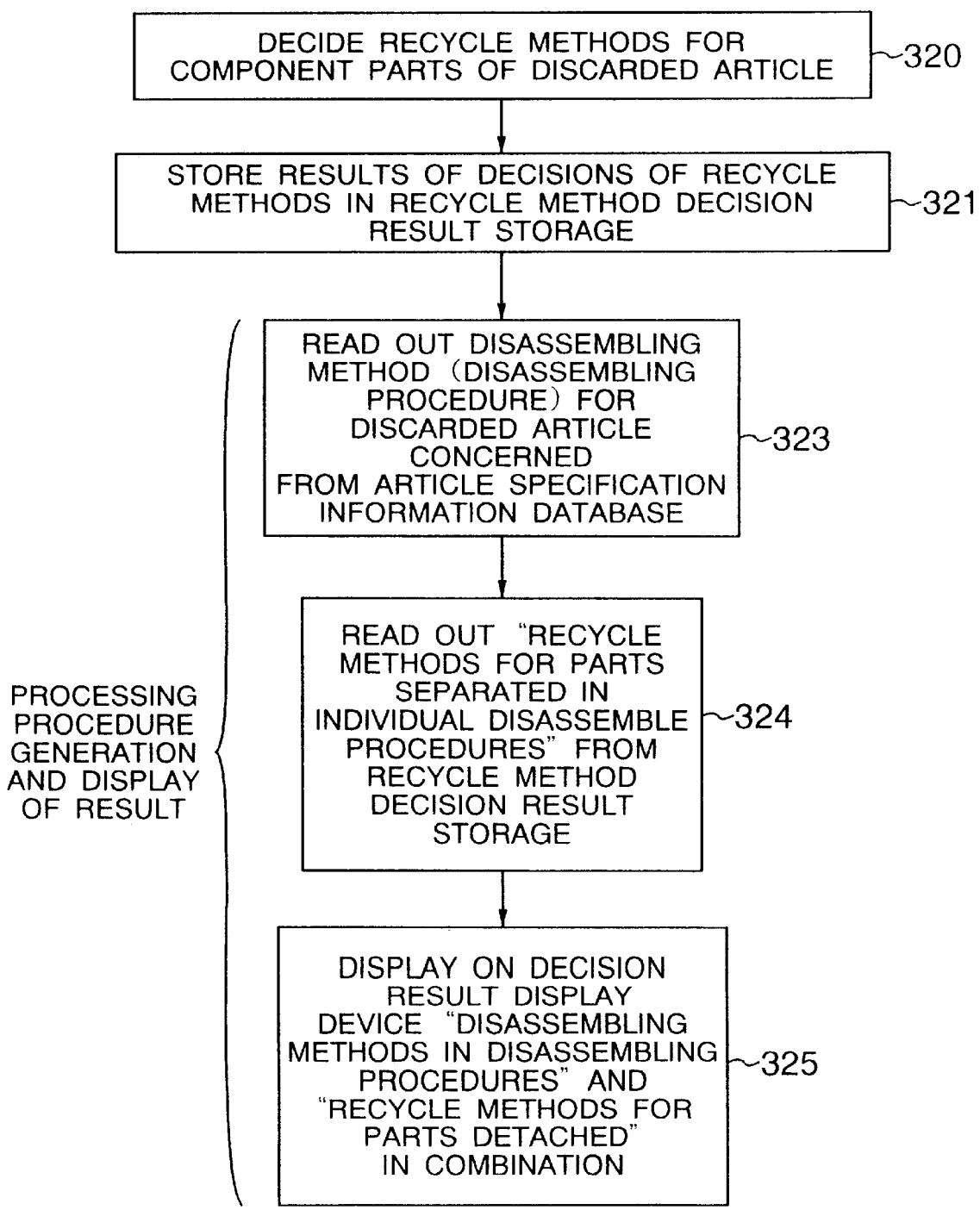
FIG. 32 is a flow chart illustrating a processing procedure generating procedure (for recycle processing other than article restoration processing).

Referring to FIG. 32, when the recycling methods for the component parts of the discarded article are decided by the recycle method decision module 31 (step 320), as described hereinbefore, the results of the decisions are stored in the recycle processing method decision result storage unit 79 (step 321). The recycle procedure generating module 33 reads out the disassembling method or disassembling procedure information of the discarded article of concern from the article specifications information database 35 such as shown in FIG. 7 (step 323). Further, the recycle processing methods for detaching separately the parts in each of the disassembling procedure are read out from the recycle processing method decision result storage unit 79 by retrieving the same (step 324). The discarded article disassembling method or disassembling procedure information read out from the article specifications information database 35 and the recycle processing methods for the detached parts read out from the recycle processing method decision result storage unit 79 are displayed in combination on the processing result display device 38 shown in FIG. 5 as the recycle processing procedure. As typical example of the contents of the processing results displayed on the processing result display device 38, there may be mentioned ones illustrated in FIG. 14. For more details, description will be made later on.

In accordance with the recycle processing generated by the recycle procedure generating module 33, the discarded television is disassembled or decomposed in the recycling factory (step 208), as illustrated in FIG. 2, whereon the detached or dismounted parts or assemblies are classified on the basis of the recycle processing methods, respectively, (steps 209 to 214 in the same figure), and then the corresponding or relevant recycle processings are executed respectively (steps 215 to 223 in the same figure).

Figure 14:
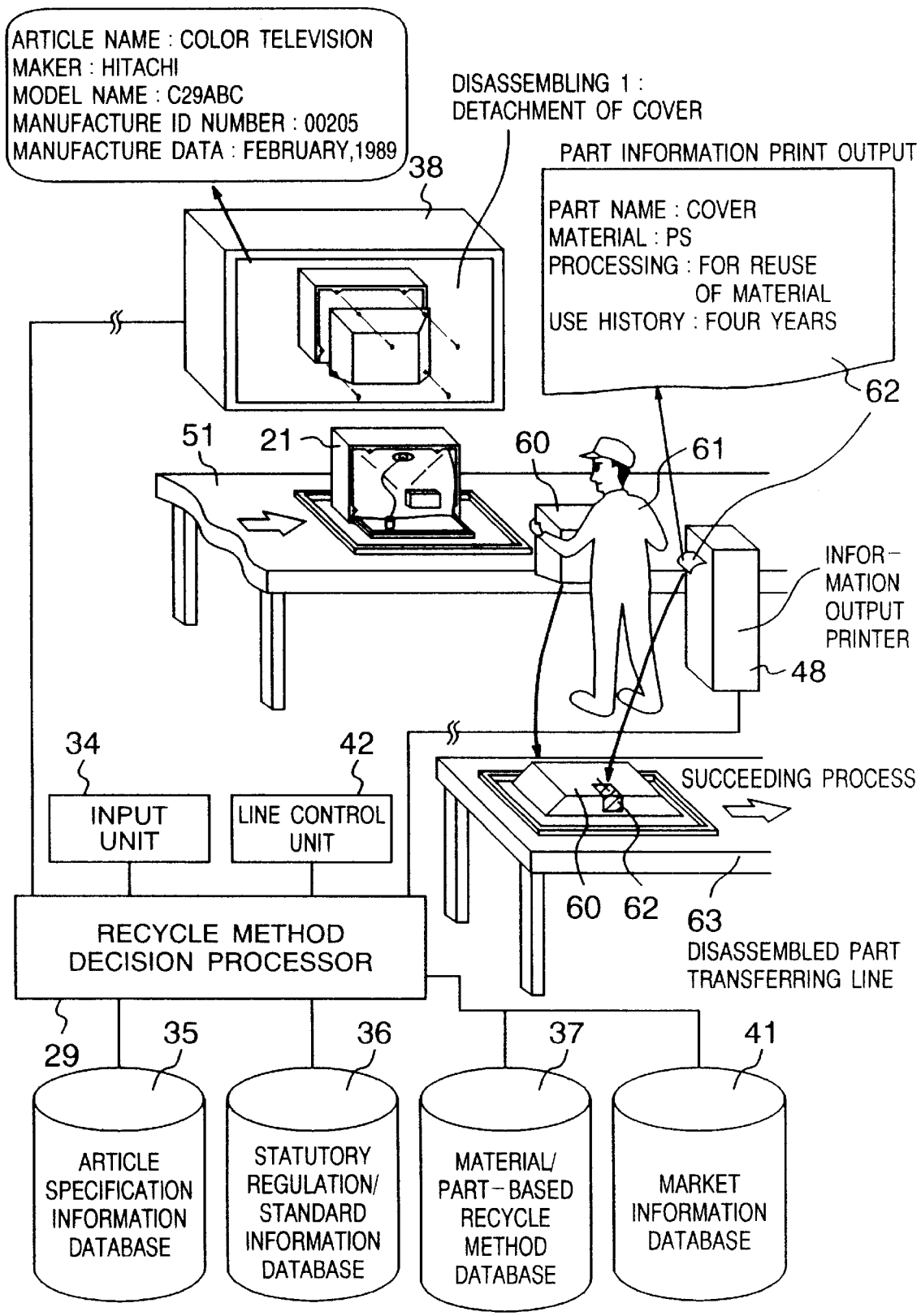
FIG. 14 is a view for illustrating conceptually a disassembling process in a recycling factory.

FIG. 14 shows conceptually or pictorially a disassembling process in the recycling factory 6 or 7. For the discarded television subject to the recycling, the article information is read-out in an article information read-out process (see FIGS. 16 to 22) to be subsequently inputted to the recycle method decision processor unit 29 in which the recycle processing method for the discarded television concerned is decided by the recycle processing decision procedure 32 on the basis of the input data. Thereafter, the discarded television is transferred to the disassembling process on and along the recycle processing line 51. In the disassembling process, the processing result display device 38 and the information output printer 48 connected to the recycle method decision processor unit 29 are utilized.

In the disassembling process illustrated in FIG. 14, the disassembling procedure for the discarded television 21 is displayed on the processing result display device 38 upon arrival of the television. On the other hand, the information concerning the-parts to be detached and separated in the disassembly process is printed out on a sheet of paper or the like by means of the information output printer 48. The information as outputted may contain the identification number, name, material, weight, recycle processing method and the use history of each part detached and separated in the disassembling process as well as the manufacturer name of the manufactured article in which the parts are used, the article name, the model name, the manufactured date, the manufacture ID number, etc. of the article, which are displayed in the form of characters and bar codes. FIG. 14 shows, by way of example only, a process for detaching and separating a cover 60 from a discarded television. A disassembling worker 61 detaches and separates the cover 60 from the discarded television while viewing the disassembling procedure displayed on the processing result display device 38. Then, the cover 60 as separated is affixed with the disassembled part information 62 and placed on a disassembled part transferring line 63. The cover 60 as placed on the disassembled part transferring line 63 is transported to a treatment process in accordance with recycle processing method indicated by the disassembled part information 62 concerning the cover. On the other hand, the discarded television 21 from which the cover 60 has been detached is transported to a next disassembling process where another part is detached and separated to be placed on the disassemble part transport line similarly to the cover.

On the other hand, the cover 60 placed on the disassembled part transferring line 63 is transported to a material restoring process in accordance with the disassembled part information 62 affixed on the cover 60. In the material restoring process, the disassembled part information 62 concerning the above-mentioned cover is visually read out by the worker or read out by a bar code reading device or the like, whereon the material restoration processings or treatments (fragmentation, packing of fragmentated material in a bag, affixture of material information on the bag) are performed to be transported to the material manufacturer 12 or the manufacturing factory 1 shown in FIG. 1 and ultimately reused as the restored material. The material information affixture applied to the bag should contain at least the name of the material, use history and the weight or mass. As a method of affixing the information, there may be mentioned a method of printing necessary description information by means of an ink jet printer and a method of printing the information on a paper sheet which is then affixed. Alternatively, the disassembled part information 62 applied to the cover 60 as mentioned above may be detached and applied to the bag filled with the restored material. FIG. 15 shows a process for detaching reuse-destined parts from a dismounted printed circuit board assembly 67. The printed circuit board assembly 67 is transferred to the above-mentioned process in the manufactured article recycling system on and along the disassembled part transferring line 63. The disassembling worker 61 reads out the disassembled part information 62 affixed to the printed circuit board assembly 67 with the aid of the bar code reading device 68 which is connected to the recycle method decision processor unit 29, whereby the processing or treatment method of the printed circuit board assembly 67 is displayed on the processing result display device 38 from the information of the recycle processing method decision result on the basis of the information read out from the printed circuit board assembly 67. On the other hand, the information 64 concerning the parts to be separated in the process is printed out on a sheet of paper or the like by means of the information output printer 48. The information as outputted may contain the identification number, name, material, weight, recycle processing method and the use history of each part separated in the process as well as the manufacturer name of the manufactured article in which the parts are used, the article name, the model name, the manufactured date, the manufacture ID number, etc. of the article, which are displayed in the form of characters and bar codes. The disassembling worker 61 works while viewing the contents displayed on the processing result display device 38. In the case of the processing result display device 38 shown in FIG. 15, a reuse-destined part (transformer A 65) which is then placed on a reuse-destined part transferring line 66 after having affixed with reuse-destined part information 64. The transformer A 65 is then sent to a succeeding part restoration treatment process, wherein the process or treatment is performed in accordance with the reuse-destined part information 64.

In any case, the article, the part, the assembly and the material sent to the respective succeeding treatment process or processing factory concerned should be affixed with the information which is required for the recycle processings mentioned above. Thus, the proper recycle processings decided by the recycle method decision processor unit 29 can be carried out successively in the relevant processes or the facilities, respectively. In this manner, the manufactured article recycling system according to the present invention can be operated.

As is apparent from the foregoing, according to the invention incarnated in the instant embodiment, the proper or appropriate recycle processings of discarded articles can be determined or decided and executed. Thus, the manufactured article recycling system according to the invention can make significant contribution to economization of energy consumption, reduction of amount of wastage and prevention of environmental pollution due to harmful materials or substances. Besides, the use history information of the manufactured article can be made easily available.

Next, description will be made of a second embodiment.
(Problems in the Present Status and Social Trend)

The discarded articles have to be processed or treated at least in such manner that harmful material/substance, handling of which is accompanied with hazard, are separated from the discarded article and processed or treated properly, respectively, so that the harmful material/substance and the hazardous material/substance to be treated do not exert adverse influences to the human beings, environment and others. However, in the present status, such processing or treatment is seldom performed. Above all, the discarded electronic machinery such as discarded appliances for home use, computers and the like are shredded straight-forwardly without undergoing any harmful material/substance separating treatment to be used for reclamation in a stable-type final disposal place.

In the situations mentioned above, it is confirmed that from the shredded dusts of the discarded appliances for home use reclaimed at the stable-type final disposal place, harmful material/substance such as heavy metals flows out to contaminate soil environment. It is expected that in the near future, the discarded articles for domestic use, discarded electronic machinery, discarded cars and other will be inhibited from disposal for reclamation in the stable-type final disposal place but have to be disposed in a managed-type final disposal place (which is constructed by laying a rubber sheet on the ground so that the harmful material/substance does not impregnate into soil and which is periodically inspected whether or not harmful material/substance has flown out or dissolved into soil and water) and an isolation-type final disposal place (where the site for landfill is isolated from the soil). The number of the managed-type final disposal places is small throughout country, and it is reported that the remaining landfill capacity is for a few years at the most. Incidentally, the number of the isolation-type final disposal place is further smaller.

Such being the circumstances, it will become necessary to separate and remove the harmful material/substance in advance at the least before the disposal of the discarded articles. The landfill costs in the managed-type final disposal place and the isolation-type final disposal place are considerably high when compared with the landfill cost in the stable-type final disposal place, and it is expected that the former will further increase because of shortage of the disposal places or sites. Besides, because of a small number of the disposal places or sites in the physical sense, it is expected that the cost involved for transporting the wastes to the disposal site will increase furthermore. Thus, also from the economical viewpoint, it is necessary to separate and remove the harmful material/substance in advance.

However, in practice, an attempt for separating/removing harmful material/substance from a given discarded article will encounter such a problem that the harmful material/substance used in the given discarded article can not be identified or determined. Additionally, it will be necessary to indicate that the discarded article undergone harmful material/substance removal treatment is harmless. The second embodiment of the invention concerns a recycling system which is capable of separating and removing harmful material/substance from the discarded article.

The manufactured article recycling system according to the instant embodiment of the invention features that decision is made as to whether or not the discarded article destined for the recycle processing or the disposal processing contains harmful material/substance or hazardous material/substance which is hazardous for handling, and when such material/substance is contained, a procedure for separating the component parts containing harmful material/substance or hazardous material/substance as determined from the discarded article is provided. Besides, the instant system features that separation of the component parts containing the harmful material/substance and the hazardous material/substance for handling is recorded.

Figure 23:
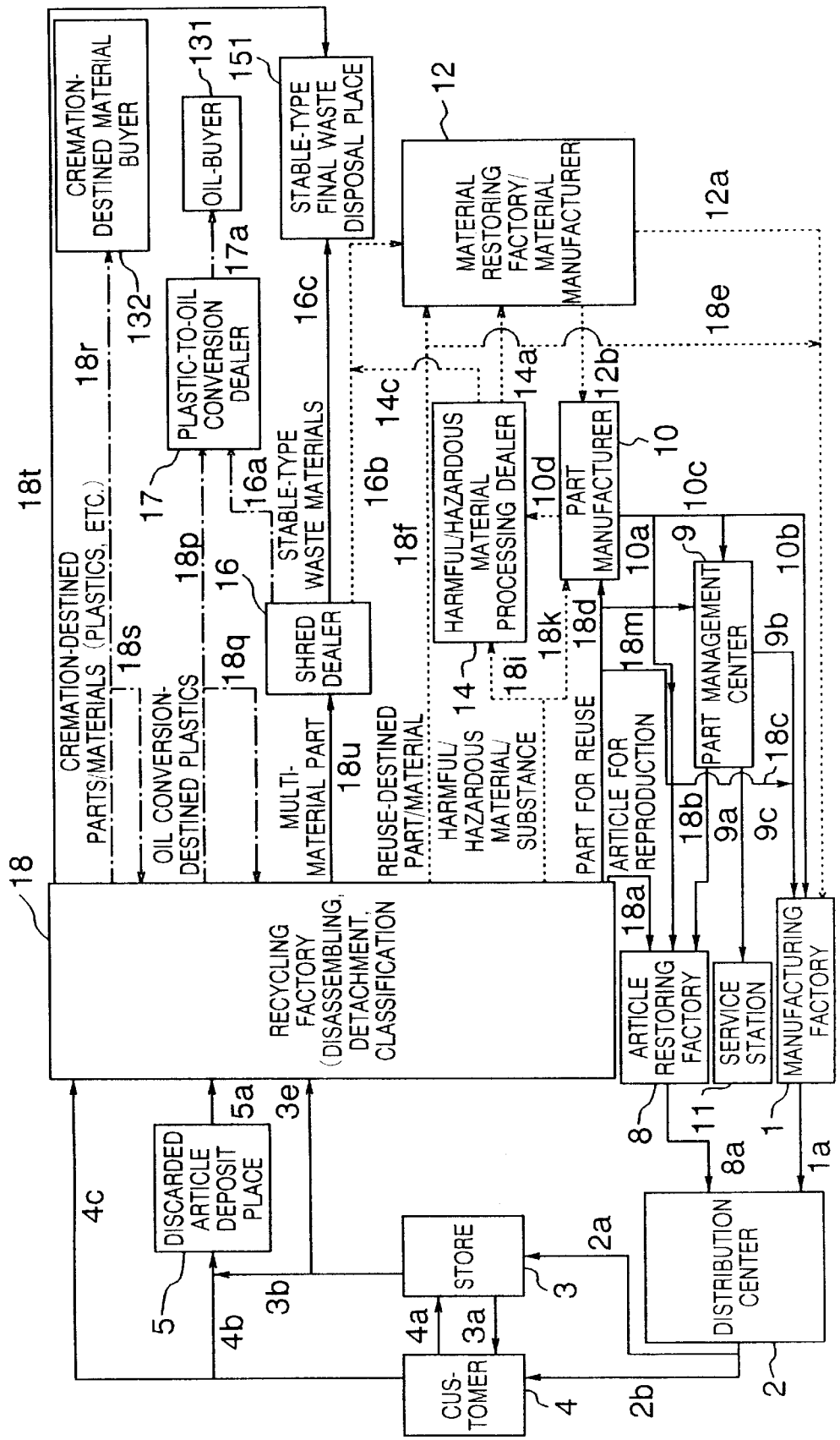
FIG. 23 shows a configuration of a recycling system according to the present invention (with routes extending from manufacture of article to recycle/waste)

FIG. 23 illustrates, by way of example, a flow of manufactured articles from the manufacturing thereof to the recycling and the disposal as the waste. In the following, the flow will be elucidated in a sequential order, starting from a manufacturing factory 1. Articles are manufactured in the manufacturing factory 1 of a given manufacturer to be shipped to a distribution center 2 (route 1*a*). After temporal storage at the distribution center 2, the articles are delivered or transported to stores 3 (route 2*a*), where the articles are purchased by customers 4 (route 3*a*). Of course, there is conceivable such a case where the articles are delivered directly to the customers 4, as in the case of a mail shopping or the like (route 2*b*). The customer 4 will discard the article purchased from the store 3 after having used it for a predetermined period. The discarded articles will follow a route in which the discarded articles are collected by an organization of a local government, a tertiary industrial company, a collecting dealer or the like at a discarded article deposit place 5 (route 4*b*) or a route in which the store 3 receives the discarded articles from the customer 4 for sending them to the discarded article deposit place 5 (route 3*b*). At the discarded article deposit place 5, the discarded articles are classified on a category or class basis. Thereafter, the discarded articles are sent to a recycling factory 18 (route 5*a*). Additionally, there is conceivable some case in which the store 3 receives the discarded articles from the customers 4 to send them directly to the recycling factory 18 (route 3*e*). Further, there is such a case the other case in which the customer 4 directly sends the discarded article to the recycling factory 18 through the medium of a door-to-door delivery service or the like means (route 4*c*). In conjunction with the recycling factory, several different types of recycling factories can be conceived, as exemplified by a maker-based recycling factory which accepts the discarded articles of a specific maker or manufacturer, a recycling factory which is capable of accommodating the discarded articles manufactured by unspecific manufacturers and additionally a recycling factory which limits the category or type of the acceptable articles. In the recycling factory 18, the methods for processing the discarded articles as collected are classified, as mentioned below, the processings are conducted on the discarded articles correspondingly on a class basis.

In the recycling factory 18, the methods of processing the discarded articles as collected are classified in the following manner to execute the processings corresponding to the classifications.

(1) In the recycling factory 18, "discarded articles capable of restoration" are selected from the discarded articles collected, whereon those which can be restored are subject to the processings for the restoration such as exchange of parts. On the other hand, the discarded articles decided as being incapable of restoration, the component parts constituting such discarded articles are classified as follows.

(2) "parts containing harmful/hazardous substances and requiring specific processing or treatment",
(3) "parts to be reused as parts",
(4) "parts or materials to be reused as restored material",
(5) "parts or materials to be reused as energy resource (for oil extraction)",
(6) "parts to be reused as energy resource (by burning)",
(7) "parts or materials to be disposed of for reclamation", and
(8) "composite parts containing neither harmful nor hazardous material and to be fragmentated intact".

In this way, the component parts are classified into eight types of parts or materials (1) to (8) mentioned above.

Next, in conjunction with the parts or materials classified into the types (1) to (8), the part distribution/delivery routes starting from the recycling factory 18 will be explained.

(1) "The discarded article capable of restoration" is delivered to an article restoring factory 8 (route 18*a*). After having undergone article restoration processing, the article once discarded is again sent by way of the distribution center 2 (route 8*a*) to the store 3 (route 2*a*) as the restored article to be sold to the customer 4 (route 3*a*). After the use by the customer 4, the restored article is collected again as the discarded article, whereon the discarded article undergoes the recycle processing described above. The article restoring factory 8 may be located within the manufacturing factory 1 of a given manufacturer or within a recycling factory.

(2) "Some of the parts containing harmful/hazardous materials/substances and requiring special treatment such as detoxication" will be treated properly by a part manufacturer (route 18k), some of them will be sent to a harmful/hazardous material processing or treating factory 14 built to this end to undergo proper treatment (route 18*i*) and some will be sent to a harmful/hazardous material processing factory 14 by way of the part manufacturer 10 (route 10*d*). Further, some of the parts will undergo proper processings or treatment in the recycling factory 6. "The parts containing harmful/hazardous materials and requiring special processing or treatment such as detoxication" are classified into restoration-destined materials and waste materials after the proper treatment, whereon the restoration-destined materials are sent to a material restoration factory/material manufacturer 12 (route 14*a*), while the waste materials are disposed of for reclamation (route 14*c*).

(3) "The reuse-destined parts as parts" are reused by way of the following routes, i.e., (a) reuse-destined parts supplied to the article restoring factory 8 to be reused as parts of restored article (route 18*b*), (b) reuse-destined parts sent to the manufacturing factory 1 to be used as parts of articles manufactured newly (route 18*c*), (c) reuse-destined parts sent to a part management center (part warehouse) 9 to be once stocked (route 18*m*) and thereafter sent to the article restoring factory 8 to be used as the parts for restored articles (route 9*a*), (d) the reuse-destined parts sent to the manufacturing factory 1 to be used as parts for articles manufactured newly after stocking at the part stock/management center 9 (route 9*b*), (e) the reuse-destined parts sent to a service station 11 where maintenance of the articles is performed to be used as parts for maintenance after stocking at the part stock/management center 9 (route 9*c*), (f) reuse-destined parts sent to a part manufacturer 10 (route 18*d*) to undergo proper services and thereafter sent to the article restoring factory 8 to be used as the parts for restored articles (route 10*a*), (g) reuse-destined parts sent to the part manufacturer 10

(route 18d) for undergoing proper services and then sent to the manufacturing factory 1 to be used as the parts for articles to be newly manufactured televisions (route 10b), (h) reuse-destined parts sent through the part stock/management center 9 (route 10c) to the article restoring factory 8 (route 9a), (i) reuse-destined parts sent to the manufacturing factory 1 through the part stock/management center 9 (route 9b), and (j) reuse-destined parts sent to the service station 11 via the part stock/management center 9 (route 9c).

(4) "The discarded parts or materials to be reused as the restored material" are fragmentated in the recycling factory 18, whereon some of the shredded or fragmentated materials will be sent to the manufacturing factory 1 as the material for new parts (route 18e) while the others will be sent to the material restoring factory/material manufacturer 12 (route 18f). The material sent to the material restoring factory/material manufacturer 12 undergoes a material restoration processing, whereon some of the processed or treated materials will be sent to the manufacturing factory 1 as materials for new parts (route 12a) while the others will be sent to the part manufacturer 10 to be used as the materials for new parts (route 12b).

(5) "The parts or materials to be reused as energy resource (for oil extraction)" are supplied to a dealer 17 engaging in plastic-to-oil conversion (route 18p) to be converted into oil which is sold to an oil-buyer 131 (route 17a). On the other hand, when a plastic-to-oil conversion facility is installed within the recycling factory 6, the parts or materials concerned are converted into oil which is used as the energy resource within the recycling factory 18 (route 18q).

(6) "The parts or materials to be reused as energy resource (by burning or cremation)" are transferred to a cremation-destined material buyer 132 (route 18r). Further, in case a combustion heat utilizing electric generator is installed within the recycling factory 18, the parts or materials concerned are burned within the recycling factory 18 to be used as an energy resource (route 18s).

(7) "The discarded parts or materials to be disposed of for reclamation" undergo fragmentation in the recycling factory 18, as occasion requires, to be thereby disposed of at a landfill 151 (route 18t). 0134-8]

(8) "The composite parts containing neither harmful nor hazardous materials and to be shredded and classified intact" are transferred to a dealer engaging in shredding business (route 18u) to be shredded and classified, whereon oil-oriented plastic is transferred to the dealer 17 engaging in plastic-to-oil conversion (route 16a) to be converted into oil. On the other hand, the restoration-destined materials are transferred to the material manufacturer 12 to undergo restoration processing (route 16b). Other stable-type waste materials are transported to the landfill 151 to be reclaimed for landfill.

The manufactured articles follows the routes described above from the manufacture to the recycle processing and the disposal as the waste.

In order to perform the recycle processings on the component parts of the discarded articles as classified in the manners described above, a recycling system for determining or deciding the manufactured articles to be subject to the processings as well as the processing methods and recording the processing methods as determined.

In the first place, description will be directed to the manufactured articles subject to the processing. The manufactured article undergoing the processing is provided with features or facilities mentioned below.

Component parts (single-material parts and multi-material parts) which constitutes a manufactured article concerned are previously affixed at least with information of inherent codes indicating the parts and information concerning the materials forming the parts, respectively. As an example of the inherent code identifying the part, there may be mentioned a part name or identifier and a part number. Further, as an exemplary one of the methods of affixing the information on the part, there can be maintained a method of indicating the information in the form of characters and symbols, bar code or the like on the surface of the part. The standards for determining the basis for affixing such information to the parts can be established by designer or other person at the time when the disassembling procedure is determined or when the discarded article concerned was designed. However, when the case the parts are purchased from external part manufacturer, the latter may determine the information and affix the information to the part.

Figure 24:
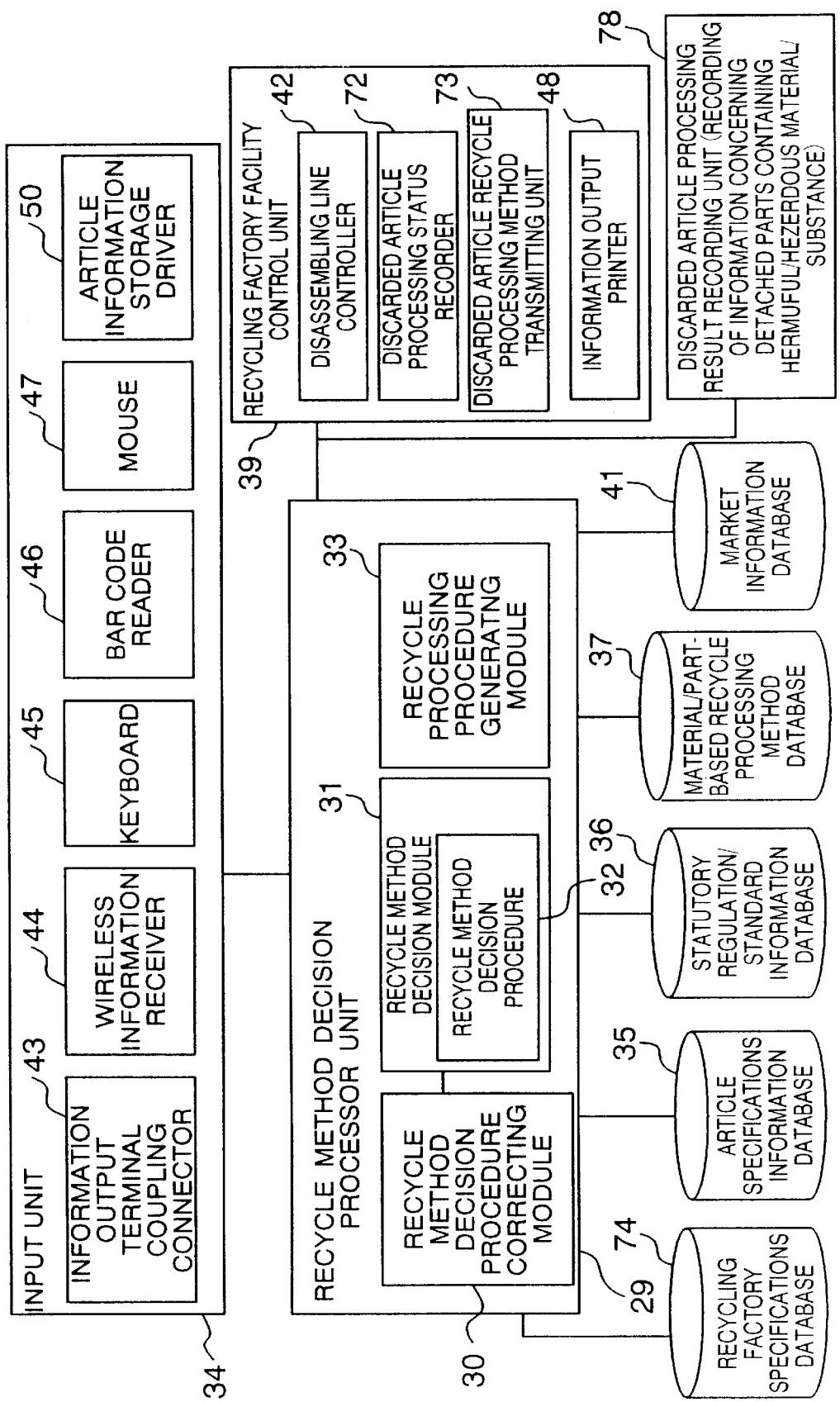
FIG. 24 is a view illustrating, by way of example, a configuration of a recycling processing method decision/recycle processing executing system according to the present invention.

Next, description will turn to the recycling system. FIG. 24 shows a configuration of the recycling system according to the instant embodiment of the invention.

Referring to FIG. 24, the recycling system is composed of a recycle method decision processor unit 29 for determining or deciding the recycle processing method, an input unit 34 for inputting or loading information or data, a recycling factory facility control unit 39 for controlling equipment or facilities installed within a recycling factory, a discarded article processing result recording unit 78 for recording information concerning harmfulness, separation or removal of hazardous components and the like, a statutory regulation/standard information database 36 for storing information of various legal controls or statutory regulations, standards, etc., a material/part-based recycle method database 37 for storing the recycle processing methods on a material-by-material basis and on a part-by-part basis, an article specifications information database 35 for storing article specifications information, a market information database 41 for storing information of the market prices of used parts, information concerning the demand for the parts concerned, and a recycling factory specifications database 74 for storing the specifications of the recycling factory and the like. Parenthetically, in FIG. 24, blocks which have some functions as those shown in FIG. 5 are designated by like reference characters.

In the following, functions of the individual blocks will be elucidated, respectively.

(1) Article Specifications Information Database 35

With a view to allow the specifications information of articles subject to the processing to be referenced at the recycling factory 18, the article specifications information database 35 storing the specifications information of the articles subject to the processings is previously generated or created. Such article specifications information may be generated by a designer of the article upon designing thereof or after the designing. Registration of the article specifications information in the article specifications information database 35 may be carried out by a manufacturer of the article or a businessman entrusted by the manufacturer. The information registered in the article specifications information database 35 may contain only the information of articles (single type of articles or plural types of articles) of a certain specific manufacturer or alternatively the information of articles (single type or plural types of articles) of plural manufacturers.

As the contents of the article specifications information, there may be enumerated manufacturer name, category or class of article, name of article, model name, manufactured date, manufacture ID number, component part information (part name, part number, part manufacturer, model name of part, harmfulness or non-harmfulness, possibility of reuse, use history, etc.), disassembling or decomposing methods (disassembling procedure, tool necessitated, disassemble guiding chart, etc.), standard number of disassembling steps or processes involved (hours), etc.

The disassembling methods mentioned above are previously determined by the designer or other person the time of manufacture of discarded article. In this conjunction, it is required at the least to determine the disassembling method such that the discarded article concerned can be disassembled on the basis of the part affixed with the inherent code mentioned hereinbefore. To say in another way, all the parts detached or removed in accordance with the disassembling method must have inherent codes identifying these parts, respectively. Of course, information concerning the methods for further disassembly the parts separated or removed in accordance with the above-mentioned disassembling method may be made available.

(2) This is a database storing the information of the statutory regulations and the standards concerning the sales of manufactured articles, discarded articles and discarded article processings or treatments in various countries concerned. As the information of this sort, there may be mentioned, for example, such information which concerns harmful materials/substances an hazardous materials inhibited from use in manufacturing articles or harmful materials, substances ad hazardous materials/substances which must not be used in reclaiming for landfill at the stable-type final disposal place or harmful materials/substances and hazardous materials/substances which must not be disposed of at managed-type final disposal place. The statutory regulations information may be acquired from official gazettes or the like and registered in a database. The information concerning the standards may be acquired from the organization which is in charge of supervising the standards and registered in a database. In this conjunction, it is preferable to create the databases on a category basis of the articles.

(3) Material/Part-based Recycle Method Database 37

This is database storing information concerning the recycle processing methods and disposal processing methods on a material basis and a part basis and among others the processing methods for processing harmful materials/substances, the parts containing harmful materials/substances and the parts containing harmful materials/substances or hazardous materials/substances (e.g. detoxification processing method, restoration processing methods, disposal processing methods) and the information concerning persons capable of performing the processings mentioned above (residence address, communication address, processing or treatment cost, etc.). It is preferable to prepare the databases on a material basis and parts basis, respectively.

(4) Market Information Database 41

This is a database containing information of the demand for used parts concerned, information of the market prices of various restored materials/substances concerned, information of purchasing prices for various restoration-destined used materials, information concerning possibility of accommodation by recycle processing persons, harmful/hazardous material processing persons and final disposal processing persons, information of used part buyers and various processing facilities (name, residence, television number, facsimile number, etc.), information of costs involved in various transfers and transportations.

Generation of the databases (1) to (4) mentioned above as well as maintenance/management thereof such as addition, deletion and correction of data may be performed internally of each company or alternatively by a corporation established in common by a plurality of companies or a public organization.

(5) This is a database storing various specifications information of the recycling factory 18 for processing the discarded articles. As the specifications information, there may be mentioned information concerning the costs involved in the processings conducted in the recycling factory 18 (e.g. cost required for processing per unit time, shredding cost per unit weight or unit volume). This database should be provided in each of the recycling factories, and maintenance/management of data should be carried out on a factory-by-factory basis.

(6) Recycle Method Decision Processor Unit 29

The recycle method decision processor unit 29 further includes a recycle method decision module 31 storing recycle processing decision procedures 32, a recycle method decision procedure editing module 30 and a recycle procedure generating module 33. (The recycle processing encompasses waste disposal processing.) Additionally, it is necessary to modify the rules for the recycle processings and the disposal processing as well as the recycle method decision procedure based on the above rules, as the occasion demands, because new recycle processing methods and disposal methods are developed from one to another in the course of time lapse. For this reason, the recycle method decision procedure editing module 30 mentioned above is provided in order to make it possible to correct or modify the recycle method decision procedure.

Connected to the recycle method decision processor unit 29 are the four databases mentioned above so that the recycle method decision processor unit 29 can decide the recycle processing methods and generate the recycle processing decision procedures for the discarded articles on the basis of the information stored in the individual databases.

(7) Input Unit 34

The input unit 34 is a device for inputting to the recycle method decision processor unit 29 the article information of the discarded articles transported to the recycling factory 18, which information contains at least the manufacturer name, article name, type or model, manufactured date and the manufacture ID number. The input unit 34 can equally be used for inputting the information affixed to be component parts detached from the discarded article.

In order to cope with various discarded articles, the input unit 34 should be equipped with devices mentioned below.

For coping with an article which is equipped with an article information storage unit storing article information and an article information output terminal for outputting externally the article information, the input unit is provided with an information output terminal coupling connector 43 for reading out the article information. Further, for the article which is imparted with a radio transmitter function for sending the article information by wireless, the input unit is provided with an information receiver unit 44 for receiving the article information from the discarded article by wireless.

Furthermore, for coping with the discarded article equipped with a removable type article information storage unit, the input unit is provided with an article information storage drive unit 50 for driving the article information storage unit detached from the discarded article. Additionally, a keyboard 45 and a mouse 47 are provided in association with the input unit for visually reading the article information indicated on a casing of the discarded article and inputting the information manually.

For reading out the article information indicated on the casing or the like of the discarded article in the form of a bar code, there may be provided a bar code reading device 46.

The recycling factory facility control unit 39 is additionally provided with a disassembling line control unit 42, a discarded article recycle method transmitting apparatus 73, an information output printer 48 and a discarded article processing status recording apparatus 72, which will be elucidated below in (8) to (11).

(8) Disassembling Line Control Unit 42

The disassembling line control unit 42 is connected to the recycle method decision processor unit 29 in order to control operation of the disassembling work line in the recycling factory in accordance with the discarded article processing procedure generated by the recycle method decision processor unit 29.

The discarded article recycle method transmitting apparatus 73 is connected to the recycle method decision processor unit 29 for indicating or messaging to workers concerned in the recycling factory 18 the discarded article processing procedure generated by the recycle method decision processor unit 29. As such discarded article recycle method transmitting apparatus 73, there is available a system for displaying as image information the processing procedure concerned with the aid of a display deice such as television, display monitor or the like and a system for messaging the processing procedure in the form of voice information.

(10) Information Output Printer 48

The information output printer 48 is to serve for printing out information of parts detached or separated from the discarded article upon disassembling as well as materials/substances thereof (such part name, material/substance name, processing method, succeeding process destination, presence-or absence of harmful material/substance, etc.) in the form of characters, symbols, bar codes or the like.

(11) Discarded Article Processing Status Recording Apparatus 72

The discarded article processing status recording apparatus 72 is connected to the recycle method decision processor unit 29 for the purpose of recording the processing status of the discarded articles transported into the recycling factory 18. To this end, there maybe employed, for example, a video camera or the like picture recording apparatus.

(12) Discarded Article Processing Result Recording Unit 78

The discarded article processing result recording unit 78 is employed recording the information concerning the parts detached from the discarded articles. Among others, the real results of removals of those parts which contain harmful materials/substances are recorded.

In the foregoing, description has been made of the system configuration according to the instant embodiment of the invention.

Now, operation of the recycling system according to the instant embodiment of the invention will be described.

Figure 25:
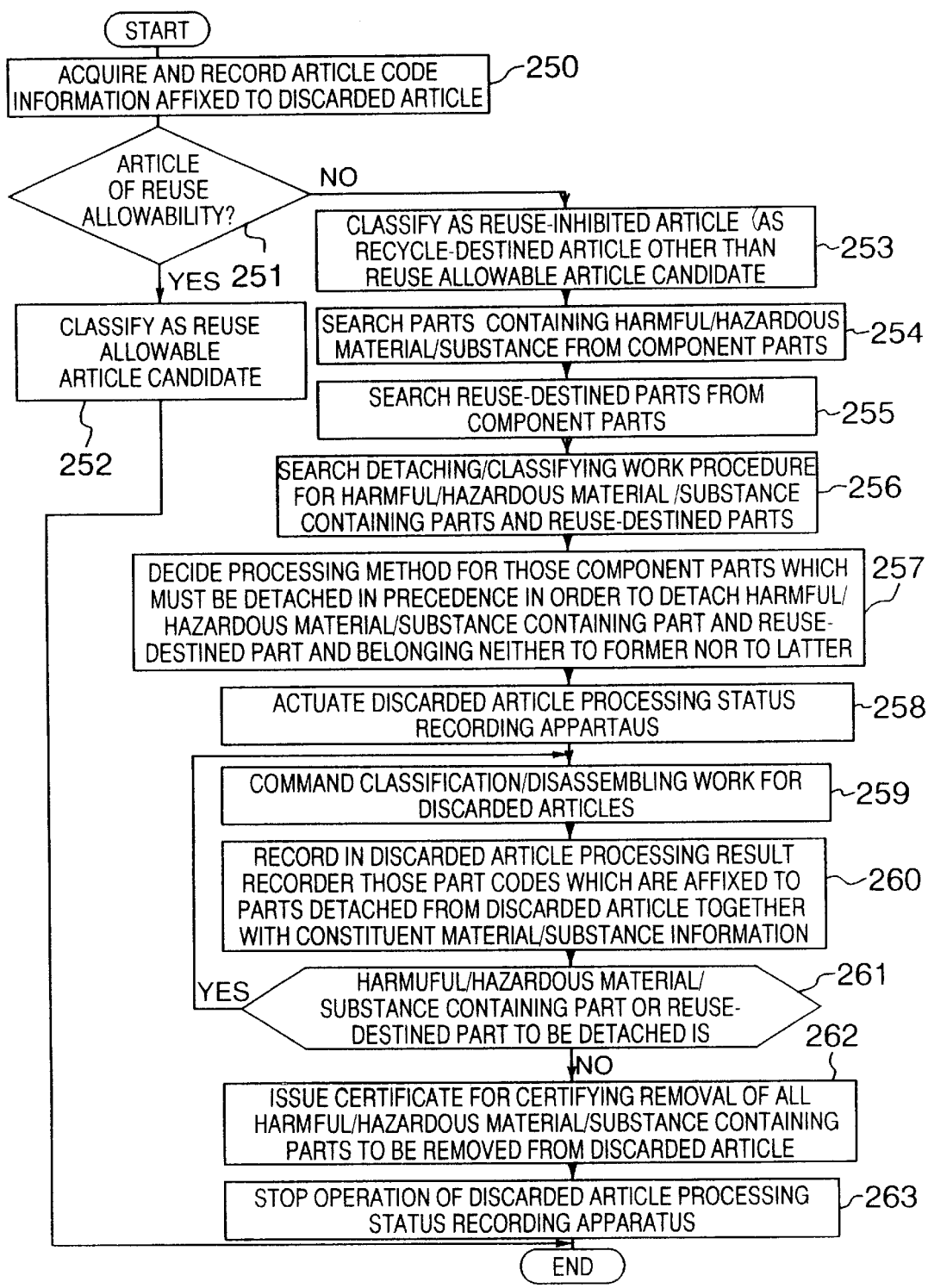
FIG. 25 is a view for illustrating a procedure for processing a discarded article.

FIG. 25 shows a procedure for processing a discarded article according to the instant embodiment of the invention. In the following, processing operations of the recycle method decision processor unit 29 according to the instant embodiment will described in conformance with the procedure.

Referring to FIG. 25, the article code information such as manufacture name, category of article, article name, model name, manufactured date, manufacturing number affixed to the discarded article is obtained, whereon the article code information as obtained is recorded on the discarded article processing result recording unit 78 shown in FIG. 24 (step 250).

In the step 250 of the discarded article processing, the article information affixed to the discarded article transported into the recycling factory 18 and containing at least the manufacturer name, article name, model or type, manufactured date and manufacture ID number is acquired to be inputted to the recycle method decision processor unit 29. As the methods for inputting the article code information affixed to the discarded article into the system, as in the case of the first embodiment, there may be conceived those mentioned below.

(1) A method of inputting and recording article information indicated on a label or the like attached to the discarded article in the form of characters, symbols or the like by reading visually the information by the worker and inputting the information with the aid of the keyboard 45 and the mouse 47. Parenthetically, there may be a case where the article information is directly stamped or printed on a casing of the discarded article.

(2) Method of inputting and recording the article information indicated on a label or the like stuck to the discarded article in the form of a bar code by means of a bar code reading device of course, there may be a case where the bar code is directly stamped or printed on a casing of the discarded article.

Figure 9:
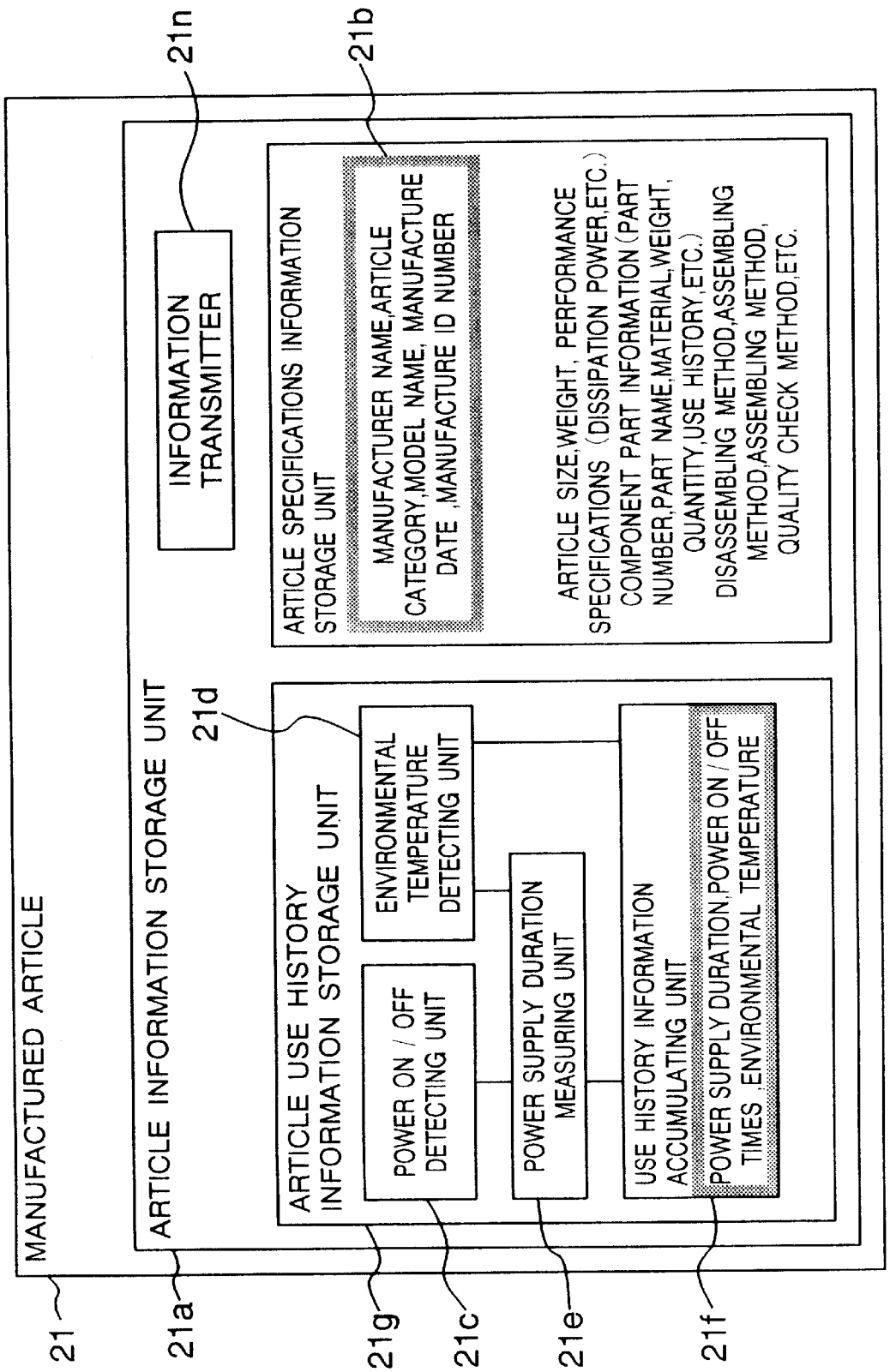
FIG. 9 is a view illustrating an exemplary structure of an article, FIG. 10(a–b) is a view illustrating an exemplary structure of an article.

(3) A method of reading the article information stored previously in a memory incorporated in the discarded article at the time of the manufacture thereof. In that case, the article is provided with an article information output terminal 21*h*, as illustrated in FIG. 6, to which the information output terminal coupling connector 43 is connected to thereby read out the article information or alternatively an article information storage unit 21*a* may be provided in the article, as illustrated in FIG. 9, for sending out by wireless the article information which is received by the radio information receiver unit 44 for inputting the article information into the system, as illustrated in FIG. 17.

Furthermore, the use history information stored in the discarded article may be inputted. Subsequently, it is decided whether the discarded article destined for recycle has possibility of restoration or not (step 251). In that case, the article specifications information is retrieved from the article specifications information database 35 on the basis of the article information of the discarded article concerned as acquired in the aforementioned step 250. FIG. 7 illustrates an example of data of the article specifications information. In the first place, it is decided whether or not the statutory regulations/standards to be abided by are met when the restored article is put on the market by comparing the acquired article specifications information with the statutory regulations/standards retrieved from the statutory regulation/standard information database 36. For the article satisfying the statutory regulations/standards, decision is then made as to whether or not reuse allowability criterion determined by the manufacturer of the discarded article concerned can be satisfied. Such standards are previously stored in the article as one of the article specifications information by the manufacturer. In the case of the exemplary data shown in FIG. 7, the years defining the restoration-allowable life limit is contained in the basic information. In the recycle method decision processor unit 29, on the basis of the manufactured date information contained in the article information acquired in the step 250 and the discarded article processing date, years lapsed from the manufacture of the article concerned is calculated, whereon years lapsed is compared with the restoration-allowable life limit to thereby decide the restoration allowability. The article satisfying the restoration allowability is decided to be a restoration allowable article candidate.

The discarded article decided to be the restoration allowable article candidate in the step 251 is then classified into a group of the restoration allowable article candidates (step 252). Subsequently, the article is sent to the article restoring factory 8. In the article restoring factory 8, the discarded articles undergo again the restoration allowability decision process to be classified into those subject to the restoration processing and the other.

The discarded articles decided as the restoration inhibited article in the step 251 mentioned above are classified into a group of restoration-inhibited articles (to discriminate from the other recycle-destined articles than the restoration-inhibited articles) (step 253). Additionally, the following recycle processing steps are executed.

The discarded articles which have been decided as the restoration-inhibited articles are then subjected to a check processing for determining whether or not any one of the component parts of the restoration-inhibited article contains harmful material/substance or hazardous material/substance (step 254). To this end, material/substance information of the component parts contained in the article specifications information of the restoration-inhibited article as obtained in the step 250 mentioned above is compared with the harmful/hazardous material/substance information retrieved from the statutory regulation/standard information database 36 to thereby search the component parts containing the harmful material/substance or hazardous material/substance.

Subsequently, on the basis of the component part information contained in the article specifications information obtained in the aforementioned step 250, decision is made as to whether or not these exist reuse-destined parts among those constituting the discarded article (step 255). The reuse-destined parts are determined in advance by the manufacturer of the discarded article so that the information of the reuse-destined part is stored on a part-by-part basis as one of the component part information which is contained in the article specifications information of the discarded article (see FIG. 7). However, even when the information predetermined by the manufacturer as mentioned above is unavailable, further decision processings mentioned below is executed for those component parts which are decided as "commercially demanded on the basis of the used part demand information stored in the market information database 41.

For a given component part for which the information "commercially demanded" is derived from the used part demand information, the purchase price of a corresponding used part commercially handled by the sued part dealers is retrieved from the used part demand information. Furthermore, the disassembling cost involved in separating or detaching the part from the discarded article as well as the fee charged for transportation is estimated by calculation, whereon the cost corresponding to the sum of the disassembling cost and the transportation fee is compared with the purchase price of the used part dealers for determining whether or not profit is resulted. When the profit is gained, then the part concerned is decided.

Next, calculation or arithmetic estimation will be elucidated in detail.

At first, description will be directed to a disassembling cost estimating calculation processing method which is carried out by the recycle method decision processor unit 29. Information or data required for the part disassembling cost estimating method and the information source from which such information can be obtained are mentioned in the following sections captioned (1) to (3), respectively.

(1) Information of Disassembling Process Time Required for Separating or Detaching Part As can be seen from the contents of the article specifications information database 35 shown in FIG. 26, the above-captioned information can be made available by registering previously the disassembling method information in the article specifications information database 35. When one of the disassembling method information contained in the article specifications information of the article is given by a disassembling process time required therefor, the design of the article concerned arithmetically estimates a standard disassembling process (standard time) in advance to thereby store the estimated value in the article specifications information database 35, as shown in FIG. 26. By way of example, referring to FIG. 26, when the used article demand exists for the part "PWB ASS'Y" identified by a disassembling sequence number "7" (i.e., when the recycle method decision processor unit 29 determines on the basis of the used part demand information contained in the market information database 41 that the part "PWB ASS'Y" is commercially demanded), the standard disassembling process costs for the disassembling sequence numbers "1" to "7" are added together to thereby calculate the standard disassembling process cost for disassembling and separating or detaching the components "PWB ASS'Y".

(2) Cost Required for Unit Disassembling Process Overhead (Unit Time) in Recycling Factory Conducting Discarded Article Processing or Treatment This cost can be made available by registering in the recycling factory specifications database 74 the cost required for unit disassembling process time on a factory-by-factory basis.

(3) Various Costs Such as Packing Cost, etc.

The costs can be determined by registering the various or miscellaneous costs such as part packing costs in the recycling factory specifications database 74 on a factory-by-factory basis.

On the basis of the information mentioned above, the part disassembling cost can be arithmetically estimated. For calculating the cost for disassembling and detaching a given part, the standard disassembling process number mentioned at (1) is multiplied by the cost required for the unit disassembling process (time) in the recycling factory conducting the discarded article processing or treatment, to thereby determine the disassembling/separating cost. Further, the disassembling/separating cost is added with predetermined miscellaneous costs such as packing cost read out from the recycling factory specifications database 74.

Next, description will be made of the information or data required for calculating the transporting fee or cost involved in transporting the part as well as the relevant information source.

It is assumed that a door-to-door delivery service is utilized for the transportation of reused parts. The transportation fee is determined in dependence on outer dimensions of the object for transportation and transportation distance.

(4) Outer Dimensions Information of Component Part

This information can be obtained by registering the outer dimensions on a part-by-part basis in the article specifications information database 35.

(5) Addresses Information of Used Part Dealers

This information can be obtained by registering the addresses of the reused-part buyers or the like in the market information database 41.

(6) Information of Transportation fee Charged by Door-to-door Delivery Service (Transportation fee List)

This information can be obtained by registering the information of the transportation fee of the door-to-door delivery service in the market information database 41.

On the basis of the information mentioned above, the transportation fee of the part is estimated. More specifically, the outer dimensions of a part concerned is estimated on the basis of the outer dimensions information of that part, while the transportation distance is arithmetically estimated on the basis of the address information of the used part dealer who purchases the part. On the basis of both the information mentioned above, the transportation fee to be charged for the door-to-door delivery service is searched from the relevant database. In succession, the cost determined as the sum of the disassembling/separating cost (inclusive of the packing cost and other miscellaneous costs) and the transportation fee is compared with the part purchase price of the used part dealer retrieved from the market information database 41. When the disassembling/separating cost is lower than the purchase cost, it is then determined that the part concerned is to be disassembled and separated as the reuse-destined part.

Subsequently, the part containing harmful/hazardous material/substance identified in the aforementioned steps 254 and 255 as well as the separation/sorting procedures for the reuse-destined parts are determined by retrieving the relevant databases (step 256). More specifically, in the step 256, the disassembling procedure of the article determined previously by the designer thereof or other person is read out from the article specifications information database 35. FIG. 26 illustrates exemplary data of the disassembling procedure. In succession, of the part containing harmful/hazardous material/substance and the reuse-destined parts as determined, the last part detached in the disassembling procedure, i.e., the part having the disassembling sequence number of the greatest value is searched, whereon the procedure performed up to the disassembling or detachment of the part mentioned above is defined as the separation/sorting procedure for the part containing harmful/hazardous material/substance and the reuse-destined part. Further, for those of the parts detached in the course of the separation/sorting procedure for the part containing harmful/hazardous material/substance and the reuse-destined part as retrieved in the step 256 which belong to neither the class of the part containing harmful/hazardous material/substance nor the class of the reuse-destined parts, the relevant processing methods are determined (step 257).

By way of example, it is assumed that the separation/sorting procedure for the part containing harmful/hazardous material/substance and the reuse-destined part of a given article is decided to be the procedure up to the disassembling sequence number "9" in the article disassembling method information shown in FIG. 26 and that the part s which belong to neither the class of the part containing harmful/hazardous material/substance nor the class of the reuse-destined parts correspond to the parts of the disassembling sequence numbers "1", "2", "3", "4", "5", "6" and "8". For the parts decided as belonging to neither of both the classes mentioned above, the part numbers thereof are read out from the disassembling method information (see FIG. 26). On the basis of the part numbers, the component part information (see FIG. 7) is read out from the article specifications information of the article concerned as read out from the article specifications information database 35. Subsequently, on the basis of the component part information read out, the part processing methods are searched from the material/part-based recycle method database 37, which stores therein the processing or treating method information on a part-by-part basis and the processing method information on a material-by-material basis. The search of the part processing method information is performed in the order mentioned below.

(1) At first, on the basis of at least the name, manufacturer, part number and the part grade, presence or absence of the processing method inherent to a given part is determined by searching the material/part-based recycle method database 37. When the method concerned exists, then the method is decided as to processing method for the given part.

(2) By contrast, unless the processing method inherent to the given part, then decision is made whether the constituent material or substance constituting that part is of a single type or of a composite type.

(a) In Case Part is Constituted by a Single Material:

A processing method for that material or substance is retrieved from the material/part-based recycle method database 37. When no more than one processing method exists for the material concerned, then that one processing method is decided as the relevant processing method. On the other hand, when a plurality of processing methods are available for one material, then the unit profit for each of these processing methods is calculated in accordance with expression [(purchase price of material dealer)-(cost involved in preprocessing (shredding))], whereupon the costs determined for the processing methods, respectively, are compared with one another to thereby determine the processing method which can bring about the maximum profit. In conjunction with "the cost involved in the preprocessing (shredding) within the recycling factory 18", it is however noted that such preprocessing (shredding) in the recycling factory 18 is not required. The purchase prices of the material dealers are recorded in the material/part-based recycle method database 37 on a material-by-material basis. Thus, the former can be read out from the latter. Further, the cost involved in the preprocessing (e.g. shredding) in the recycling factory 18 is recorded in the recycling factory specification database.

(b) In Case Material Constituting a Part is of Composite Type:

Basically, this sort of material is decided to be transferred to dealer engaging in shredding business to undergo shredding/separation processing. However, when the materials constituting a part concerned include only different types of plastics, the profit per unit material is calculated in accordance with the expression [(disassembling processing of material by dealer)-cost involved in preprocessing (shredding) within the recycling factory 18)] on the basis of the purchase prices of the dealer 16 engaging in shredding business, the dealer 17 engaging in plastic-to-conversion and the cremation-destined material buyer 132, whereon the dealer giving the maximum profit is determined.

Before commanding the discarded article disassembling/classifying work to the worker, the discarded article processing status recording apparatus 72 is put into operation (step 258) to thereby start recording of the discarded article separation/sorting statuses. As the discarded article processing status recording apparatus 72, there may be employed, for example, a video camera and a video recorder. In that case, upon recording picture information on a recording medium (video tape or the like), there should be recorded at a starting portion of the record at least the article name (article category), type (model name), manufacturer name, manufactured date and the manufacturer number of the discarded article concerned.

Figure 27:
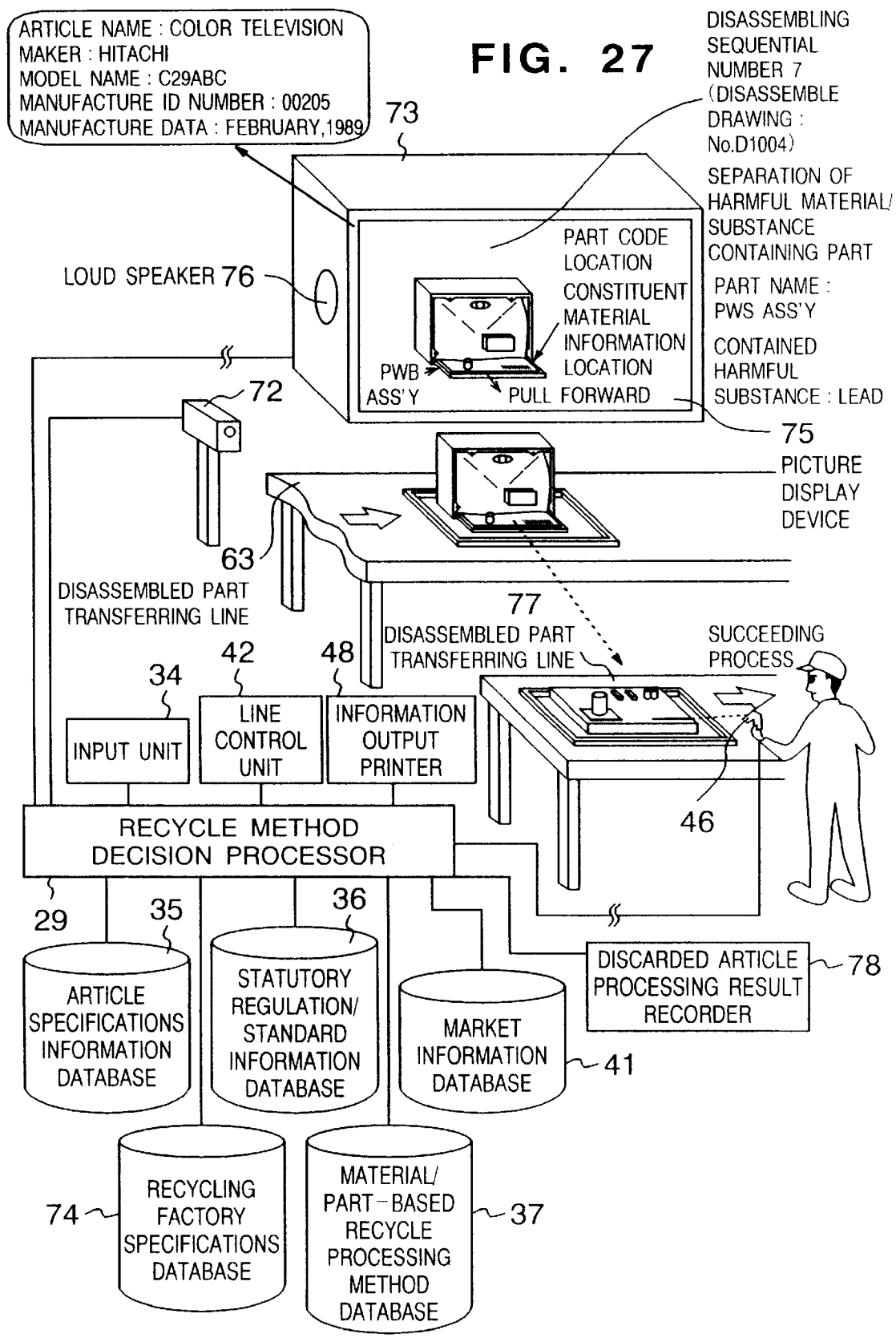
FIG. 27 is a view for illustrating pictorially a disassembling or detaching process in a recycling factory.

The separation/sortings are commanded to the workers in accordance with the separation/sorting procedure for the part containing harmful/hazardous material/substance, the reuse-destined parts and the other parts of the discarded article as retrieved and decided in the steps 256 and 257 (step 259). The commands can be validated with the aid of the discarded article recycle method transmitting apparatus 73. The discarded article recycle method transmitting apparatus 73 may be implemented by an image display device or a voice reproducing apparatus for giving commands to the workers in terms of image information or voice information. By way of example, description will be made of a case where the commands are issued on the basis of article disassembling information illustrated in FIG. 26. In this conjunction, FIG. 27 illustrates pictorially corresponding disassembling or detaching process.

When the detaching/separating command is to be issued for the part "PWB ASS'Y" having the detaching sequence number "7", a reference disassemble drawing No. (D1004) is read out from the article disassembling information, whereupon on the basis of the information read out, the disassemble drawing corresponding to the reference drawing No. is retrieved from the article specifications information database 35 and displayed on a picture display device 75. At this time point, it is displayed which of the part containing harmful/hazardous material/substance, reuse-destined part and the other part the part decided to be detached in the preceding step belongs to. Further, when the part to be detached belongs to the category of the part containing harmful/hazardous material/substance, then the harmful/hazardous material/substance contained in that part are displayed as well. Additionally, information concerning the quantity or number of parts to be detached and tools to be used is messaged in the form of voice. In the disassembling or detaching method illustrated in FIG. 26, "+D" designates a screw driver having a cross-like tip. Corresponding to the information for the tool "+D", voice information "plus driver" is generated and recorded. The voice information is transmitted to the worker by way of a loud speaker 76.

Furthermore, in order to make the worker to input information of the part code affixed to the detached part and information concerning the constituent material or substance, locations of the part code and the constituent material information are displayed.

The worker detaches the part(s) in accordance with the command and reads out the part code information and the constituent material information, both of which are inputted to the recycle method decision processor unit 29. The information read-out input method will differ in dependence on the manner in which the code information and the constituent information are made available. When the information concerned is indicated in the form of characters and/or symbols, the worker reads out visually the information and inputs it by manipulating the keyboard 45 and the mouse 47. On the other hand, when the information concerned is indicated in the form of a bar code, the worker uses the bar code reading device 46 for reading and inputting the information. (In the case of the example illustrated in FIG. 27, the bar code reading device 46 is used to this end.)

The information of the part code affixed to the part detached as well as the constituent material information as inputted and additionally the information concerning the category of the part (i.e., part containing harmful/hazardous material/substance or the reuse-destined part or the other part) decided as described above are recorded by the discarded article processing result recording unit 78 (step 260).

Moreover, for the so-called other part (i.e., part other than the part containing harmful/hazardous material/substance and the reuse-destined part), information concerning the processing method (shredding/separation or restoration of material or conversion into oil or incineration or landfill) is equally recorded. Besides, the information of the dealer for the parts decided in the manner described hereinbefore (e.g. dealer's name, code identifying dealer, etc) is also recorded.

Next, it is decided in a step 261 whether or not the part containing harmful/hazardous material/substance and/or the reuse-destined parts to be detached from the discarded article concerned as retrieved in the aforementioned steps 254 and 255 have all been detached or separated. This decision can be validated by deciding whether the information of the part bar codes affixed to the parts and that of the constituent materials have been recorded. If there remain the part containing harmful/hazardous material/substance or the reuse-destined parts to be detached, the procedure proceeds to the step 259 for commanding the disassembling and detachment. If otherwise, then a step 262 is executed.

A detoxification certificate certifying that the remaining portion of the discarded article from which all the part containing harmful/hazardous material/substance to be detached have been removed is harmless is printed out onto a sheet such as paper by means of the information output printer 48, whereon the certificate is applied to a portion of the discarded article remaining after removal of all the part containing harmful/hazardous material/substance (step 262).

In the detoxification certificate, the following information is written.

(1) At least the article name (article category), model (type name), manufacturer name, manufactured date and manufacture ID number of the discarded article undergone detoxification treatment (2) A list of parts constituting a remaining portion of the discarded article (part name, part number, part manufacturer, material/substance name)

(3) A list of part containing harmful/hazardous material/substance removed (at least names of part containing harmful/hazardous material/substance removed and names of harmful/hazardous materials/substances contained)

Finally, operation of the discarded article processing status recording apparatus 72 is stopped (step 263). In the foregoing, the processing procedures executed in the recycling factory 18 according to the invention incarnated in the instant embodiment have been described. The individual parts and/or assemblies removed and classified are sent to subsequent process or relevant dealers as decided, respectively. According to the instant system, the part containing harmful/hazardous material/substance can be removed or separated without fail, wherein a remaining portion of the discarded article from which the parts have been removed is sent to the dealer 16 engaging in shredding business along with the detoxification certificate. Thus, the dealer 16 engaging in shredding business can conduct the shred processing straight-forwardly. When such remaining portions of the discarded articles is to be disposed of for landfill, it is possible to reclaim them in a stable-type final disposal place. The dealer 16 engaging in shredding business can conduct the shred processing and the reclamation processing with ease because it is certificated that the waste parts he or she received contained neither harmful material nor hazardous material. On the other hand, the dealer 16 engaging in shredding business can not refuse flatly disposal of the waste because the non-harmfulness is certified. In this way, with the instant system, it is possible to execute the disposal processing of the discarded articles smoothly and safely (for human beings and environment).

Further, in the system described above, the contents of the processings conducted in the recycling factory 18 are recorded by the discarded article processing status recording apparatus 72 and the discarded article processing result recording unit 78. Thus, the processing contents can be confirmed as the need arises, to an advantage. Owing to this feature, a self-governing body which is in charge of supervising the recycling factories can easily confirm the contents of the processings executed in the factories.

Furthermore, since the part containing harmful/hazardous material/substance, reuse-destined parts and the other parts detached from the discarded article undergone the processing are fixed with respective code information and the constituent material information, the actual reception records of the parts can be facilitated because it is sufficient for preparing such records to read the information affixed to the parts. Besides, management of the parts as well as the decision as to the processing which the parts are to undergo can be facilitated.

Industrial Utility

As is apparent from the foregoing description, it is possible to decide and execute proper recycle processing of discarded articles in the manufactured article recycling system according to the present invention. Thus, the invention can make great contribution to economization of energy consumption which should otherwise increase, reduction in the amount of wastes, prevention of environmental pollution due to harmful materials and/or substances. Further, by virtue of easy availability of use history information of the discarded articles, the history information data can be referenced in designing a new article, which can enhance the reliability of manufactured article. Additionally, use life of a manufactured article can be extended, which in turn leads to economization of energy consumption and reduction in the amount of wastes. Furthermore, by making reference to the recycle rules taught by the invention at a stage of designing an article, manufacturing of article which can be recycled easily is much promoted.

What is claimed is:

1. A recycle system for a manufactured article, comprising:
   an input unit which inputs first information relating to the manufactured article;
   a storage unit which stores second information relating to recycle processes and third information relating to materials to be controlled by the recycle system;
   a computation unit which determines whether or not the first information includes information indicative of at least one of the materials stored as the third information, and which selects a recycle process from the second information according to the result of determination; and
   an output unit which outputs information of the selected recycle process.

2. The recycle system according to claim 1, wherein the third information includes material information of at least one of a harmful material, a hazardous material and a multi-material.

3. The recycle system according to claim 2, wherein the computation unit selects a particular process from the second information when the computation unit determines that the first information is indicative of information of one of the harmful material and the hazardous material.

4. The recycle system according to claim 2, wherein the computation unit selects a shredding separating process from the second information when the computation unit determines that the first information includes information indicative of the multi-material.

5. A manufactured article recycle method comprising the steps of:
   storing first information relating to recycle processes and second information relating to materials to be controlled by a recycle system;
   inputting third information relating to an article to be recycled;
   determining whether or not the third information includes information indicative of at least one the materials stored as the second information;
   selecting a recycle process from the first information according to the result of the determination; and
   processing the article according to the selected recycle process.

6. The recycle method according to claim 5, wherein the second information includes material information of at least one of a harmful material, a hazardous material, and a multi-material.

7. The recycle method according to claim 6, wherein a particular process is selected when the third information is indicative of information of one of the harmful material and the hazardous material.

8. The recycle method according to claim 6, wherein a shredding separating process is selected when the first information includes information indicative of the multi-material.

9. A manufactured article recycle system comprising:
   input means for inputting first information relating to an article;
   storage means for storing second information relating to recycle process and third information relating to materials to be controlled by the recycle system;
   computation means for determining whether or not the first information includes information of at least one of the materials stored as the second information, and for selecting a recycle process from the second information according to the result of the determination; and
   output means for outputting information of the selected recycle process.

10. A manufactured article recycle system comprising:
    an input unit which inputs first information relating to an article;
    a storage unit which stores second information relating to materials to be controlled by the recycle system;
    a computation unit which determines whether or not the first information includes information indicative of at least one of the materials stored as the second information; and
    an output unit which outputs information relating to a part of the article which has the material stored as the second information.

11. A manufactured article recycle system comprising:
    input means for inputting first information relating to an article;
    storage means for storing second information relating to materials to be controlled by the recycle system;
    computation means for determining whether or not the first information includes information indicative of at least one of the materials stored as the second information; and
    output means for outputting information relating to a part of the article which has the material stored as the second information.

* * * * *